US012748679B2

(12) United States Patent
Vasudevan et al.

(10) Patent No.: US 12,748,679 B2
(45) Date of Patent: Sep. 29, 2026

(54) SYSTEM AND METHODS FOR END-TO-END PROVABLE GUARANTEES FOR SAFETY CRITICAL COMPUTER PLATFORMS

(71) Applicant: Uberspark Inc., Aledo, TX (US)

(72) Inventors: Amit Vasudevan, Aledo, TX (US); Michael J McCall, Pittsburgh, PA (US); Ajit Vasudevan, San Jose, CA (US)

(73) Assignee: UBERSPARK, INC., Aledo, TX (US)

( * ) Notice: Subject to any disclaimer, the term of this patent is extended or adjusted under 35 U.S.C. 154(b) by 0 days.

(21) Appl. No.: 19/426,013

(22) Filed: Dec. 18, 2025

(65) Prior Publication Data

US 2026/0169892 A1 Jun. 18, 2026

Related U.S. Application Data

(60) Provisional application No. 63/735,870, filed on Dec. 18, 2024.

(51) Int. Cl.

*G06F 11/3604* (2025.01)
*G06F 8/30* (2018.01)
*G06F 8/41* (2018.01)

(52) U.S. Cl.

CPC ............ *G06F 11/3604* (2013.01); *G06F 8/31* (2013.01); *G06F 8/447* (2013.01)

(58) Field of Classification Search

CPC .................................. G06F 8/31; G06F 8/447

(Continued)

(56) References Cited

U.S. PATENT DOCUMENTS 8,136,158 B1 * 3/2012 Sehr ........................ G06F 21/51 726/22
8,627,414 B1 1/2014 McCune et al.
(Continued)

FOREIGN PATENT DOCUMENTS

WO 2024163410 8/2024

OTHER PUBLICATIONS

Kulik, Tomas, et al. "A survey of practical formal methods for security." Formal aspects of computing 34.1 (2022): pp. 1-39. (Year: 2022).*

(Continued)

*Primary Examiner* — Satish Rampuria
(74) *Attorney, Agent, or Firm* — Cherin Law Offices, P.C.

(57) ABSTRACT

A system and methods are disclosed for end-to-end provable guarantees for safety critical computer platforms. The technical problem addressed by this invention is the need to provide assurance that a complex safety-critical computer platform behaves as intended and is secure, particularly in safety-critical contexts where errors or malicious attacks can have devastating effects. Despite advances in methodologies and toolchains for high-assurance software production, there remains a significant gap between theoretical guarantees and practical implementation at the operation instruction level (e.g., Assembly language instruction, byte-code instruction, digital circuit state-machine instruction etc.). The present invention overcomes this limitation by providing a system for verifying key security properties for safety-critical computer platforms at the operation instruction level without reliance on custom generation pipelines or certified compilers, thereby enabling the practical development of more secure and reliable computer platforms.

28 Claims, 21 Drawing Sheets

400

(58) Field of Classification Search
USPC .......................................................... 717/126
See application file for complete search history.

(56) References Cited

U.S. PATENT DOCUMENTS

| | | | | |
|---|---|---|---|---|
| 9,177,153 | B1 * | 11/2015 | Perrig | G06F 21/57 |
| 10,380,346 | B2 | 8/2019 | Sood et al. | |
| 12,093,367 | B2 | 9/2024 | Vasudevan | |
| 12,367,328 | B1 * | 7/2025 | Vasudevan | G06F 13/28 |
| 2014/0317737 | A1 | 10/2014 | Shin et al. | |
| 2015/0161383 | A1 * | 6/2015 | Chen | G06F 9/44589 726/22 |
| 2016/0099811 | A1 | 4/2016 | Hawblitzel et al. | |
| 2016/0248592 | A1 * | 8/2016 | Hawblitzel | G06F 21/57 |
| 2018/0115522 | A1 | 4/2018 | Gleichauf | |
| 2024/0267736 | A1 | 8/2024 | Vasudevan et al. | |
| 2024/0289432 | A1 | 8/2024 | Vasudevan | |
| 2024/0346132 | A1 | 10/2024 | Vasudevan et al. | |

OTHER PUBLICATIONS

Lounas, Razika, Mohamed Mezghiche, and Jean-Louis Lanet. “Formal methods in dynamic software updating: a survey.” International Journal of Critical Computer-Based Systems 9.1-2 (2019): pp. 76-114. (Year: 2019).*

Brostoff, Sacha, and M. Angela Sasse. “Safe and sound: a safety-critical approach to security.” Proceedings of the 2001 workshop on New security paradigms. 2001. pp. 41-50. (Year: 2001).*

Murray, Toby & Tiwari, Mukesh & Ernst, Gidon & Naumann, David. (Sep. 7, 2023). Assume but Verify: Deductive Verification of Leaked Information in Concurrent Applications (Extended Version). 10.48550/arXiv.2309.03442.

Vasudevan, Amit et al.: Practical / Provable, End-to-End Guarantees on Commodity Heterogenous Interconnected Computing Platforms, ACM SIGOPS Operating Systems Review, Jan. 1, 2020 (Jan. 1, 2020), XP093200075, Retrieved from the Internet: URL:https://storage.googleapis.com/gweb-research2023-media/pubtools/5739.pdf.

Derakhshan et al. “Towards End-to-End Verified TEEs via Verified Interface Conformance and Certified Compilers” , In 2023 IEEE 36th Computer Security Foundations Symposium, Jul. 10, 2023 (pp. 324-339). IEEE. (Year 2023).

Mccormack et al. “Formalizing an Architectural Model of a Trustworthy Edge loT Security Gateway”, In 2021 IEEE 27th International Conference on Embedded and Real-Time Computing Systems and Applications. Aug. 1, 20218 (pp. 93-102). IEEE. (Year 2021).

Mccormack et al. “JETFIRE: A Low-Cost, Trusted IoT Security Gateway”, Carnegie Mellon University CyLab, (Year 2020).

Erata et al: “Survey of Approaches and Techniques for Security Verification of Computer Systems”, ACM Journal on Emerging Technologies in Computing Systems (JETC), ACM, 2 Penn Plaza, Suite 701 New York NY 10121-0701, USA, vol. 19, No. 1, Jan. 19, 2023 (Jan. 19, 2023), pp. 1-34.

Haglund Jonas et al: “Formally Verified Isolation of DMA”, 2022 Formal Methods in Computer-Aided Design (FMCAD), FMCAD Association and Authors, Oct. 17, 2022 (Oct. 17, 2022), pp. 118-128.

* cited by examiner

500 main.c 501

```
void bootmain(void)
{
  ...
  // Set TrustZone NS Bit to 1.
  __asm__ volatile(
      "mrc p15, 0, r0, c1, c1, 0\n\t"
      "mov r1, r0\n\t"
      "add r0, r1, #1\n\t"
      "mcr p15, 0, r0, c1, c1, 0\n\t"
      :
      :
      : "r0","r1"
  );
 return;
}
```

hwm.c 504

```
void __impl_casm_mov_r1(uint32_t v)
{
  hwm_r1 = v;
}
```

main.c 502

```
extern void casm_set_ns1(void);

void bootmain(void)
{
  ...
 //Set TrustZone NS Bit to 1.
  casm_set_ns1();
  return;
}
```

casm_set_ns1.cS 503

```
void casm_set_ns1(void)
{
  __casm__mrc_hwm_p15(...);
  __casm__mov_r1(hwm_r0);
  __casm__add_r0(hwm_r1,1);
  __casm__mcr_hwm_p15(...);
  __casm__ret();
}
```

FIG. 5

600

```
_start:
fence.i
1: auipc gp, %pcrel_hi(__global_pointer$)
addi gp, gp, %pcrel_lo(1b)
la sp, (kernel_stack_alloc +
    BIT(CONFIG_KERNEL_STACK_BITS))
csrw sscratch, x0
jal init_kernel


void casm_start(void){
 __casm__fence_i();
 __casm__label("1");
 __casm__auipc_gp(pcrel_hi(__global_pointer$));
__casm__addi_gp_gp_(pcrel_lo("1b"));
__casm__la_sp (kernel_stack_alloc +
    bit(CONFIG_KERNEL_STACK_BITS));
  __casm__cswr_sscratch_x0();
__casm__jal_c(init_kernel, hwm_cpu_a0,
   hwm_cpu_a1, hwm_cpu_a2, hwm_cpu_a3,
   hwm_cpu_a4, hwm_cpu_a5, hwm_cpu_a6,
   hwm_cpu_a7);
}
```

601

```
static inline word_t read_scause(void){
  word_t temp;
  asm volatile("csrr %0, scause" : "=r"(temp));
  return temp;
}

static word_t casm_read_scause(void){
 __casm__addi_sp_sp(-32);
 __casm__sd_s0_m_sp(24);
 __casm__addi_s0_sp(32);
 __casm__csrr_a5_scause();
 __casm__sw_m_s0(-20);
 __casm__lw_a5_m_s0(-20);
 __casm__mv_a0_a5();
 __casm__ld_s0_m_sp(24);
 __casm__addi_sp_sp(32);
 __casm__jr_ra(); }
```

602

```
void VISIBLE NORETURN
restore_user_context(void){
  ...
asm volatile("csrr %0, sscratch" : "=r"(sp));
  ...
}
void VISIBLE NORETURN
restore_user_context(void){
  ...
casm_savesp();
...
}

void casm_savesp(void){
__casm_csrr_sp_sscratch();
}
```

603

```
void __casm__addi_sp_sp(int32_t off){
 hwm_cpu_sp += off; }

void __casm__ld_s0_m_sp(int32_t off){
 hwm_cpu_s0 = * (int32_t *)((int32_t)
hwm_cpu_sp + off) }
```

```
void __casm__csrr_sp_sscratch(void){
 hwm_cpu_sp = hwm_cpu_sscratch;
}
```

604

FIG. 6

700

$$\frac{}{F \Vdash \langle(\bar{n}, I), \sigma\rangle \Downarrow^{\emptyset} \langle(\bar{n}, I), \sigma\rangle}\ \textsc{Cons}$$ 701

$$\frac{\sigma(x) = v}{F \Vdash \langle(x, I), \sigma\rangle \Downarrow^{x} \langle(v, I), \sigma\rangle}\ \textsc{Var}$$ 702

$$\frac{F \Vdash \langle(e_1, I), \sigma\rangle \Downarrow^{\delta_1} \langle(v_1, I), \sigma\rangle \qquad F \Vdash \langle(e_2, I), \sigma\rangle \Downarrow^{\delta_2} \langle(v_2, I), \sigma\rangle}{F \Vdash \langle(e_1 + e_2, I), \sigma\rangle \Downarrow^{\delta_1, \delta_2} \langle(v_1 + v_2, I), \sigma\rangle}\ \textsc{Add}$$ 703

$$\frac{F \Vdash \langle(e, I), \sigma\rangle \Downarrow^{\delta} \langle(v, I), \sigma\rangle}{F \Vdash \langle(\text{return}\, e, I), \sigma\rangle \longrightarrow^{\delta} \langle(\text{return}\, v, I), \sigma\rangle}\ \textsc{Ret-1}$$ 704

$$\frac{}{F \Vdash \langle(\text{return}\, v, I), \sigma\rangle \longrightarrow^{\emptyset}_{\text{ret}} \langle(v, (v, H)), \sigma\rangle}\ \textsc{Ret-2}$$ 705

$$\frac{F \Vdash \langle(e, I), \sigma\rangle \Downarrow^{\delta} \langle(v, I), \sigma\rangle}{F \Vdash \langle(x := e, I), \sigma\rangle \longrightarrow^{\delta, x} \langle(\text{skip}, I), \sigma[x \mapsto v]\rangle}\ \textsc{Assign}$$ 706

$$\frac{F \Vdash \langle(e, I), \sigma\rangle \Downarrow^{\delta} \langle(v, I), \sigma\rangle \qquad \sigma = \sigma'[v \mapsto v']}{F \Vdash \langle(x := [e], I), \sigma\rangle \longrightarrow^{\delta, v, x} \langle(\text{skip}, I), \sigma[x \mapsto v']\rangle}\ \textsc{Lookup}$$ 707

$$\frac{F \Vdash \langle(e_1, I), \sigma\rangle \Downarrow^{\delta_1} \langle(v_1, I), \sigma\rangle \qquad F \Vdash \langle(e_2, I), \sigma\rangle \Downarrow^{\delta_2} \langle(v_2, I), \sigma\rangle \qquad \sigma = \sigma'[v_1 \mapsto \_]}{F \Vdash \langle([e_1] := e_2, I), \sigma\rangle \longrightarrow^{\delta_1, \delta_2, v_1} \langle(\text{skip}, I), \sigma[v_1 \mapsto v_2]\rangle}\ \textsc{Mutation}$$ 708

$$\frac{F \Vdash \langle(b, I), \sigma\rangle \Downarrow^{\delta} \langle(v, I), \sigma\rangle \wedge v > 0}{F \Vdash \langle(\text{if}(b)\, c_1\, \text{else}\, c_2, I), \sigma\rangle \longrightarrow^{\delta} \langle(c_1, I), \sigma\rangle}\ \textsc{If-true}$$ 709

$$\frac{F \Vdash \langle(b, I), \sigma\rangle \Downarrow^{\delta} \langle(v, I), \sigma\rangle \wedge v \leq 0}{F \Vdash \langle(\text{if}(b)\, c_1\, \text{else}\, c_2, I), \sigma\rangle \longrightarrow^{\delta} \langle(c_2, I), \sigma\rangle}\ \textsc{If-false}$$ 710

$$\frac{}{F \Vdash \langle(\text{skip}; c, I), \sigma\rangle \longrightarrow \langle(c, I), \sigma\rangle}\ \textsc{Seq-s}$$ 711

$$\frac{F \Vdash \langle(c_1, I), \sigma_1\rangle \longrightarrow^{\delta} \langle(c_2, I), \sigma_2\rangle}{F \Vdash \langle(c_1; c, I), \sigma_1\rangle \longrightarrow^{\delta} \langle(c_2; c, I), \sigma_2\rangle}\ \textsc{Seq-I}$$ 712

$$\frac{F \Vdash \langle b, \sigma\rangle \Downarrow^{\delta} \langle v, \sigma\rangle \wedge v > 0}{F \Vdash \langle(\text{while}\,(b)\,\text{do}\, c, I), \sigma\rangle \longrightarrow^{\delta} \langle(c; (\text{while}\,(b)\,\text{do}\, c), I), \sigma\rangle}\ \textsc{While-T}$$ 713

$$\frac{F \Vdash \langle b, \sigma\rangle \Downarrow^{\delta} \langle v, \sigma\rangle \wedge v \leq 0}{F \Vdash \langle(\text{while}\,(b)\,\text{do}\, c, I), \sigma\rangle \longrightarrow^{\delta} \langle(\text{skip}, I), \sigma\rangle}\ \textsc{While-F}$$ 714

$$\frac{F \Vdash \langle(x, I), \sigma\rangle \Downarrow^{\delta_1} \langle(v, I), \sigma\rangle \qquad \sigma = \sigma'[v \mapsto \_] \qquad F \Vdash \langle\vec{e}, \sigma\rangle \Downarrow^{\delta} \langle\vec{v}, \sigma\rangle}{F \Vdash \langle([x] := f\,\vec{e}, I), \sigma\rangle \longrightarrow^{\delta} \langle([x] := f\,\vec{v}, I), \sigma'\rangle}\ \textsc{ExtCall}$$ 715

FIG. 7

800

801

DEFINITION 1 (RSL QUADRUPLE). *We interpret the quadruple* $\Vdash_{a,F_1,F_2} \{\Psi_1\} c_1 \sim c_2 \{r_1, r_2.\Psi_2\}$ *as*

$$
\begin{aligned}
&\forall \sigma_1.\forall \sigma_2.(\sigma_1, \sigma_2) \Vdash \Psi_1 \supset \\
&\quad \forall \rho_1'.F_1 \Vdash \langle (c_1, I), \sigma_1 \rangle \longrightarrow^{*} \langle \rho_1', \sigma_1' \rangle \supset \\
&\quad \exists \rho_2'.(F_2 \Vdash \langle (c_2, I), \sigma_2 \rangle \longrightarrow^{*} \langle \rho_2', \sigma_2' \rangle \wedge \\
&\qquad (F_1 \Vdash \mathsf{halt}(\rho_1', \sigma_1') = \langle v_1, \rho_1'' \rangle \supset (F_2 \Vdash \mathsf{halt}(\rho_2', \sigma_2') = \langle v_2, \rho_2'' \rangle \wedge (\sigma_1', \sigma_2') \Vdash [v_1/r_1, v_2/r_2]\Psi_2)) \\
&\qquad \wedge (F_1 \Vdash \mathsf{extCall}(\rho_1') = \langle f_1' \vec{v}_1 : \tau_1, \rho_1'' \rangle \supset \\
&\qquad\qquad (F_2 \Vdash \mathsf{extCall}(\rho_2') = \langle f_2' \vec{v}_2 : \tau_2, \rho_2'' \rangle \\
&\qquad\qquad \wedge \exists \Psi_1'.(\Psi_1' \Rightarrow \mathsf{Eq}_a \wedge (\sigma_1', \sigma_2') \in \Psi_1' \wedge f_1' = f_2' \wedge \vec{v}_1 = \vec{v}_2 \\
&\qquad\qquad \wedge ((F_1 \Vdash \mathsf{extRet}(\rho_1'', v) = (c_1'', I) \wedge F_2 \Vdash \mathsf{extRet}(\rho_2'', v) = (c_2'', I)) \supset \\
&\qquad\qquad\quad (\{\Psi_1'\} c_1'' \sim c_2'' \{r_1, r_2.\Psi_2\}))))))
\end{aligned}
$$

FIG. 8

$$\frac{}{\vdash_{a,F_1,F_2} \{\Psi\}\mathrm{return}\, e_1 \sim \mathrm{return}\, e_2\{r_1, r_2.\Psi \wedge r_1 = e_1 \wedge r_2 = e_2\}}\ \textsc{Retrun}$$ 901

$$\frac{}{\vdash_{a,F_1,F_2} \{\Psi\}\mathrm{skip} \sim \mathrm{skip}\{\_.\Psi\}}\ \textsc{Skip}$$ 902

$$\frac{}{\vdash_{a,F_1,F_2} \{\Psi[e_1/x_1, e_2/x_2]\}x_1 := e_1 \sim x_2 := e_2\{\_.\Psi\}}\ \textsc{Assign}$$ 903

$$\frac{}{\vdash_{a,F_1,F_2} \{e_1 \mapsto \_ * e_2 \mapsto \_ * \Psi\}[e_1] := e_1' \sim [e_2] := e_2'\{\_.e_1 \mapsto e_1' * e_2 \mapsto e_2' * \Psi\}}\ \textsc{Mutation}$$ 904

$$\frac{x_1, x_2 \notin FV(\Psi)}{\vdash_{a,F_1,F_2} \{e_1 \mapsto x_1' * e_2 \mapsto x_2' * \Psi\}x_1 := [e_1] \sim x_2 := [e_2]\{\_.e_1 \mapsto x_1 * e_2 \mapsto x_2 * x_1 = x_1' * x_2 = x_2' * \Psi\}}\ \textsc{Lookup}$$ 905

$$\frac{\{\Psi_1\}c_1 \sim c_2\{\_.\Psi_2\} \qquad \{\Psi_2\}d_1 \sim d_2\{r_1, r_2.\Psi_3\}}{\vdash_{a,F_1,F_2} \{\Psi_1\}c_1; d_1 \sim c_2; d_2\{r_1, r_2.\Psi_3\}}\ \textsc{Seq}$$ 906

$$\frac{\{\Psi \wedge b_1 > 0\}c_1 \sim c_2\{\_.\Psi\} \qquad \Psi \Rightarrow (b_1 = b_2)}{\vdash_{a,F_1,F_2} \{\Psi\}\mathrm{while}\,(b_1)\, c_1 \sim \mathrm{while}\,(b_2)\, c_2\{\_.\Psi \wedge (b_1 \le 0)\}}\ \textsc{While}$$ 907

$$\frac{\{\Psi_1 \wedge b > 0\}c_1 \sim c_2\{\_.\Psi_2\} \qquad \{\Psi_1 \wedge b \le 0\}d_1 \sim d_2\{\_.\Psi_2\} \qquad \Psi_1 \Rightarrow b_1 = b_2}{\vdash_{a,F_1,F_2} \{\Psi_1\}\mathrm{if}\,(b_1)\, c_1\ \mathrm{else}\, d_1 \sim \mathrm{if}\,(b_2)\, c_2\ \mathrm{else}\, d_2\{\_.\Psi_2\}}\ \textsc{If}$$ 908

$$\frac{x_s \mapsto \_ * x_t \mapsto \_ * \Psi \Rightarrow \Phi_{a} \qquad f_s = f_t \qquad \Phi_{a} \implies \vec{e}_1 = \vec{e}_2 \qquad x_t = \mathrm{MT}(x_s)}{\vdash_{a,F_1,F_2} \{x_s \mapsto \_ * x_t \mapsto \_ * \Psi\}[x_s] := f_s\, \vec{e}_1 \sim [x_t] := f_t\, \vec{e}_2\{\_.\exists x. x_s \mapsto x * x_t \mapsto x * \Psi\}}\ \textsc{ExtCall}$$ 909

$$\frac{\{\Psi_1'\}c_1 \sim c_2\{r_1, r_2.\Psi_2'\} \qquad \Psi_1 \Rightarrow \Psi_1' \qquad \forall v_1, v_2. [v_1/r_1, v_2/r_2]\Psi_2' \Rightarrow [v_1/r_1, v_2/r_2]\Psi_2}{\vdash_{a,F_1,F_2} \{\Psi_1\}c_1 \sim c_2\{r_1, r_2.\Psi_2\}}\ \textsc{Sub}$$ 910

$$\frac{\{\Psi_1\}c_1 \sim c_2\{r_1, r_2.\Psi_2\} \qquad FV(\Psi_3) \cap var(c_1, c_2) = \emptyset \qquad FV(\Psi_3) \subseteq uid_a.M \cup \mathrm{MT}(uid_a.M) \cup F_1 \cup F_2}{\vdash_{a,F_1,F_2} \{\Psi_1 * \Psi_3\}c_1 \sim c_2\{r_1, r_2.\Psi_2 * \Psi_3\}}\ \textsc{Frame}$$ 911

$$\frac{\{\Psi_1[e/x]\}\mathrm{skip} \sim c\{\_, r_2.\Psi_2\}}{\vdash_{a,F_1,F_2} \{\Psi_1\}x := e \sim c\{\_, r_2.\Psi_2\}}\ \textsc{Assign-L} \qquad \frac{\{\Psi_1[e/x]\}c \sim \mathrm{skip}\{r_1, \_.\Psi_2\}}{\vdash_{a,F_1,F_2} \{\Psi_1\}c \sim x := e\{r_1, \_.\Psi_2\}}\ \textsc{Assign-R}$$ 912

$$\frac{\{\Psi_1 \wedge b > 0\}c_1 \sim c\{\_, r_2.\Psi_2\} \qquad \{\Psi_1 \wedge b \le 0\}c_2 \sim c\{\_, r_2.\Psi_2\}}{\vdash_{a,F_1,F_2} \{\Psi_1\}\mathrm{if}\,(b)\, c_1\ \mathrm{else}\, c_2 \sim c\{\_, r_2.\Psi_2\}}\ \textsc{If-L}$$ 913

$$\frac{\{\Psi_1 \wedge b > 0\}c \sim c_1\{r_1, \_.\Psi_2\} \qquad \{\Psi_1 \wedge b \le 0\}c \sim c_2\{r_1, \_.\Psi_2\}}{\vdash_{a,F_1,F_2} \{\Psi_1\}c \sim \mathrm{if}\,(b)\, c_1\ \mathrm{else}\, c_2\{r_1, \_.\Psi_2\}}\ \textsc{If-R}$$ 914

$$\frac{\{\Psi_1\}\mathrm{skip} \sim c\{\_, r_2.\Psi_2\}}{\vdash_{a,F_1,F_2} \{e_1 \mapsto \_ * \Psi_1\}[e_1] := e_1' \sim c\{\_, r_2.e_1 \mapsto e_1' * \Psi_2\}}\ \textsc{Mut-L}$$ 915

$$\frac{\{\Psi_1\}c \sim \mathrm{skip}\{r_1, \_.\Psi_2\}}{\vdash_{a,F_1,F_2} \{e_2 \mapsto \_ * \Psi_1\}c \sim [e_2] := e_2'\{r_1, \_.e_2 \mapsto e_2' * \Psi_2\}}\ \textsc{Mut-R}$$ 916

$$\frac{x_1 \notin FV(\Psi_1) \qquad \{\Psi_1\}\mathrm{skip} \sim c\{\_.\Psi_2\}}{\vdash_{a,F_1,F_2} \{e_1 \mapsto x_1' * \Psi_1\}x_1 := [e_1] \sim c\{\_.e_1 \mapsto x_1 * x_1 = x_1' * \Psi_2\}}\ \textsc{Lookup-L}$$ 917

$$\frac{x_2 \notin FV(\Psi_1) \qquad \{\Psi_1\}c \sim \mathrm{skip}\{\_.\Psi_2\}}{\vdash_{a,F_1,F_2} \{e_2 \mapsto x_2' * \Psi_1\}c \sim x_2 := [e_2]\{\_.e_2 \mapsto x_2 * x_2 = x_2' * \Psi_2\}}\ \textsc{Lookup-R}$$ 918

900

FIG. 9

1100 add.c 1101

```
uint32_t add(uint32_t x, uint32_t y){
  return x + y;
}
```

add.s 1102

```
add:
 subl $12, %esp
 leal 16(%esp), %eax
 movl %eax, 0(%esp)
 movl 4(%eax), %edx
 movl 0(%eax), %ecx
 leal 0(%ecx,%edx,1), %eax
 addl $12, %esp
 ret
```

casm_rw_check.c 1104

```
void casm_rw_check(uint32_t addr){
  if (!casm_is_global(addr)){
    //@assert addr<=g_sbase &&
        addr>=g_sbase-MAX_STACKFRAME_SIZE;
  }}
```

casmr_func_add.cS 1103

```
uint32_t casmr_func_add(){
   //Save stack frame base address.
   uint32_t bp = (uint32_t) hwm_esp
   //Save return address.
   uint32_t ret_addr = *(uint32_t *)(hwm_esp - 4);
   //Set current global stack base
   g_sbase = (uint32_t) hwm_esp-8
  __casm__subl_imm_esp(12);
  __casm__leal_eax(...);
  __casm_movl_eax_imm_eax(0);
  __casm_movl_imm_eax_edx(4);
  __casm_movl_imm_eax_ecx(0);
  __casm_leal_eax(...);
  __casm_addl_imm_esp(12);
   //Check stack pointer is restored.
   //@assert bp == (uint32_t) hwm_esp;
   //Check return address.
   //@assert ret_addr == *(uint32_t *)(hwm_esp -
       4);
  __casm_ret();
}
```

FIG. 11

1300

1301

Program 1

```
uint32_t y1;
uint32_t z1;

void P1(){
  uint32_t x;
  x = 6;
  x = z1+6;
  y1 = x+6;
  return;}
```

1302

Program 2

```
uint32_t y2;
uint32_t z2;

void P2(){
y2 = z2+12;
return;}
```

1303

Relational Property

```
/*@ relational
\callset(\call(P1,id1),\call(P2,id2))
==>\at(y1, Pre_id1)==\at(y2, Pre_id2)
==>\at(z1,Pre_id1)==\at(z2,Pre_id2)
==>\at(y1,Post_id1)==\at(y2,Post_id2)
&&\at(z1,Post_id1)==\at(z2,Post_id2);
*/
```

FIG. 13

1400

1401

Program 3

```
uint32_t y3;
uint32_t z3;

void P3(){
  uint32_t x;
  x = 6;
  x = z3 + 6;
  y3 = x + 6;
  while (z3 < y3){
    z3 = z3+1;
  }
  y3= y3+1;
  return;
}
```

1402

Program 4

```
uint32_t y4;
uint32_t z4;

void P4(){
  y4 = z4 + 12;
  while (z4 < y4){
    z4 = z4+1;
  }
  y4= y4+1;
  return;
}
```

1405

Relational Property-Cond

```
/*@ relational
\callset(\call(P3Cond,id3),\call(P4Cond,id4))
==> \at(flag3, Pre_id3)== \at(flag4, Pre_id4)
==> \at(y3, Pre_id3)== \at(y4, Pre_id4)
==> \at(z3,Pre_id3) == \at(z4,Pre_id4)
==> \at(flag3,Post_id3) == \at(flag4,Post_id4)
*/
```

1403

Condition P3

```
uint32_t y3;
uint32_t z3;
bool flag3;

void P3Cond(){
  if (z3 < y3) {
    flag3 = true
      ;}}
```

1404

Condition P4

```
uint32_t y4;
uint32_t z4;
bool flag4;

void P4Cond(){
  if (z4 < y4) {
    flag4 = true
      ;}}
```

FIG. 14

Program 5 —1501

```
//@ ghost int ghost_trace_5;
/*@ ghost
/@ assigns ghost_trace_5;
  @ ensures register : observed_trace_5
    ==(\old(observed_trace_5) ^ [| a |]);
  @/
  void track_5(int a);
*/
uint32_t y5;
uint32_t z5;

uint32_t H1(uint32_t y);
uint32_t H2(uint32_t y);

void P5(){
  uint32_t x;
  x = 6;
  x = z5 + 6;
  y5 = x + 6;
  if (y5 > z5) {
    // == ghost trace ==
    //@ ghost track_5(1);
    //@ ghost track_5(2);
    //@ ghost track_5(y5);
    //@ ghost track_5(z5);
    //@ ghost track_5(y5);
    z5 = H1(y5);}
  else {
    // == ghost trace ==
    //@ ghost track_5(2);
    //@ ghost track_5(1);
    //@ ghost track_5(y5);
    //@ ghost track_5(z5);
    //@ ghost track_5(y5);
    y5 = H2(y5);}
  return;}
```

Program 6 —1502

```
//@ ghost int ghost_trace_6;
/*@ ghost
/@ assigns ghost_trace_6;
  @ ensures register : observed_trace_6
    ==(\old(observed_trace_6) ^ [| a |]);
  @/
  void track_6(int a);
*/
uint32_t y6;
uint32_t z6;

uint32_t H1(uint32_t y);
uint32_t H2(uint32_t y);

void P6(){
  y6 = z6 + 12;
  // == ghost trace ==
  //@ ghost track_6(1);
  //@ ghost track_6(2);
  //@ ghost track_6(y6);
  //@ ghost track_6(z6);
  //@ ghost track_6(y6);
  z6 = H1(y6);
  return;
}
```

Relational property-Ext Call —1503

```
/*@ check
trace_content_equal:
  \at(y5,Pre_id5)== \at(y6,Pre_id6) ==>
  \at(z5,Pre_id5) == \at(z6,Pre_id6) ==>
  equal(observed_trace_5 , observed_trace_6
       );
*/
```

1500

FIG. 15

1700

```
/*@ predicate disjoint_sbi_seL4 =
(hwm_cpu_pmpcfg[0] == L | NAPOT &&
hwm_cpu_pmpcfg[1] == R | W | X | L | NAPOT &&
hwm_cpu_pmpaddr[0] == (SBI_BASE >> 2) +
(SBI_SIZE >> 3) - 1 &&
hwm_cpu_pmpaddr[1] == (SEL4_BASE >> 2) +
SEL4_SIZE >> 3) - 1 */
/*@ ensures disjoint_sbi_seL4 */
void pmp_initialize(void){
  pmp_set(0, L | NAPOT, SBI_BASE, SBI_SIZE);
  pmp_set(1, R | W | X | L | NAPOT, SEL4_BASE,
SEL4_SIZE); }

/*@ requires hwm_cpu_mode == M_MODE
ensures hwm_cpu_mode == S_MODE &&
disjoint_sbi_seL4 && hwm_cpu_mepc ==
ENTRYPOINT_SEL4_C_UOBJ*/
void firmware_init(){
 pmp_initialize(); cache_initialize();
iommu_initialize(); ...
xfer_to_seL4_cuobj(ENTRYPOINT_SEL4_C_UOBJ);
//@assert hwm_cpu_mode == S_MODE &&
disjoint_sbi_seL4 && hwm_cpu_mepc ==
ENTRYPOINT_SEL4_C_UOBJ;}
```

1701

```
/*@ predicate TPSM = (inv_heap == true) && (inv_stack == true) && (inv_ps == true)*/
/*@  requires TPSM == true && hwm_cpu_mode == M_MODE
 ensures TPSM == true && hwm_cpu_mode == S_MODE && hwm_mepc == address*/
.void xfer_to_seL4_cuobj(u64 address){
   //@ghost inv_hfsp = false
   /*@ assert hwm_cpu_mode == M_MODE && \valid(hwm_sp)  */
  __casm__ld_t0_m_sp(0);
  __casm__csrr_t1_mstatus();
  __casm__li_t2(0x8000000000000000);
 __casm__or_t1_t1_t2();
 __casm__csrw_mstatus_t1();
 __casm__csrw_mepc_t0();
/*@   assert hwm_sp == v_stacktop && inv_riscv_abi == true */
//@ghost inv_cabi = true
//@ghost inv_hfsp = true
/*@ assert hwm_mepc == address && (hwm_mstatus & 0x8000000000000000)*/
 __casm__mret();
/*@ assert hwm_cpu_mode == S_MODE */
return; }
```

1702

```
/*@ requires n < PMP_COUNT
ensures hwm_cpu_pmpcfg[n] == prot && hwm_cpu_pmpaddr[n] == addr; */
int pmp_set(unsigned int n, unsigned long prot, unsigned long addr){...}
```

1703

FIG. 17

ACSL Spec. of _slabmempgtbl_initmempgtbl_ept4k — 1801

```
/*@
 requires 0 <= slabid < XMHFGEEC_TOTAL_UGSLABS;
 assigns _slabmempgtbl_lvl4t[slabid][0..(PAE_MAXPTRS_PER_PML4T-1)];
 assigns _slabmempgtbl_lvl3t[slabid][0..(PAE_MAXPTRS_PER_PDPT-1)];
 assigns _slabmempgtbl_lvl2t[slabid][0..(PAE_MAXPTRS_PER_PDPT-1)][0..(
     PAE_PTRS_PER_PDT-1)];
 ensures (\forall uint32_t x; 0 <= x < PAE_PTRS_PER_PML4T ==>
   ( (uint64_t)_slabmempgtbl_lvl4t[slabid][x] ) == ( ((uint64_t)&
       _slabmempgtbl_lvl3t[slabid] | 0x7) )
  );
 ensures (\forall uint32_t x; 0 <= x < PAE_PTRS_PER_PDPT ==>
   ( (uint64_t)_slabmempgtbl_lvl3t[slabid][x] ) == ( ((uint64_t)&
       _slabmempgtbl_lvl2t[slabid][x] | 0x7 ) )
  );

 ensures (\forall integer x,y; 0 <= x < (PAE_PTRS_PER_PDPT-1) && 0 <= y < (
     PAE_PTRS_PER_PDT-1) ==>
         ( (uint64_t)_slabmempgtbl_lvl2t[slabid][x][y] == ((uint64_t)&
             _slabmempgtbl_lvl1t[slabid][x][y] | 0x7 ) )
  );
@*/
```

1802 ugmpgtbl_inittable.c

```
/*@ ... @*/
static void
    _slabmempgtbl_initmempgtbl_ept4K(
    uint32_t slabid){
    int i;
    //pml4t zero out
    for(i=0; i < PAE_MAXPTRS_PER_PML4T; i
        ++){
        _slabmempgtbl_lvl4t[slabid][i] =
            0;
    }
    ...
}
```

1803 ugmpgtbl_inittable.c (rewrite)

```
int i;
uint64_t *lvl4t = (uint64_t *)
    _slabmempgtbl_lvl4t;

/*@ ... @*/
static void
    _slabmempgtbl_initmempgtbl_ept4K(
    uint32_t slabid){
    i = 0;
    //pml4t zero out
    while(i<PAE_MAXPTRS_PER_PML4T){
      lvl4t[slabid*
          XMHFGEEC_TOTAL_UGSLABS+i] =
          0;
      i++;
    }
    ...
}
```

1800

FIG. 18

1900

1901

1902

```
...
/*@
    assigns i \from i;
*/
void pre_source(uint32_t slabid){
    i = 0;
}

/*@
    requires \separated(&t_i, hwm_cpu_gprs_esp, hwm_cpu_gprs_esp_m7,
          hwm_cpu_gprs_esp_m6,hwm_cpu_gprs_esp_m5, hwm_cpu_gprs_esp_a1);
    assigns hwm_cpu_gprs_esp \from hwm_cpu_gprs_esp, hwm_cpu_gprs_esp_m7;
    assigns hwm_cpu_gprs_eax \from hwm_cpu_gprs_eax, hwm_cpu_gprs_esp_a1;
    assigns hwm_cpu_gprs_ebx \from hwm_cpu_gprs_ebx, hwm_cpu_gprs_eax;
    assigns hwm_cpu_gprs_edx \from hwm_cpu_gprs_edx;
    assigns *hwm_cpu_gprs_esp_m7 \from *hwm_cpu_gprs_esp_m7, hwm_cpu_gprs_eax;
    assigns *hwm_cpu_gprs_esp_m6 \from *hwm_cpu_gprs_esp_m6, hwm_cpu_gprs_ebx;
    assigns *hwm_cpu_gprs_esp_m5 \from *hwm_cpu_gprs_esp_m5, hwm_cpu_gprs_ecx;
    assigns t_i \from t_i, hwm_cpu_gprs_edx;
*/
void pre_target(uint32_t slabid){
    hwm_cpu_gprs_esp = hwm_cpu_gprs_esp_m7;
    hwm_cpu_gprs_eax = hwm_cpu_gprs_esp_a1;
    *(hwm_cpu_gprs_esp_m7) = hwm_cpu_gprs_eax;
    *(hwm_cpu_gprs_esp_m6) = hwm_cpu_gprs_ebx;
    *(hwm_cpu_gprs_esp_m5) = hwm_cpu_gprs_ecx;
    hwm_cpu_gprs_ebx = hwm_cpu_gprs_eax;
    hwm_cpu_gprs_edx = 0;
    t_i = hwm_cpu_gprs_edx;
}

/*@ relational \forall uint32_t x1,x2; \callset(\call(pre_source,x1,id1),\call(
      pre_target,x2,id2)) ==> x1 == x2 ==>
   \at(i, Pre_id1)== \at(t_i, Pre_id2) ==>
   \at(i,Post_id1) == \at(t_i,Post_id2);
*/
```

FIG. 19

2000

```
...
/*@
    assigns flag_source \from flag_source, i;
*/
void cond_source(uint32_t slab_id){
    if (i<PAE_MAXPTRS_PER_PML4T){
        flag_source = true;
    }
}

/*@
    assigns hwm_cpu_gprs_eax \from hwm_cpu_gprs_eax;
    assigns hwm_cpu_zf \from hwm_cpu_zf;
    assigns hwm_cpu_cf \from hwm_cpu_cf;
    assigns flag_target \from flag_target, t_i;
*/
void cond_target(uint32_t slab_id){
    hwm_cpu_gprs_eax = t_i;
    if(512 == hwm_cpu_gprs_eax) {
        hwm_cpu_zf = 1;
        hwm_cpu_cf = 0;
    } else if(512 < hwm_cpu_gprs_eax) {
        hwm_cpu_zf = 0;
        hwm_cpu_cf = 1;
    } else {
        hwm_cpu_zf = 0;
        hwm_cpu_cf = 0;
    }
    if (hwm_cpu_cf == 0 && hwm_cpu_zf == 0) {
        flag_target = true;
    }
}

/*@ relational \forall uint32_t x1,x2; \callset(\call(cond_source, x1, id1),\call(
     cond_target, x2, id2)) ==> x1 ==  x2 ==>
    \at(i, Pre_id1)== \at(t_i, Pre_id2)
    && \at(flag_source, Pre_id1)== \at(flag_target, Pre_id2) ==>
    \at(flag_source,Post_id1) == \at(flag_target,Post_id2);
*/
```

2001 (cond_source), 2002 (cond_target)

FIG. 20

SYSTEM AND METHODS FOR END-TO-END PROVABLE GUARANTEES FOR SAFETY CRITICAL COMPUTER PLATFORMS

RELATED APPLICATIONS

This application claims priority to U.S. Provisional Application No. 63/735,870, filed Dec. 18, 2024, and is entitled to the benefit thereof. The entire contents of the provisional application are incorporated herein by reference.

TECHNICAL FIELD

The present disclosure relates to at least the field of design of computer platforms including cybersecurity.

BACKGROUND ART

The subject matter discussed in the background section should not be considered prior art merely because of its mention in the background section. Similarly, a problem mentioned in the background section or associated with the subject matter of the background section should not be considered to have been previously recognized in the prior art. The subject matter in the background section merely represents different approaches, which in and of themselves, may also correspond to claimed embodiments.

The development of safety-critical computer platforms has become increasingly complex, and with it comes an even greater need for assurance that the computer platform behaves as intended and is secure. Safety-critical computer platforms are particularly vulnerable to errors or malicious attacks, which can have devastating effects on users, society, and the economy. As a result, significant effort has been devoted to developing methodologies and toolchains aimed at producing such computer platforms with high assurance.

Prior art has achieved results by producing fully verified software components that provide guarantees at the source-language level. Compilers, in particular, have been shown to contain bugs that can compromise the entire compilation pipeline, making it essential to formally verify assembly code.

Despite these advances, there remain two main approaches to bringing guarantees all the way down to the operational instruction level ((e.g., Assembly language instruction, byte-code instruction, digital circuit state-machine instruction etc.) on safety critical computer platforms: custom generation pipelines and certified compilers. Custom generation pipelines generate Assembly code together with proofs, which can either prove that the assembly code refines the source code or that it satisfies certain desired properties. However, this approach typically requires programmers to develop applications in a special language, leading to a high learning curve and cost.

Certified compilers, on the other hand, have been shown to preserve source-level properties down to compiled binaries. However, most certified compilers only support limited architectures, such as 32-bit x86, which limits their applicability. Furthermore, even if certified compilers were available for more complex architectures, they would still require significant effort and resources to develop.

It is therefore the objective of the present invention to develop a revolutionary approach to mathematically verifying key security properties for safety-critical computer platforms down to the operational instruction level, without relying on custom generation pipelines or certified compilers.

In U.S. Pat. No. 8,627,414 issued Jan. 7, 2014, inventors McCune et al. disclose a computer including a processor and a verification device. The processor in the computer performs the steps of authenticating a secure connection between a hypervisor and the verification device, measuring the identity of at least a portion of a select guest before the select guest executes any instruction, and sending a measurement of the identity of the select guest to the verification device. The verification device compares the policy stored in the verification device with the measurement of the select guest received by the verification device. The steps of authenticating, measuring, sending, and comparing are performed after receiving a signal indicative of a request to execute the selected guest and without rebooting the computer.

In U.S. Pat. No. 12,093,367 issued Sep. 17, 2024, inventor Amit Vasudevan discloses a system architecture that structures commodity heterogeneous interconnected computer platforms around universal object abstractions, which are a fundamental system abstraction and building block that provides practical and provable end-to-end guarantees of security, correctness, and timeliness for the platform.

In U.S. Pat. No. 12,367,328 issued Jul. 22, 2025, the entirety of which is incorporated herein by reference, inventors Amit Vasudevan et al., disclose systems and methods for mathematical modeling of the hardware and software stack of commodity computer platforms. The mathematical model provides provable guarantees on memory, device, and program execution. This approach addresses the technical problem of reliance on system agents that rely on implicit trust in the operating environment, which can be exploited by sophisticated attackers using complex threats such as memory access exploits and code/data integrity exploits. The solution provides a proactive, mathematically-backed security solution that eliminates entire classes of cyberattacks by design, ensuring provable guarantees on commodity computer platforms running hardware and software stack elements at the lowest operating level. This approach has significant advantages over reactive cybersecurity methods, including reduced complexity and overhead, and increased confidence in the integrity of the system. The solution's main uses include providing mathematically-backed security and availability guarantees for critical infrastructure, financial institutions, and other organizations vulnerable to cyberattacks.

In U.S. patent application Ser. No. 19/254,764 filed on Jun. 30, 2025, the entirety of which is incorporated herein by reference, inventors Amit Vasudevan et al., disclose systems and methods for providing unforgeable telemetry on computer platforms. Mathematical modeling and theorem proving are utilized to guarantee the integrity of telemetry probe execution flow and trigger, thereby preventing circumvention and tampering of logged probe data. In contrast to current state-of-the-art solutions that rely implicitly on the operating environment, this approach provides a sound and complete assurance of telemetry output. The system enables organizations to map unforgeable telemetry probe data to industry and government cybersecurity regulatory controls, ensuring compliance therewith. This invention addresses the shortcomings of existing solutions, including their vulnerability to sophisticated attacks, operational complexity, and inability to provide unforgeable telemetry data, thereby providing a reliable and accurate monitoring output in the presence of cyberattacks on computer platforms.

In PCT Patent Application PCT/US 24/13463 filed on Jan. 30, 2024, the entirety of which is incorporated herein by reference, inventors Amit Vasudevan et al., disclose a formalized programming framework using memory compartmentalization and other properties of certified compilers to provide that security guarantees verified at the source level also hold on the compiled code. A trusted execution environment formulated as a collection of objects that access separate memory locations and conform to a public interface.

SUMMARY

A system and methods are disclosed for end-to-end provable guarantees for safety critical computer platforms. The technical problem addressed by this invention is the need to provide assurance that a complex safety-critical computer platform behaves as intended and is secure, particularly in safety-critical contexts where errors or malicious attacks can have devastating effects. Despite advances in methodologies and toolchains for high-assurance software production, there remains a significant gap between theoretical guarantees and practical implementation at the operation instruction level (e.g., Assembly language instruction, byte-code instruction, digital circuit state-machine instruction etc.). The present invention overcomes this limitation by providing a system for verifying key security properties for safety-critical computer platforms at the operation instruction level without reliance on custom generation pipelines or certified compilers, thereby enabling the practical development of more secure and reliable computer platforms.

A first aspect relates to a system for verifying a computer platform via verification of a set of program execution elements (PEEs), the computer platform comprising the set of PEEs, the system comprising: at least one processor; and a non-transitory computer-readable storage medium having stored thereon code executable by the at least one processor, the code comprising a set of compilers for compiling the set of PEEs into operational instructions that accomplish operational semantics of each PEE; a PEE lifting mechanism to lift the operational instructions into an idiomatic code representation (ICR); and a PEE verification mechanism that enforces a compartmentalization security mechanism (CSM) that preserves properties verified at a respective source level of each respective PEE in the set of PEEs down to the operational instructions of the respective PEE generated by the set of compilers.

In some embodiments, for each PEE, the respective source level is selected from the group consisting of (i) source at level of high-level programming language, (ii) source at level of intermediate programming language, and (iii) source at level of low-level programming language.

In some embodiments, the CSP is enforced on the ICR of the set of PEEs.

In some embodiments, a first PEE in the set of PEEs comprise one or more functions as units of execution.

In some embodiments, the properties verified at the respective source level of the first PEE applies to verifying properties of individual PEE functions for a set of specifications. In some embodiments, the PEE verification mechanism further checks properties of the PEE functions and corresponding ICR that guarantee one or more of the group consisting of a behavior property, a security property and timing property.

In some embodiments, the system is further comprising an ICR code generator that generates verified operational instructions of a first PEE in the set of PEEs from the corresponding ICR. In some embodiments, the operational instructions are selected from the group consisting of (i) intermediate representation instruction, (ii) Assembly language instruction, (iii) machine code instruction, (iv) byte-code instruction, and (v) digital circuit state-machine instruction.

In some embodiments, the ICR provides pseudo-functions corresponding to the operational instructions of a first PEE in the set of PEEs. In some embodiments, the PEE lifting mechanism replaces the operational instructions of the first PEE with corresponding ICR functions. in some embodiments, the PEE verification mechanism replaces the ICR functions with corresponding code from an ICR hardware model and performs verification of specification.

In some embodiments, each PEE in the set of PEEs comprises one or more PEE components selected from the group consisting of (i) an identifier, (ii) an indication of the language in which the PEE is implemented, (iii) an exclusive set of computer platform resources including an exclusive memory address space where PEE code, data, stack, heap and memory regions are stored, (iv) a set of initialization functions that initializes the respective PEE, (v) a set of public functions that expose a PEE API, (vi) a set of ICR functions, and (vii) a set of internal function declarations. In some embodiments, a first PEE in the set of PEEs guarantees that, for any public function in the set of public functions, when a pre-condition is met upon invoking said public function, a post-condition shall hold upon return from said public function. In some embodiments, a set of public functions of concurrent PEEs is invoked in parallel. In some embodiments, a first PEE in the set of PEEs has an exclusive set of computer platform resources and the set of computer platform resources is protected from direct access by other PEEs in the set of PEEs. In some embodiments, the protection of the set of computer platform resources is achieved via capabilities provided by the other PEEs, verification of the other PEEs for resource separation, or a combination of both.

In some embodiments, the code further comprises a mathematical model, the mathematical model implementing a method based on relational separation logic that allows for reasoning about PEEs at the ICR level with support for concurrent execution and external calls. In some embodiments, wherein the mathematical model further comprises operational semantics for an imperative language that comprises of one or more of the group consisting of (a) an internal step to execute instructions within an abstract PEE, (b) an external call to handle any external call from an abstract PEE, (c) external return to return from external call, and (d) halt.

In some embodiments, the PEE verification mechanism uses, as a verification tool, at least one of the group consisting of a theorem prover, a SAT solver, an SMT solver, and a model checker.

A second aspect relates to a method for providing end-to-end provable guarantees for a computer platform, the method comprising acts of: providing a mathematical model of the computer platform, the mathematical model including a formal representation of a set of program execution elements (PEE); translating PEE operational instructions that accomplish operational semantics of a respective PEE into an idiomatic code representation (ICR), wherein the mathematical model is based on relational separation logic that allows for reasoning about the PEEs at an ICR level with support for concurrent execution and external calls; providing a verification method that verifies categories of properties including one or more of the group consisting of relational properties, second properties, and third properties, wherein if the verification method verifies the relational properties, the relational properties are verified using relational reasoning showing PEE source and ICR access computer platform resources in the same way, if the verification method verifies the relational properties and the second properties, the second properties are verified at a source level proven to hold at the ICR level via established relational properties, and if the verification method verifies the third properties, the third properties are directly verified at the ICR level.

In some embodiments, each of the categories of properties include one or more of security properties, timing properties, and functional correctness properties.

In some embodiments, the ICR provides pseudo-functions corresponding to the operational instructions of the respective PEE.

In some embodiments, each PEE in the set of PEEs comprises one or more PEE components selected from the group consisting of (i) an identifier, (ii) an indication of the language in which the PEE is implemented, (iii) an exclusive set of computer platform resources including an exclusive memory address space where PEE code, data, stack, heap and memory regions are stored, (iv) a set of initialization functions that initializes the PEE, (v) a set of public functions that expose a PEE API, (vi) a set of ICR functions, and (vii) a set of internal function declarations. In some embodiments, a first the PEE in the set of PEEs guarantees that, for any public function in the set of public functions, when a pre-condition is met upon invoking said public function, a post-condition shall hold upon return from said public function. In some embodiments, providing the verification method further comprises annotating public functions of a first PEE with one or more invariants from the group consisting of behavior, security, and timing. In some embodiments, wherein the invariants further comprise: every function within the first PEE satisfies its pre- and post-conditions, every PEE function reads and writes from its stack and assigned heap, and every PEE function operates within its own prescribed stack frame and does not touch a return address or the stack frame of other functions. In some embodiments, providing the verification method further comprises annotating ICR functions of a first PEE with one or more invariants from the group consisting of behavior, security, and timing. In some embodiments, the invariants further comprise: every function within the first PEE satisfies its pre- and post-conditions, every PEE function reads and writes from its stack and assigned heap, and every PEE function operates within its own prescribed stack frame and does not touch a return address or the stack frame of other functions. In some embodiments, providing the verification method involves evaluating the annotations of public functions of a first PEE, ICR functions or a combination of both using verification tools. In some embodiments, using the verification tools comprises using one or more of the group consisting of theorem provers, SAT solvers, SMT solvers, and model checkers. In some embodiments, providing the verification method further comprises verifying interface preserving invariants for a source function and a target function using relational separation logic comprising a quadruple (i) pre-condition which is a relation between two memory states, (ii) post-condition abbreviates the functions, (iii) return value of statement in the source function, and (iv) return value of the statement in the target function, and the source function is chosen from the set of PEE public functions and the target function is chosen from the corresponding ICR pseudo-function.

In some embodiments, providing the verification method comprises verifying the relational properties; the verifying the relational properties comprises determining relational properties to establish equivalence of variables across different parts of the code; and said relational properties comprise four types, the four types being (i) equivalence of values before each part, (ii) equivalence of values after executing each part, (iii) equivalence of loop conditions assuming equivalent heap locations, and (iv) equivalence of flags used to track execution of loops.

In some embodiments, providing the verification method comprises providing a behaviour equivalence verification method that (a) determines a loop invariant for each "while" loop in PEE code of a first PEE in the set of PEEs, wherein said loop invariant comprises four parts, the four parts being (i) code before the loop, (ii) code within the loop body, (iii) loop condition, and (iv) code after the loop; (b) establishes equivalence of each part separately, wherein said equivalence is determined by comparing corresponding variables across different parts of the PEE code; and (c) infers equivalence of the two PEEs as a whole from the equivalence of these parts.

In some embodiments, the method further comprises determining the relational properties to establish equivalence of external calls, the relational properties comprising (i) execution of a first PEE at the source level and the ICR level generates the same trace of external function calls, (ii) same arguments are passed to corresponding external functions, and (iii) values stored in exclusive heap of the first PEE at the source level and the ICR level are equivalent before each external call. In some embodiments, the method further comprises utilizing ghost variables to track execution of external calls.

In some embodiments, the method further comprises using the relational properties to establish equivalence of values stored in exclusive heap locations.

In some embodiments, providing the mathematical model further comprises providing the mathematical model with operational semantics for an imperative language that comprises one or more of the group consisting of (a) internal step to execute instructions within an abstract PEE, (b) external call to handle any external call from an abstract PEE, (c) external return to return from external call, and (d) halt.

A third aspect relates to a system for providing end-to-end provable guarantees for a computer platform, the system comprising at least one processor; and a non-transitory, computer-readable storage medium having stored thereon executable instructions that, when executed by the at least one processor, cause the at least one processor to perform operations comprising acts of providing a mathematical model of the computer platform, the mathematical model including a formal representation of a set of program execution elements (PEE);

translating PEE operational instructions that accomplish operational semantics of a respective PEE into an idiomatic code representation (ICR), wherein the mathematical model is based on relational separation logic that allows for reasoning about the PEEs at an ICR level with support for concurrent execution and external calls; and providing a verification method that verifies categories of properties including one or more of the group consisting of relational properties, second properties, and third properties, wherein if the verification method verifies the relational properties, the relational properties are verified using relational reasoning showing PEE source and ICR access computer platform resources in the same way, if the verification method verifies the relational properties and the second properties, the second properties are verified at a source level proven to hold at the ICR level via established relational properties, and if the verification method verifies the third properties, the third properties are directly verified at the ICR level.

A fourth aspect relates to a non-transitory computer-readable medium comprising executable instructions stored thereon and comprising a set of program execution elements (PEEs), the set of PEEs including a subset of SSM PEEs for enforcing system security mechanisms (SSMs), wherein the SSM PEEs, when analyzed, exhibit end-to-end provable guarantees, and a compartmentalization security mechanism (CSM).

In some embodiments, the CSM comprises a noninterference mechanism.

In some embodiments, the SSM PEEs, when analyzed, exhibit equivalence at the syntactic and semantic levels when comparing idiomatic code representation (ICR) structural elements of an ICR corresponding to the SSM PEEs.

In some embodiments, the SSM PEEs, when analyzed, exhibit bastion interfaces.

In some embodiments, the SSM PEEs, when analyzed, exhibit relational separation logic.

In some embodiments, the SSM PEEs, when analyzed, exhibit relational properties showing (i) PEE source and (ii) an idiomatic code representation (ICR) corresponding to disassembled binary code of the SSM PEEs access computer platform resources in the same way. In some embodiments, the SSM PEEs, when analyzed, exhibit a source level proven to hold at the ICR level via the relational properties.

A fifth aspect relates to a non-transitory computer-readable medium comprising executable instructions stored thereon, wherein the executable instructions, when analyzed, exhibit a plurality of predetermined system security mechanism characteristics. In some embodiments, the predetermined system security mechanism characteristics comprise one or more structural properties of the executable instructions. In some embodiments, the predetermined system security mechanism characteristics are detectable using static program analysis. In some embodiments, the predetermined system security mechanism characteristics comprise cryptographic verification data embedded in the executable instructions.

A sixth aspect relates to a computing system comprising a processor; and a non-transitory computer-readable medium storing executable instructions that exhibit a plurality of predetermined system security mechanism characteristics.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures may be represented by a numeral. For purposes of clarity, not every component may be labeled in every drawing. In the drawings:

FIG. 5 shows an embodiment 500 to lift operational instruction Assembly code to C language using ICR;

FIG. 6 shows an embodiment 600 to lift operational instruction Assembly code to C language for a high-assurance OS kernel using ICR;

FIG. 7 shows a system 700 for Relational Separation Logic Operational Semantics according to some embodiments;

FIG. 8 shows a system 800 for Relational Separation Logic Quadruple definition according to some embodiments;

FIG. 9 shows a system 900 for Relational Separation Logic Rules according to some embodiments;

FIG. 11 shows an embodiment 1100 to verify stack frame isolation for ICR functions;

FIG. 13 shows an embodiment 1300 for Observational equivalence for two simple functions in the C high-level programming language;

FIG. 14 shows an embodiment 1400 for Observational equivalence for two programs with while loops;

FIG. 15 shows an embodiment 1500 for Observational equivalence for two programs with external function calls;

FIG. 17 shows an embodiment 1700 for verifying PEE functional correctness according to some embodiments;

FIG. 18 shows an embodiment 1800 for verifying guest memory initialization function within a trusted execution environment;

FIG. 19 shows an embodiment 1900, for verifying pre-loop observational equivalence using a relational property verification tool;

FIG. 20 shows an embodiment 2000 for verifying loop condition observational equivalence using a relational property verification tool.

DETAILED DESCRIPTION

Figure 1:
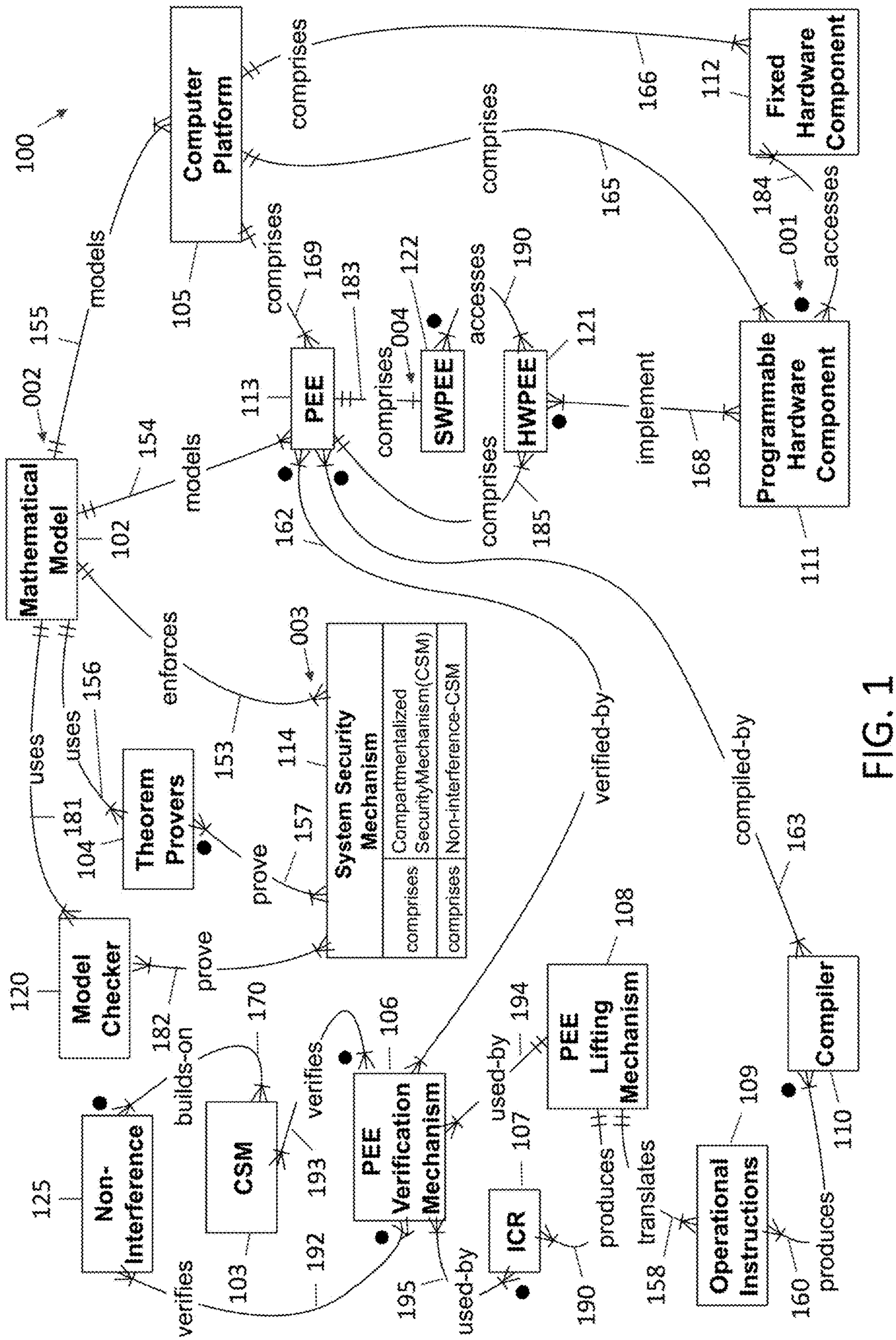
FIG. 1 shows a system 100 for end-to-end provable guarantees for safety-critical computer platforms, according to some embodiments.

The inventors have recognized and appreciated the need for end-to-end provable guarantees for safety critical computer platforms.

Vulnerabilities in safety-critical computer platforms can have devastating effects. Therefore, much effort has been put into developing methodologies and toolchains aimed at producing computer platform software with high assurance. Some projects produced fully verified software components that provide guarantees at the source-language level. Despite advances in methodologies and toolchains for high-assurance software production, there remains a significant gap between theoretical guarantees and practical implementation at the operation instruction level (e.g., Assembly language instruction, byte-code instruction, digital circuit state-machine instruction etc.) especially for computer platforms with both programmable hardware components (PHC) and software components.

The system security mechanisms (SSMs) are defined and proven in the mathematical model of the computer platform at design time, and enforced at runtime on individual functions of the underlying computer platform hardware and software stack implementation composed of program execution elements (PEEs).

In some embodiments, the PEEs may include a set of hardware program execution elements (HWPEEs) that can be implemented using various technologies such as Field-Programmable Gate Arrays (FPGAs), digital circuits, combinatorial circuits, or other suitable hardware architectures. The HWPEEs can define and implement internal functionality and operations of various components within the computer platform, including processors (CPU, GPU, NPU etc.), non-transitory computer-readable storage media controllers, and peripherals.

In another embodiment, the PEEs may include a set of software PEEs (SWPEEs), each of which are executable by the at least one processor that is implemented via one or more HWPEEs, and have a respective privilege level, and in a respective memory address space.

It is crucial to formally verify code at the operational level for the entire computer platform because compilers have been known to contain bugs. Furthermore, attackers have successfully targeted and compromised the compilation pipeline.

The disclosed invention provides security guarantees for safety-critical computer platforms, at the operation instruction level. The computer platform encompasses, PHC (including CPU, GPU and peripheral functionality), firmware, hypervisors, OS kernels, system libraries and applications that carry our safety critical tasks.

There are two main approaches to bring guarantees all the way down to the operational instruction level. The first is to use a custom generation pipeline to automatically generate operational instruction level code together with proofs, which can either prove that the operational instruction level code refines the source code or that it satisfies certain desired properties. This approach typically requires programmers to develop the PHC and software applications in a special language (e.g., F*, Dafny) to use the generation pipeline (e.g., Vale). In some cases especially for PHC and system software applications developing in the special language is not possible. In other cases, using the special language leads to a high learning curve and cost.

The second is to leverage certified compilers that preserve source-level properties down to the compiled operational instruction level code. This approach works as long as one can find certified compilers that meet their specific needs, such as supported source languages and architectures. However, most certified compilers only support limited architectures.

The present invention overcomes this limitation by providing a system for verifying key security properties for safety-critical computer platforms at the operation instruction level without reliance on custom generation pipelines or certified compilers, thereby enabling the practical development of more secure and reliable computer platforms.

The disclosure provides a way to directly verify the correspondence between the source (written in a high-level language such as Spinal-HDL, C, C++, Java, Rust) and target operational instruction code (Verilog IR, Assembly language etc.) via relational verification. The relational verification allows us to state that two programs relate to each other given a mapping between their respective states.

The disclosed invention utilizes relational reasoning to verify equivalences in the observable behavior of source and target operational instruction code. The invention comprises a method that models target operational instruction code using an idiomatic code representation (ICR), to reflect the target operational instruction code into a ICR program. Then, we apply relational verification tools to establish an observational equivalence between the source program and its ICR version.

The disclosure also provides a way to lower the cost of verification, by using novel techniques to reason about loops, which obviates the need for loop invariants. The approach ultimately allows us to develop an efficient compilation validation system to bring specific security properties down from the source to the target operational instruction code all while using existing compilers for the source. This provides a practical approach to targeting a variety of PHC and software applications that have their own compiler toolchains. This system also provides a way to verify properties directly on the ICR in addition when the source does not have existing tooling to verify properties.

The invention comprises a compartmentalization paradigm to reduce verification costs in the context of multi state-machine concurrency (e.g., multi CPU, multi GPU). In particular, each module (compartment) can be verified and compiled in isolation and then the system proves that the compositional concurrent execution of these compartments at the operational instruction code level satisfies the properties verified in isolation at the source level or the ICR level. To achieve this, the invention includes a method for relational separation logic that allows for reasoning about external function calls (inter-compartment calls).

The disclosed invention establishes three types of properties on safety critical computer platforms: The first type are relational properties verified using relational reasoning (e.g., the source code and target operational instruction code access the heap in the same way); The second are those that are verified at the source code level and can be proven to hold for the target operational instruction code level via the established relational properties (e.g., security properties); The third includes properties that must be directly verified for the target operational instruction code. With the aforementioned three types of properties satisfied, the concurrent execution of the operational instruction code satisfies key security properties. Because of compartmentalization, where each compartment is a unit for compilation and verification, the disclosed framework can be seamlessly integrated into a development pipeline that uses multiple disparate compilers (e.g., a PHC compiler and a software C compiler).

The system and methods may include an "Compartmentalization Security Mechanism (CSM)" that regulates interactions between PEEs. In one embodiment, the CSM regulates interactions between potentially malicious PEEs and the rest of the PEEs in the computer platform. CSM achieves this by designating strict boundaries (called "bastion interfaces") around computer platform resources. Bastion interfaces prevent unauthorized access to computer platform resources by other (potentially malicious) PEEs. A key aspect of CSM is the use of mathematical adversary modeling, which involves creating detailed models of potential attackers and their possible actions, allowing for the anticipation and mitigation of all possible non-deterministic adversarial inputs that could be directed at each bastion interface. By tying each bastion interface to a comprehensive set of potential adversarial scenarios, the CSM can ensure that the system is resilient to even the most sophisticated and unpredictable attacks including zero-day attacks.

The CSM can be embodied in various forms to protect different layers of a computer platform. For example, in a hypervisor-based embodiment, the CSM can be implemented as a module within the hypervisor, allowing it to regulate interactions between virtual machines and the hardware components, which may include hardware program execution elements (HWPEEs) such as Field-Programmable Gate Arrays (FPGAs), digital circuits, or combinatorial circuits. In another embodiment, the CSM can be implemented in a processor or peripheral, providing an additional layer of security against malicious attacks targeting the processors' and peripheral's low-level interfaces, and interacting with HWPEEs to enforce secure communication protocols. In this case, the HWPEE may provide a set of processor instructions in order for other PEEs to execute and manipulate processor state. Additionally, the CSM can be implemented as a kernel module within an operating system, enabling it to enforce strict boundaries around platform resources and prevent malicious applications from compromising the platform, while also coordinating with software program execution elements (SWPEEs) to ensure secure execution of system calls.

In other embodiments, CSM can be applied to virtualization and containerization technologies to enhance the security of a computer platform. For instance, in a virtual machine-based embodiment, the CSM can be used to regulate interactions between the guest operating system and the host environment, preventing malicious code from escaping the virtual machine and compromising the host, by leveraging HWPEEs such as ASICs or digital circuits to monitor and control communication between the guest and host. Similarly, in a container-based embodiment, the SSM can be used to enforce strict boundaries around container interfaces, preventing malicious containers from accessing sensitive data or disrupting other containers within the same host, and interacting with SWPEEs to ensure secure execution of containerized applications. The CSM can also be used to coordinate the interactions between HWPEEs and SWPEEs, ensuring that the hardware and software components work together seamlessly to provide a robust security framework for the computer platform. By applying the CSM to these various technologies, it is possible to create a comprehensive security framework that protects safety critical computer platforms against a wide range of threats, and ensures secure cooperation between HWPEEs and SWPEEs.

A subset of the set of PEEs may be implemented in low-level programming languages such as Verilog, SystemVerilog, C, C++ and Assembly that offer fine-grained control over hardware resources and performance optimization capabilities, suited for programming functionality of hardware components and software components such as kernels and high-performance applications. A subset of the set of PEEs may be implemented in a high-level programming language such as Python, Rust and Java that have designed-in features of memory safety guarantees and type systems that help prevent common vulnerabilities and ensure integrity of code execution.

In some embodiments, the system comprises a computer platform including HWPEEs and SWPEEs modeled mathematically. The SSMs comprise stack safety with PEEs, data safety within PEEs, code safety within PEEs, heap safety within PEEs, privilege separation between PEEs.

In some embodiments, the subset of the set of PEEs that are implemented in low-level programming languages may enforce one or more SSMs.

In other embodiments, the subset of the set of PEEs that are implemented in high-level programming languages may enforce one or more SSMs.

In one embodiment, a combination of the subset of PEEs implemented in low-level programming language and the subset of PEEs implemented in high-level programming language may enforce one or more SSMs In some embodiments, the subset of the set of PEEs that are implemented in low-level programming languages may utilize a mathematical model of the computer platform to define and prove the enforcement of one or more SSMs.

In other embodiments, the subset of the set of PEEs that are implemented in high-level programming languages may utilize a mathematical model of the computer platform to define and prove the enforcement of one or more SSMs.

In one embodiment, a combination of the subset of PEEs implemented in low-level programming language and the subset of PEEs implemented in high-level programming language may utilize a mathematical model of the computer platform including the PEEs to define and prove the enforcement of one or more SSMs The mathematical model specification of a computer platform may define operational aspects of the platform's hardware elements and software stack elements via PEEs running on the computer platform. The PEEs may be composed of functions as execution units. Additionally, the mathematical model further specifies the composition of the subset of PEEs implemented in low-level programming language and the subset of PEEs implemented in high-level programming language to collectively enforce one or more SSMs.

Proving the SSMs comprises analyzing the mathematical invariants to determine whether the SSMs for the computing platform are satisfied, and upon a determination that the SSM are not satisfied, analyzing the mathematical invariants to generate a counter-example that shows that the SSMs do not hold for the computing platform PEEs. In cases where the SSMs do not hold for the computer platform, the counter-example may be used to correct the mathematical model specification such that the SSMs hold for the computer platform. Analyzing the mathematical invariants to determine whether the SSMs of the computer platform are satisfied can be achieved by encoding the SSM into a computer-assisted theorem proving system and using the computer-assisted theorem proving system to analyze the mathematical invariants to determine if the SSM are satisfied.

The system can encompass a plurality of software stack entities such as firmware, hypervisor, operating system kernel, application, libraries, and extensions thereof. The SSMs can be realized on the PEEs' implementation via modifications to the program element source code which is eventually compiled to the program element binary operations.

The system can also store platform configuration data and PEE on a non-volatile medium as system packages, which may further comprise one or more PEE source code files, one or more PEE binary executable files ("PEE binaries"), one or more PEE script executable files ("PEE scripts"), one or more configuration files that provide data for PEE and/or platform functionality, and other platform-specific configuration files.

The system and methods described herein may be implemented on various platforms, including but not limited to, Linux, Microsoft Windows, and other operating system environments. The hardware program execution elements (HWPEEs) can be embodied in a variety of forms, such as Field-Programmable Gate Arrays (FPGAs), digital circuits, combinatorial circuits, Application-Specific Integrated Circuits (ASICs), or other suitable hardware architectures. The system and methods described herein ensures that a computer platform is built with security in mind from the start.

This reduces the risk of vulnerabilities and improves the overall trustworthiness of the computer platform.

The system can be used in various industries where security is paramount, such as finance, healthcare, and government. The use of this technology will provide an added layer of protection for integrity of critical code and sensitive data and ensure that it remains confidential and secure at all times.

To detect whether a media or computer platform has been shipped with PEEs created using this invention, one possible technique involves locating the PEEs within the system and subjecting them to a rigorous verification process. This can be achieved by first identifying the program execution elements (PEEs) that are responsible for enforcing the System Security Mechanisms (SSMs) (SSM PEEs). Once identified, these SSM PEEs can be disassembled to extract their binary code, which can then be used to recreate their idiomatic code representation (ICR). The ICR is a high-level representation of the PEE's behavior, which can be used to verify the presence of the Compartmentalization Security Mechanism (CSM) property. By analyzing the ICR, it is possible to determine whether the PEEs have been designed and compiled using the approach outlined in this invention. The analysis involves comparing the ICR structural elements including the ICR statements that are part of the generated ICR and performing an equivalence check at the syntactic and semantic levels.

The verification process can be taken a step further by applying relational verification tools to the recreated ICR. These tools can be used to establish an observational equivalence between the original PEE code and its ICR representation, which can help to confirm whether the CSM property has been correctly implemented. Additionally, the ICR can be analyzed using formal methods, such as model checking or theorem proving, to verify that the SSMs are being enforced correctly. If the verification process confirms that the CSM property is present and correct, it provides strong evidence that the PEEs have been designed and compiled using this invention. Furthermore, the presence of specific artifacts, such as bastion interfaces or relational separation logic, within the ICR can serve as a "fingerprint" indicating that the PEEs have been created using this approach. By combining these techniques, it is possible to detect with high confidence whether a media or computer platform has been shipped with PEEs created using this invention, providing a valuable tool for ensuring the authenticity and security of safety-critical systems.

The secure construction processes (such as mathematical modelling, mathematical verification) disclosed herein generate software artifacts having objective, testable, and reproducible characteristics that are necessarily produced by performance of the disclosed processes. Such characteristics include, but are not limited to, structural, representational, cryptographic, and control-flow properties embodied in executable code, intermediate representations, binaries, or other software artifacts. The inventors have recognized that these characteristics distinguish software generated by the disclosed secure construction processes from software generated by conventional techniques, and that such characteristics are detectable post-generation without requiring access to the environment or location in which the software was generated. Accordingly, software artifacts generated by the disclosed processes constitute articles of manufacture that are identifiable as products made by the disclosed processes, including when such software artifacts are stored on non-transitory computer-readable media, distributed electronically, imported, sold, or offered for sale. In some embodiments, the characteristics may be identified using static analysis, symbolic analysis, disassembly, cryptographic verification, or other inspection techniques that do not require execution of the software artifact. The disclosed characteristics cannot be practically achieved in combination absent performance of the disclosed secure construction processes.

The following nomenclature is used herein:

Formal Representation: In the context of mathematical modeling, a formal representation refers to a mathematical or logical description of a system, process, or concept that is expressed using a rigorous, unambiguous, and well-defined syntax and semantics, allowing for automated analysis, verification, and validation. A formal representation typically involves the use of mathematical logic such as propositional logic, first-order logic or temporal logic, or other mathematical structures like graphs, automata, or algebraic equations, to describe the behavior, properties, or relationships within a system. This representation is "formal" in the sense that it adheres to a set of predefined rules, axioms, and inference mechanisms, enabling machine-based processing, reasoning, and verification, thereby ensuring accuracy, consistency, and reliability in the modeling and analysis of complex systems.

Predicate: In the context of mathematical modeling, a predicate refers to a propositional or first-order logical statement that assigns a property or attribute to an object, system, or state. Predicates are used to express conditions, relations, or constraints that must hold true for a particular situation or set of circumstances, and are often used in formal specifications, models, and proofs to reason about the behavior and properties of systems.

Proof obligations: In the context of mathematical modeling, proof obligations refer to the set of conditions or properties that must be formally proven or verified to ensure the correctness, consistency, and validity of a mathematical model or specification. These obligations typically arise from the axioms, definitions, and inference rules used in the model, and are often discharged using formal proof techniques, such as deductive reasoning, model checking, or theorem proving Theorem prover: In the context of mathematical modeling, a theorem prover refers to a software tool or system that assists in the formal proof and verification of mathematical statements or theorems. Theorem provers use logical and mathematical rules to check the validity of a proof, ensuring that it is correct and rigorous, and providing a high degree of confidence in the results. They are often used to verify the correctness of mathematical models, specifications, and algorithms, and to establish the soundness and completeness of formal systems. Theorem provers can be completely automated (i.e., require no user intervention) or interactive (i.e., require some amount of user intervention).

Model Checker: In the context of mathematical modeling, a model checker refers to a software tool or system that automatically verifies whether a given mathematical model or system specification satisfies certain properties or requirements. Model checkers use algorithms to exhaustively explore all possible states or behaviors of the system, checking if the desired properties hold true in every case. They are often used to detect errors, inconsistencies, or flaws in system designs, protocols, or software code, and to ensure that the system behaves as intended under various operating conditions. Like theorem provers, model checkers can also be completely automated or interactive.

Assume-guarantee interface confined mathematical reasoning: A way of mathematical reasoning about a computer platform by: (a) defining what each hardware element and software stack element of the computer platform expects from other hardware elements and software stack elements (assumptions); (b) defining what each hardware element and software stack element of the computer platform promises to deliver (guarantees); and (c) ensuring these assumptions and guarantees are clearly defined at the interfaces between hardware elements and software stack elements of the computer platform.

Invariant: In the context of mathematical modeling, an invariant refers to a property or quantity that remains unchanged or constant despite transformations, changes, or perturbations to the computer platform (an "immutable property"). Invariants are used to describe and analyze the behavior of complex systems, and can include quantities such as security, liveness, energy, time or symmetry, which remain preserved over time or under different conditions.

Trace: A trace refers to a record or log of the sequence of events, such as function executions, that occur during the execution of a computer program, allowing for the observation and analysis of the program's behavior. Traces are useful in testing and verification, as it enables comparison of the actual program behavior with a mathematical model, helping to ensure that the implementation conforms to the permitted functionality.

Security Mechanism: In the context of cybersecurity, a security mechanism refers to a specific technique, protocol, or control implemented to enforce or ensure a particular security attribute or characteristic of a system, network, or asset, such as encryption for confidentiality, access controls for integrity, or firewalls for availability. Security mechanisms are designed to protect against threats or vulnerabilities and are often evaluated based on their ability to enforce desired security behavior or constraints, which may be codified in a mathematical model or specification.

Programmable Hardware Component (PHC): Refers to a hardware element that can be configured or programmed to perform a specific function or task. PHCs can be implemented using various technologies, such as Field-Programmable Gate Arrays (FPGAs), Application-Specific Integrated Circuits (ASICs), digital circuits, or other programmable hardware devices. In some cases, these components can be reconfigured or reprogrammed to change their behavior or functionality, allowing for flexibility and adaptability in a wide range of applications.

Fixed Hardware Component (FHC): Refers to a hardware element that is designed to perform a specific function or task and cannot be changed or programmed. FHCs can include components such as connectors (e.g., RJ-45, USB, HDMI), interfaces (e.g., SD card slot), peripherals (e.g., keyboard, display), volatile and non-volatile storage media, memory or other non-programmable hardware devices. These components are typically designed to provide a specific function or interface and do not have the ability to be reconfigured or reprogrammed.

Program Execution Element (PEE): A Program Execution Element (PEE) refers to a self-contained unit of execution on the computer platform that represents a discrete environment for running code and managing computer platform resources, and enforcing security policies. A PEE can comprise a range of components, including applications, libraries, or other executable entities such as functions and objects, and may be implemented in various forms, such as a programmable hardware element, process, thread, container, virtual machine, or other isolated environment. PEEs can be composed of other PEEs, allowing for hierarchical organization and nested execution environments. Each PEE operates within its own defined boundaries, with its own set of resources, permissions, and security attributes.

HWPEE (Hardware Program Execution Element): Is a type of PEE that implements hardware component functionality or task. HWPEEs can be implemented using various PHC technologies, such as Field-Programmable Gate Arrays (FPGAs), Application-Specific Integrated Circuits (ASICs), digital circuits, or other programmable hardware devices. HWPEEs are designed to provide low-level hardware component functionality on the computer platform such as: bus processing, data processing, control logic, interface protocols, processors (processor and GPU), and peripheral functionality including network, storage and display management functionality. HWPEEs are often optimized for performance, power consumption, and area efficiency.

SWPEE (Software Program Execution Element): Is a type of PEE that implements a software component functionality or task. SWPEEs run on top of HWPEEs, and typically use HWPEEs that implement processors (processor and GPU) to carry out their functionality. SWPEEs are designed to provide high-level functionality, such as application logic, operating system services, libraries, or user interfaces.

Domain PEE (DPEE): A Domain PEE refers to a program execution element that operates within a contained environment, potentially executing code that is not entirely trustworthy. Domain PEEs may execute a wide range of code, including applications, services, or other programs, and are designed to be isolated from sensitive system components to prevent potential security breaches.

Bastion PEE (BPEE): A Bastion PEE (BPEE) refers to a program execution element that is designed to be highly secure and trustworthy, responsible for enforcing system security mechanisms and protecting against adversarial tampering. A BPEE acts as a robust guardian of the system, ensuring the integrity and confidentiality of sensitive data and computations. BPEEs are typically responsible for managing and overseeing other program execution elements, including Domain PEEs.

Keystone PEE (KPEE): A Keystone PEE refers to a specialized program execution element within the set of Bastion PEEs that is responsible for establishing the fundamental security mechanisms of the system. KPEEs perform critical functions such as setting up memory protections, configuring digital circuit states, configuring processor state, and initializing other essential security mechanisms. These PEEs provide the base layer of security upon which the rest of the system relies, ensuring the integrity and trustworthiness of the environment.

Program Code or Code: Program code or simply code refers to the set of operations written in a programming language that are executed to perform a specific task or achieve a desired outcome. Code can either be in binary format (encoded instructions interpreted by a processor or encoded operations within a digital circuit) or source format (encoded in a specific programming language such as Verilog, Spinal-HDL, C, Assembly, Java, Python or Shell scripts)

Operational aspects: The fundamental capabilities for each of the hardware elements and the software stack elements. The operational aspects of a memory may include, for example, read, write, and execute. The operational aspects of a processor may include executing instructions and manipulating hardware registers, The operational aspects of a peripheral may include input from a keyboard, mouse, camera etc, and output to a printer, disk or other forms of storage media. The operational aspects of a program execution element may include reading file, writing to a file and read/write from/to memory and peripherals.

Operational Instruction Code (OIC): Refers to the lowest level of code that is executed directly by a given PEE, without requiring further compilation or interpretation. OIC represents the fundamental instructions that are used to implement the operational aspects of the PEE. Examples of OIC include Assembly language code, byte-code, state-machine code, and machine code. For a HWPEE, the OIC may consist of state-machine code used to control the PHC that the HWPEE implements functionality on. For a processor-based PEE, the OIC may consist of processor instructions which are used to execute arithmetic and logical operations, control flow, and data transfer. For a peripheral-based PEE, the OIC may include low-level commands for interacting with the peripheral's hardware, such as reading or writing to a register, or transmitting data over a communication interface. In the context of a software-based PEE, the OIC may be represented by byte-code or intermediate language code that is executed by a virtual machine or interpreter.

PEE code region: A PEE code region or simple code region refers to a specific section or module within a PEE where certain functionality is implemented, such as data processing, authentication, or encryption, and can be defined by boundaries like functions, classes, objects, or namespaces.

Memory address: Refers to a unique identifier for a specific location in a storage resource where data can be stored or retrieved, essentially representing a single point of storage. This concept applies to various types of storage resources, including those implemented in HWPEEs using PHCs, as well as those managed by SWPEEs through physical and virtual memory mechanisms.

Memory region: Is a contiguous range of storage locations that are allocated for a particular purpose or set of data, effectively grouping multiple individual storage locations together. This concept is applicable to both HWPEEs and SWPEEs, where memory regions can be defined within the storage resources managed by PHCs or physical and virtual memory systems, respectively.

Memory address space: The entire collection of storage locations available to a PEE, encompassing all the possible storage addresses it can access, thereby defining its operational boundary. This concept applies to both HWPEEs and SWPEEs, where the memory address space can be defined by the storage resources implemented in PHCs or managed through physical or virtual memory mechanisms.

Memory: The overarching concept that encompasses all storage resources and address spaces available across an entire system or device, representing the total capacity for storing and retrieving data. This includes all forms of storage, such as physical storage media (e.g., RAM, ROM, flash), virtual storage areas (e.g., virtual memory, caching mechanisms), and storage resources implemented in PHCs (e.g., FPGA-based storage, ASIC-based storage). The concept of memory is generic and applies to both HWPEEs and SWPEEs, encompassing all types of storage resources and mechanisms used to manage data within a system or peripheral.

Compartmentalization Security Mechanism (CSM): A Compartmentalization Security Mechanism (CSM) regulates interactions between PEEs including PEEs that may be potentially malicious. CSM achieves this by designating a subset of the set of PEEs, to act as gatekeepers and enforce strict boundaries (called "bastion interfaces") around computer platform resources. A key aspect of CSM is the use of mathematical adversary modeling, which involves creating detailed models of potential attackers and their possible actions, allowing for the anticipation and mitigation of all possible non-deterministic adversarial inputs that could be directed at each bastion interface.

Trusted Path Security Mechanism (TPSM): A security mechanism that enforces intended patterns of computer platform operations without adversarial influence. Such computer platform operations can be one or more of memory access operations, peripheral access operations, processor operations including execution of processor instructions, and operations involving access and manipulation of processors (CPU or GPU), memory or peripheral state. TPSM therefore establishes secure code execution and reliable data communication pathways between PEEs and computer platform hardware, ensuring adversary-free, reliable and trustworthy interaction.

Low-level programming language: Low-level programming languages, such as C, C++, and Assembly, offer fine-grained control over hardware resources and performance optimization capabilities, making them well-suited for systems programming, embedded systems, and high-performance applications. Additionally, low-level programming languages also encompass Hardware Description Languages (HDLs) like Verilog and VHDL, which are used to design and program PHC. However, this level of control also comes with inherent security risks due to the lack of built-in memory safety features, type checking, and error handling mechanisms, making them more susceptible to vulnerabilities like buffer overflows, data corruption, and exploitation by malicious code.

High-level programming language: High-level programming languages such as Rust, Python and Java provide a foundation for building secure software systems by offering features such as memory safety guarantees, type systems, and formal verification mechanisms that help prevent common vulnerabilities and ensure the integrity of code execution. Additionally, many high-level programming languages also incorporate low-level programming language runtime components, such as C or Assembly code, to optimize performance, interact with hardware resources, or leverage existing libraries and frameworks, which can introduce potential security risks if not properly managed and isolated.

Intermediate-level programming language: Intermediate-level programming languages, such as bytecode, Intermediate Representation (IR), and register transfer language, occupy a middle ground between low-level and high-level languages, offering a balance between performance, portability, and security. Examples of intermediate-level languages include LLVM IR, Java bytecode, and .NET Common Intermediate Language (CIL). These languages provide a platform-agnostic representation of code that can be optimized, analyzed, and executed by virtual machines or just-in-time compilers.

System Package: System packages refer to collections of PEEs, including executables, libraries, scripts, and configuration files, that are necessary for the execution of a program or application on a computer platform. These PEEs may include FPGA bitstreams, operating system components, device drivers, firmware, and other software elements that enable the execution of a program or application. System packages provide a structured way to manage and distribute these PEEs, ensuring that all necessary elements are present and correctly configured for PEE execution.

Some of the disclosed embodiments provide advantages over traditional systems and methods of securing computer platforms:

1. Provable end-to-end guarantees: By enforcing SSMs all the way at the operational instruction code (OIC) level, the technology ensures that any SSM proven on a PEE source is automatically translated down to the OIC level.
2. Mathematical Modeling and Provable Security: The use of mathematical modeling incorporating adversarial modeling and computer-assisted theorem proving and model checking enables formal verification and validation of the SSMs, ensuring that they are satisfied in the presence of a sophisticated adversary. This provides a high level of confidence in the correctness and security of the system, reducing the risk of vulnerabilities and improving overall trustworthiness.
3. Compositionality and Scalability: The system of the present invention enables compositionally verified systems that can be rapidly and independently implemented, allowing new PEEs to be added without requiring complete re-verification to establish SSMs.

FIGS. 1-21 show diagrams for some embodiments of the systems and methods described herein. For purposes of discussion each of the diagrams is referred to as a system, however, it should be appreciated that discussed systems may also be implemented through corresponding methods. Some embodiments of the disclosed diagrams (whether through systems or methods) may not include all of the blocks shown in the corresponding diagram, or may include other blocks/steps not represented in the diagrams.

Each of the diagrams include blocks (e.g., blocks 102 and 104 in FIG. 1) and connecting lines (e.g., connecting line 156 in FIG. 1). Each block may represent, for example, stored information (e.g., a definition for a peripheral), an aspect of a method (e.g., a method step), or a module of the corresponding system. A module comprises the hardware and/or software, to implement a defined capability (e.g., the corresponding method step). For example, such a capability may be implemented through a module having one or more processors executing computer code stored on one or more non-transitory computer-readable storage medium. In some embodiments, a capability is implemented at least in part through a module having dedicated hardware (e.g., an ASIC, an FPGA). In some embodiments modules may share components. For example, a first function module and a second function module may both utilize a common processor (e.g., through time-share or multithreading) or have computer executable code stored on a common computer storage medium (e.g., at different memory locations). In some instances, a module may be identified as a hardware module or a software module. A hardware module includes or shares the hardware for implementing the capability of the module. A hardware module may include software, that is, it may include a software module. A software module comprises information that may be stored, for example, on a non-transitory computer-readable storage medium. In some embodiments, the information may comprise instructions executable by one or more processors. In some embodiments, the information may be used at least in part to configure hardware such as an FPGA. The capability of a software module may be implemented, for example, by reading the software module from a storage medium and executing it with one or more processors, or by reading the software module from a storage medium and using the information to configure hardware. "Mechanism" is used herein synonymously with module.

The relationship between blocks is illustrated by connecting lines. The termination of a connecting line indicates whether there may be multiple instances of a block present in the illustrated embodiment. Specifically, the symbol 002 (FIG. 1) indicates that the connection is to a single functional block while the symbol 003 indicates that the connection may be to multiple functional blocks. For example, connecting line 154 connects a single mathematical model 102 to one or more Program Execution Elements (PEE) 113. Unless explicitly stated otherwise, a connection with the symbol 002 is the starting point of the flow while the symbol 003 is the ending point of the flow for a given connecting line. For example, the flow of connecting line 154 is from the mathematical model 102 to PEE 113. For some connecting lines, the starting point of the flow is indicated via a shaded circle symbol 001. For example, connecting line 184 connects Programmable Hardware Component (PHC) 111 to Fixed Hardware Component (FHC) 112 and is read as one or more PHC 111 accesses one or more FHC 112. Solid connecting lines such as connection line 153 represent flow, interaction and dependency between various functional blocks. The symbol 004 (FIG. 2) indicates that the connection is to zero or more of a nested functional block. For example, in FIG. 2, connecting line 262 connects Domain PEE 205 to Domain PEE 205 and is read as one or more Domain PEE 205 comprises zero or more nested Domain PEE 205.

There are several types of connection lines. A "builds-on" connecting line (e.g., connecting line 170, FIG. 1) indicates that one component (e.g., a software module or cryptographic primitive) utilizes, extends, or relies on the functionality, security guarantees, or trust assumptions provided by another component, establishing a dependency or inheritance relationship between them. An "enforces" connecting line (e.g., connecting line 153, FIG. 1) indicates that one component (e.g., a security policy or access control mechanism) imposes restrictions, constraints, or rules on another component, ensuring compliance with specific security requirements or regulations. A "models" connecting line (e.g., connecting line 154, FIG. 1) indicates that one component (e.g., a formal specification or mathematical representation) provides an abstract or conceptual representation of another component, capturing its behavior, properties, or characteristics. An "accesses" connecting line (e.g., connecting line 184, FIG. 1) indicates that one component (e.g., a software process or thread) interacts with, retrieves data from, or manipulates another component, establishing a communication or data exchange relationship between them. A "uses" connecting line (e.g., connecting line 181, FIG. 1) indicates that one component (e.g., an application or service) utilizes, invokes, or depends on the functionality, services, or resources provided by another component, establishing a dependency or utilization relationship. A "prove" connecting line (e.g., connecting line 157, FIG. 1) indicates that one component (e.g., a formal proof or verification tool) demonstrates, validates, or establishes the correctness, soundness, or security of another component, providing a guarantee or assurance about its properties or behavior. A "comprises" connecting line (e.g., connecting line 183, FIG. 1) indicates that one component (e.g., a system, module, or framework) is composed of, consists of, or is made up of another component, establishing a whole-part or aggregation relationship between them, where the comprising component is the container or aggregate and the comprised component is the contained part. An "implement" connecting line (e.g., connecting line 168, FIG. 1) indicates that one component (e.g., a software module or system) provides a concrete realization or execution of another component's specifications, interfaces, or requirements, establishing a relationship where the implementing component puts into practice or carries out the functionality or behavior defined by the implemented component. A "verified-by" connecting line (e.g., connecting line XXX, FIG. X) indicates that one component (e.g., a software module or system) has its correctness, soundness, or security validated or confirmed by another component (e.g., a formal proof or verification tool), establishing a relationship where the verifying component provides assurance about the properties or behavior of the verified component. A "compiled-by" connecting line (e.g., connecting line 163, FIG. 1) indicates that one component (e.g., source code or high-level programming language) is transformed into another form (e.g., machine code or binary executable) by another component (e.g., a compiler or interpreter), establishing a relationship where the compiling component generates an implementation of the compiled component. A "used-by" connecting line (e.g., connecting line 194, FIG. 1) indicates that one component (e.g., a library, framework, or service) is utilized, invoked, or depended upon by another component (e.g., an application or system), establishing a relationship where the using component relies on the functionality, services, or resources provided by the used component. A "produces" connecting line (e.g., connecting line 160, FIG. 1) indicates that one component (e.g., a software module or system) generates, creates, or outputs another component (e.g., data, files, or objects), establishing a relationship where the producing component is the source of the produced component. A "translates" connecting line (e.g., connecting line 158, FIG. 1) indicates that one component (e.g., a compiler, interpreter, or converter) transforms or converts another component (e.g., code, data, or signals) from one form to another, establishing a relationship where the translating component enables communication or compatibility between different components or systems. A "verifies" connecting line (e.g., connecting line 193, FIG. 1) indicates that one component (e.g., a testing framework, validation tool, or proof assistant) checks, confirms, or ensures the correctness, soundness, or security of another component (e.g., software, hardware, or firmware), establishing a relationship where the verifying component provides assurance about the properties or behavior of the verified component.

A "contains" connecting line (e.g., connecting line 264, FIG. 2) indicates that one component (e.g., a data structure, container, or repository) holds, encompasses, or includes another component, establishing a relationship where the containing component provides a scope, boundary, or enclosure for the contained component, which may be a subset, element, or part of the containing component's overall content or composition.

A "derives" connecting line (e.g., connecting line 351, FIG. 3) indicates that one component (e.g., a data object or value) is obtained, calculated, or inferred from another component, which serves as its basis, source, or foundation. A "parameterizes" connecting line (e.g., connecting line 352, FIG. 3) indicates that one component (e.g., a software module, mathematical model or algorithm) is configured, customized, or controlled by another component, which provides input values, settings, or constraints that influence its behavior or output. A "confine" connecting line (e.g., connecting line 363, FIG. 3) indicates that one component (e.g., a security mechanism, access control system, or sandbox) restricts, limits, or bounds another component's scope, behavior, or interactions, establishing a relationship where the confining component imposes constraints or isolation on the confined component, preventing it from accessing, modifying, or interacting with other components or resources outside of its designated boundaries.

FIG. 1 shows a system 100 for end-to-end provable guarantees for safety-critical computer platforms, according to some embodiments. In system 100 computer platform 105 comprises one or more Fixed Hardware Component (FHC) 112, one or more Programmable Hardware Components (PHC) 111 and one or more Program Execution Elements (PEE) 113 (see connecting lines 166, 165 and 169 respectively). PEE 113 comprises one or more Software PEEs (SWPEE) 122 and one or more Hardware PEEs (HWPEE) 121 (see connecting lines 183 and 185 respectively). One or more SWPEE 122 accesses one or more HWPEE 121 (see connecting line 190). One or more HWPEE 121 implement one or more PHC 111 (see connecting line 168). One or more PHC 111 accesses one or more FHC 112 (see connecting line 184). A mathematical model 102 models one or more Computer Platform 105 and one or more PEE 113 (see connecting line 155 and 154 respectively). Mathematical model 102 enforces one or more System Security Mechanisms (SSM) s 114 (see connecting line 153) and uses one or more theorem provers 104 or one or more Model checkers 120 (see connecting lines 156 and 181 respectively) to prove SSMs 114 (see connecting line 157 and 182 respectively). SSMs 114 consist of Compartmentalized Security Mechanism (CSM) 103, and Non-interference 125 (for the sake of readability of FIG. 1, no connecting lines are drawn for these relationships). One or more PEEs 113 can be compiled-by one or more compilers 110 (see connecting line 163). One or more PEEs 113 can be verified-by one or more PEE Verification Mechanism 106 (see connecting line 162). One or more compilers 110 produces one or more operational instructions 109 (see connecting line 160). PEE Lifting mechanism 108 translates one or more operational instructions 109 (see connecting line 158). PEE lifting mechanism 108 produces one or more Idiomatic Code Representation (ICR) 107 (see connecting line 190) and is used by one or more PEE Verification mechanisms 106 (see connecting line 194). One or more ICR 107 is used by one or more PEE verification mechanisms 106 (see connecting line 195). One or more PEE verification mechanisms 106 verifies one or more CSM 103 and one or more non-interference 125 (see connecting lines 193 and 192 respectively). One or more non-interference 125 builds on one or more CSM (see connecting line 170).

PEEs 113 are self-contained units of code that execute independently within their own memory address space, providing a sandboxed environment to isolate application code from firmware, hypervisors, and other PEEs. This separation of concerns enables robust security, fine-grained control over code execution, and efficient management of program execution, making it an ideal solution for developing secure by design software applications.

The present invention utilizes generic compilers, such as GCC and clang, to facilitate the verification of System Security Mechanisms (SSMs) 114 on Program Execution Elements (PEEs) 113. To achieve this, the operational instructions of the PEEs are lifted to an Intermediate Code Representation (ICR) 107, enabling the use of existing off-the-shelf language verifiers to analyze the ICR. This approach provides an architecture-independent mechanism that can support multiple processor architectures and compilers, including those targeting various instruction set architectures (ISAs) such as x86, ARM, and RISC-V. An associated ICR model is employed for the desired architecture, wherein the operational instructions written in ICR are referred to as ICR functions corresponding to PEE functions.

The present invention comprises a series of high-level steps to verify the correctness of the PEEs. Initially, since the compiler is not trusted, relational verification is employed to establish that the PEE's high-level language functions behave identically to their compiled counterparts. To achieve this, the PEE's high-level language function and its corresponding ICR function are paired, and a proof is constructed to demonstrate that their behavior is equivalent with regard to access to global resources, such as the heap. This proof is based on Relational Separation Logic, which facilitates the handling of external function calls.

In a subsequent step, the ICR functions are verified to satisfy the stack isolation property, which requires that the function body does not access stack locations beyond the allocated stack frame or clobber its own stack. Additionally, the ICR functions are verified to respect their boundaries and access only their own exclusive resources. These properties are directly verified on the ICR functions.

In a further step, the high-level language implementation of the PEEs is verified to respect the interface, involving the verification that the PEEs respect their boundaries and access only their own exclusive resources at the source level. Moreover, the PEEs are verified to respect their specifications according to the pre- and post-conditions of each PEE function. Ultimately, the operational instruction code is shown to respect the specifications via relational reasoning, which establishes the behavioral equivalence between the high-level language implementation and the ICR code.

One embodiment of the present invention includes an Assembly code lifter, ICR hardware models covering a subset of 32-bit x86 ISA used for verification, and helper scripts for generating relational properties. Frama-C is employed for verification due to its modular architecture, which supports deductive verification, abstract interpretation, and relational reasoning. CompCert is utilized as the compiler for lifting the generated Assembly to ICR. In another embodiment of the present invention, a generic C compiler is used to lift the generated Assembly to ICR, providing an alternative approach to verifying the correctness of the PEEs.

Program Execution Elements (PEE)

In modern computing systems, multiple software components coexist and interact with one another to provide a seamless user experience. At the lowest level, firmware is responsible for initializing and configuring hardware components, such as memory management, I/O operations, and clocking. Firmware executes directly on the hardware, providing a bridge between the physical components and the operating system.

The next layer up is the hypervisor, also known as a virtual machine monitor, which creates and manages multiple virtual machines that run isolated OS instances. A hypervisor can be thought of as a "host" for multiple OS guests, allowing them to share the same physical hardware resources while maintaining separate execution environments. Above the hypervisor, one or more operating systems are installed, which provide a runtime environment for applications and system services. Within these operating systems, additional isolation mechanisms such as containers and namespaces can be used to further segregate applications and services, providing an extra layer of security and resource management.

However, current computing systems have several limitations and vulnerabilities due to their layered architecture. For instance, firmware and hypervisors can be vulnerable to attacks, as they often rely on outdated code and lack robust security features. Moreover, the complexity of modern operating systems makes it challenging to develop secure and efficient software applications.

Figure 2:
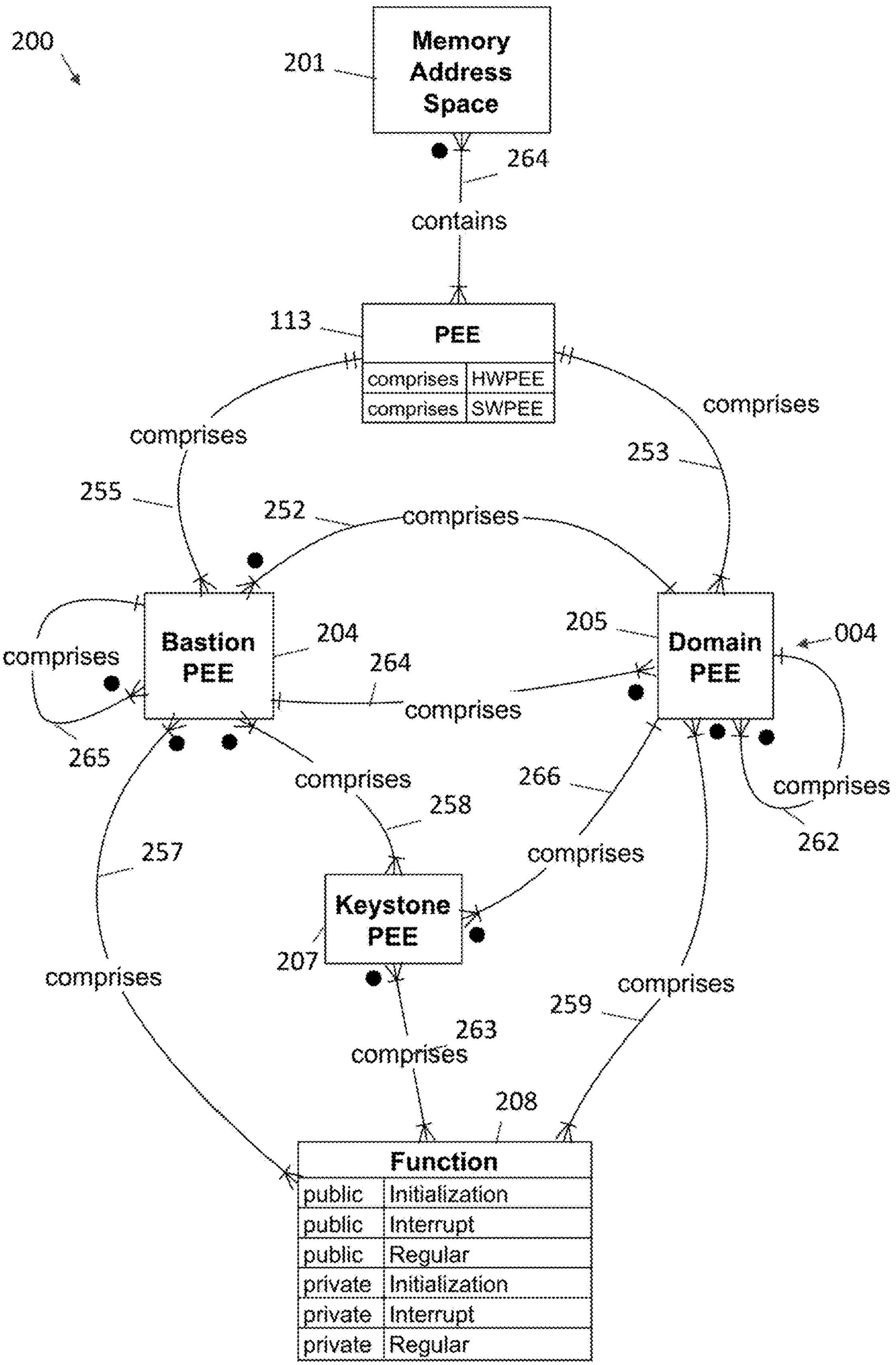
FIG. 2 shows a system 200 comprising program execution elements (PEE) 113 that execute on a computer platform 105 in a memory address space 201 and consists of multiple functions 208, according to some embodiments.

FIG. 2 shows a system 200 comprising PEEs 113 that executes on a computer platform 105 (see FIG. 1) in a memory address space 201. PEEs 113 consist of Hardware PEEs (HWPEE) 121 and Software PEEs (SWPEE) 122 (For the sake of readability of FIG. 2, no connecting lines are drawn for these relationships). In system 200 each PEE 113 executes across one or more memory address spaces 201 (see connecting line 264). PEE 113 may comprise one or more of Bastion PEE (BPEE) 204 (see connecting line 255) and one or more of Domain PEE (DPEE) 205 (see connecting line 253). DPEEs 205 are PEEs that operate within a memory address space 201 potentially executing code that is not entirely trustworthy. BPEEs 204 are PEEs that are designed to be highly secure and trustworthy, responsible for enforcing system security mechanisms and protecting against adversarial tampering. BPEEs act as a robust guardian of the system, ensuring the integrity and confidentiality of sensitive data and computations. BPEEs are typically responsible for managing and overseeing other program execution elements, including DPEEs 205.

DPEEs 205 are typically managed and overseen by Bastion PEEs 204, which provide protection and oversight to prevent malicious behavior. Domain PEEs may execute a wide range of code, including applications, services, or other programs, and are designed to be isolated from sensitive system components to prevent potential security breaches.

One or more BPEEs 204 comprises one or more Keystone PEE (KPEE) 207 (see connecting line 258). KPEEs are PEEs that ensure fundamental security mechanisms of the system. KPEEs perform critical functions such as setting up memory protections, configuring processor state, and initializing other essential security mechanisms. KPEEs provide the base layer of security upon which the rest of the system relies, and establish and maintain the constrained environment of DPEEs 205, ensuring the integrity and trustworthiness of the environment.

One or more BPEEs 204, DPEEs 205 and KPEEs 207 may further comprise (see connecting lines 257, 259 and 263 respectively) one or more functions 208 that addresses the aforementioned limitations. PEE functions 208 comprise public and private functions that perform initialization, service interrupts and handle regular processing.

In addition to containing functions, program execution elements (PEEs) can also be composed of other nested PEEs, allowing for a hierarchical organization of execution environments. One or more DPEEs may comprise zero or more nested DPEEs (see connecting line 262) and may comprise zero or more nested BPEEs (see connecting line 264). One or more BPEE may comprise zero or more nested BPEEs (see connecting line 265) and may comprise zero or more nested DPEEs (see connecting line 252). Similarly, one or more KPEE may comprise zero or more nested DPEEs (see connecting line 266). This nested structure enables complex scenarios where a PEE acts as a host or container for other PEEs, each potentially executing its own set of functions or further nested PEEs. An exemplary embodiment of such an organization is a PEE that represents a host kernel executing another PEE, which in turn is a container under the Linux operating system. This container PEE can then host a set of process PEEs that execute within the confines of the container, illustrating a layered approach to program execution where each layer is a distinct PEE. This capability to embed PEEs within one another facilitates flexible and efficient management of computational resources, enabling the present invention to support a wide range of application scenarios, from simple function executions to complex, distributed computing environments.

In system 200, each PEE 113 provides a sandboxed environment that isolates application code from firmware, hypervisors, and other PEEs. This separation of concerns enables robust security.

KPEEs 207 have the highest privilege in a given memory address space 201. BPEE 204 has a lower privilege than a KPEE 207 and may house operating kernels or hypervisors as well as dependent libraries in a given memory address space. Finally, DPEE 205 has a lower privilege level than both KPEE and BPEE and may house applications and supporting libraries. KPEEs 207 are responsible for loading other PEEs in a given memory address space.

PEEs 113 may further comprise one or more functions 208, which form the unit of functionality of the PEE. Each function can be a standalone entity that performs specific tasks or operations within the PEE. PEE functions 208 further comprises one or more initialization functions that are responsible for initializing the PEE, one or more interrupt functions to handle platform device interrupts, providing a way to interact with hardware elements and a set of regular functions that together accomplish PEE functionality. Public functions can be called from functions of other PEE, enabling inter-PEE communication and collaboration. Private functions are only callable from functions within the said PEE, ensuring secure access control.

PEE functions 208 can be embodied in various forms depending on the type of PEE. For example, if the PEE is a container, the public initialization function may be the container's first process main function, the public interrupt function may be the namespace interrupt handler, and the public regular functions may be container sockets providing services or named pipes or shared memory for inter-container communication. Similarly, if the PEE is a virtual machine (VM), the public initialization function can be the VM entry point, the public interrupt function can be the VM interrupt handler stubs, and the public regular functions can be VM downcalls or socket endpoints or shared memory. If the PEE is an operating system (OS) kernel, the public initialization function may be the kernel init function, the public interrupt functions may be kernel interrupt handlers, and the public regular functions may be kernel-provided system calls. If the PEE is a hypervisor, then the public initialization function may be the hypervisor init function, the public interrupt functions may be hypervisor interrupt handlers, and the public regular functions may be hypervisor-provided hypercalls. If the PEE is a HWPEE and is implementing a processor in the computer platform, then the public initialization function may be the function that initializes the PHC clocks and power systems, the public interrupt function may be the function that implements processor interrupt and trap handling mechanisms, and the regular functions may be processor-provided instructions that are available to use by other HWPEEs and SWPEEs. Finally, if the PEE is firmware, the public initialization function may be the firmware init function, the public interrupt functions may be firmware machine interrupt handlers, and the public regular functions may be firmware support calls (e.g., BIOS calls). In all cases, the PEE's private functions are isolated to be only invoked within the PEE and may be a single monolithic function or a group of functions spanning applications, libraries, etc.

PEE memory regions in a given memory address space 201 comprises one or more code regions that contain PEE functions. PEE global data variables can be accessed by all parts of the PEE, retaining their values even after function execution has completed. Heaps provide dynamic memory areas for allocating memory to store variables whose size may vary. Stacks store temporary data that may be quickly used and discarded such as function parameters, local variables, and return addresses.

The operational semantics of a PEE functions further comprise reading and/or writing to global variables, reading and/or writing to stack, reading and/or writing to heap, allocating and freeing heaps, calling other PEE functions within the PEE or across PEEs within a memory address space and across memory address spaces, and returning to parent PEE function.

The PEE memory map is the layout of PEE components in a given memory address space. The PEE memory map may be randomized to ensure that the placement of the PEE components in a given memory address space is different each time the PEE loads into memory. This randomization mitigates various types of attacks and vulnerabilities by making it challenging for attackers to predict and exploit specific memory locations.

The system may comprise a set of HWPEEs that implement processors of various architectures including x86, ARM, and RISC-V architectures. Further the system may comprise a set of SWPEEs and HWPEEs running various operating systems such as Windows, Linux, FreeBSD etc. For example, with a set of HWPEEs and SWPEEs implementing an x86 processor running Windows, the KPEE 207 can provide a secure boot-strapping environment for the Windows operating system and the BPEE 204 can house the Windows kernel, while the KPEE ensures that other applications are loaded and executed in respective DPEEs.

In some embodiments, the DPEE comprises a banking application that requires secure data storage and retrieval mechanisms. The BPEE provides the secure base operating environment and provides additional security features for the banking application, such as encryption and decryption services. The KPEE can ensure that only authorized DPEEs are loaded into memory to prevent unauthorized access to sensitive data.

In a further embodiment of the invention, the system can be used to develop distributed applications. For example, a DPEE can comprise a web browser application that requires secure communication mechanisms with a server-side DPEE to retrieve and display web content. The BPEE provides the secure base operating environment on both server and client and provides additional security features for the web browser application, such as encryption and decryption services.

In some embodiments of the invention, the memory and memory address space may include both volatile and non-volatile memory storage mediums including but not limited to Static Random-Access Memory (SRAM), Dynamic Random-Access Memory (DRAM). Read-only memory (ROM), logic gates, digital circuits that implement storage such as flip-flops etc.

In other embodiments of the invention, a set of HWPEEs can implement various peripheral or computer platform device functionality ranging from USB, HDMI, Ethernet, WiFi, serial devices and memory and storage controllers.

The system architecture may provide a more secure, efficient, and flexible way to develop secure by design software applications. By separating program execution into different PEEs, mathematically modeling their operational semantics, and ensuring each component's isolation, the proposed system addresses several limitations and vulnerabilities inherent in traditional computing systems.

Trusted Path Security Mechanism (TPSM)

The systems and methods may include a Trusted Path Security Mechanism (TPSM) that enforces permitted patterns of computer platform operations without adversarial influence. Such computer platform operations can be one or more of memory access operations, peripheral access operations, processor operations including execution of processor instructions, and operations involving access and manipulation of processor, memory or peripheral state. TPSM therefore establishes secure code execution and reliable data communication pathways between PEEs and between PEEs and computer platform hardware.

TPSM may be embodied in various configurations involving PEEs 113, offering a flexible and robust security solution. In different embodiments, TPSM can span multiple PEEs, both within and across individual PEEs, as well as between PEEs and computer platform hardware. For instance, TPSM can be established between public and private functions 208 of Keystone PEEs (KPEEs) 207 or Bastion PEEs (BPEEs) 204, enabling secure communication within these trusted environments either in PHC, software or a combination of both PHC and software. Additionally, TPSM can facilitate secure interactions between public functions 208 of KPEEs 207, BPEEs 204, and Domain PEEs (DPEEs) 205, allowing for protected data exchange across different types of PEEs. Furthermore, TPSM can be implemented between DPEEs 205 themselves, ensuring secure communication among these elements. The scope of TPSM is not limited to interactions between PEEs, as it can also be established between PEE functions 208 and computer platform Programmable Hardware Components (PHC) 111, providing an end-to-end security solution that bridges the gap between software and hardware components. By supporting various configurations and spanning multiple PEEs and hardware components, TPSM provides a comprehensive security mechanism that can be tailored to meet the specific needs of different applications and systems.

TPSM encompasses four key mechanisms-temporal memory safety, which ensures that memory accesses are valid and do not compromise the integrity of the system, handled via heap safety mechanisms; spatial memory safety, which ensures that data is accessed and manipulated in a secure and controlled manner, handled via data safety mechanisms; control flow integrity, which ensures that the execution of code follows a predictable and authorized path, handled via code safety and stack safety mechanisms; and privilege separation, which ensures that different components of the system operate with the appropriate level of privilege and access control. These mechanisms may be implemented, for example, in any suitable combination of hardware and software.

TPSM may be implemented in various embodiments, including combinations of hardware and software components. For example, TPSM may be established between two PEEs (e.g., PEE A and PEE B) that communicate via shared memory regions. Alternatively, a PEE at a lower privilege level may invoke a set of functions provided by a PEE executing at a higher privilege level to establish a TPSM. Additionally, a PEE may write data to a storage device (such as a disk) and read from it, with the storage device being one example of a peripheral that can be used to establish a TPSM. Other peripherals, such as networks, keyboards, or other input/output devices, may also be used.

In one embodiment, TPSM may involve PEEs that house virtual machines communicating via a hypervisor and containers communicating with each other or the host kernel.

A subset of the set of PEEs may be implemented in low-level programming languages such as Verilog, SystemVerilog, C, C++ and Assembly that offer fine-grained control over hardware resources and performance optimization capabilities, suited for programming functionality of hardware components and software components such as kernels and high-performance applications. A subset of the set of PEEs may be implemented in a high-level programming language such as Python, Rust and Java that have designed-in features of memory safety guarantees and type systems that help prevent common vulnerabilities and ensure integrity of code execution.

In some embodiments, the subset of the set of PEEs that are implemented in low-level programming languages may enforce one or more TPSM. In other embodiments, the subset of the set of PEEs that are implemented in high-level programming languages may enforce one or more TPSM. In some embodiments, the subset of the set of PEEs that are implemented in high-level programming languages may enforce a subset of the TPSM such as temporal memory safety and spatial memory safety. In one embodiment, a combination of the subset of PEEs implemented in low-level programming language and the subset of PEEs implemented in high-level programming language may enforce one or more TPSM.

Compartmentalized Security Mechanism (CSM)

The system and methods may include a "Compartmentalized Security Mechanism (CSM)" that regulates interactions between PEEs. In one embodiment, the CSM regulates interactions between potentially malicious PEEs and the rest of the PEEs in the computer platform. CSM achieves this by designating a subset of the union of the set of Keystone PEEs (KPEEs) 207 and Bastion PEEs (BPEEs) 204 (called "CSM PEE"), to act as gatekeepers and enforce strict boundaries (called "bastion interfaces") around computer platform resources. Bastion interfaces are essentially a subset of the union of the set of PEE functions 208 of KPEEs 207 and BPEEs 204 which prevent unauthorized access to computer platform resources by other potentially malicious PEEs. A key aspect of CSM is the use of mathematical adversary modeling, which involves creating detailed models of potential attackers and their possible actions, allowing for the anticipation and mitigation of all possible non-deterministic adversarial inputs that could be directed at each bastion interface. By tying each bastion interface to a comprehensive set of potential adversarial scenarios, the CSM can ensure that the system is resilient to even the most sophisticated and unpredictable attacks including zero-day attacks. CSM PEEs operate at a higher level of privilege than the potentially malicious PEEs, ensuring that they can effectively control and monitor interactions. The overall security of the system is formally proven using a rigorous mathematical model that takes into account the complex interplay between the system's components and the potential adversaries.

CSM helps achieve computer platform resource separation owing to the bastion interfaces. In one embodiment, each PEE of the computer platform owns an exclusive set of computer platform resources and act as BPEEs for those resources.

CSM can be embodied in various forms to protect different layers of a computer system, with each layer represented as a Keystone PEE (KPEE), Bastion PEE (BPEE), or Domain PEE (DPEE). For example, in a hypervisor-based embodiment, the hypervisor can be implemented as a KPEE 207, serving as a trusted environment for regulating interactions between virtual machines, which are represented as DPEEs 205, and the physical hardware. The CSM can be integrated into the KPEE 207, allowing it to enforce strict boundaries around system resources and prevent malicious DPEEs 205 from compromising the system.

In another embodiment, the firmware of a device can be represented as a BPEE 204, providing an additional layer of security against malicious attacks targeting the device's low-level interfaces. The CSM can be integrated into the BPEE 204, enabling it to regulate interactions between the firmware and other components of the system, such as DPEEs 205 representing kernel modules or applications.

Additionally, the CSM can be implemented as a KPEE 207 within an operating system, which is represented as a DPEE 205, enabling it to enforce strict boundaries around system resources and prevent malicious applications, also represented as DPEEs 205, from compromising the system. In this embodiment, the KPEE 207 operates at a higher level of privilege than the DPEEs 205, ensuring that it can effectively control and monitor interactions.

In some embodiments, CSM can be implemented as: (i) a collection of HWPEEs; (ii) a collection of SWPEEs; or (iii) a collection of both HWPEEs and SWPEEs. In one embodiment, a first HWPEE implementing a processor and a second HWPEE implementing a memory controller can together implement CSM and execute an application as a SWPEE.

In other embodiments, the Compartmentalized Security Mechanism (CSM) can be applied to virtualization and containerization technologies to enhance their security. For instance, in a virtual machine-based embodiment, the guest operating system can be represented as a DPEE 205, and the host environment can be represented as a KPEE 207 or BPEE 204. The CSM can be used to regulate interactions between the DPEE 205 and the KPEE 207 or BPEE 204, preventing malicious code from escaping the virtual machine and compromising the host.

Similarly, in a container-based embodiment, each container can be represented as a DPEE 205, and the host environment can be represented as a KPEE 207 or BPEE 204. The CSM can be used to enforce strict boundaries around container interfaces, preventing malicious DPEEs 205 from accessing sensitive data or disrupting other DPEEs 205 within the same host. By applying the CSM to these various technologies, it is possible to create a robust and comprehensive security framework that protects computer systems against a wide range of threats.

Figure 3:
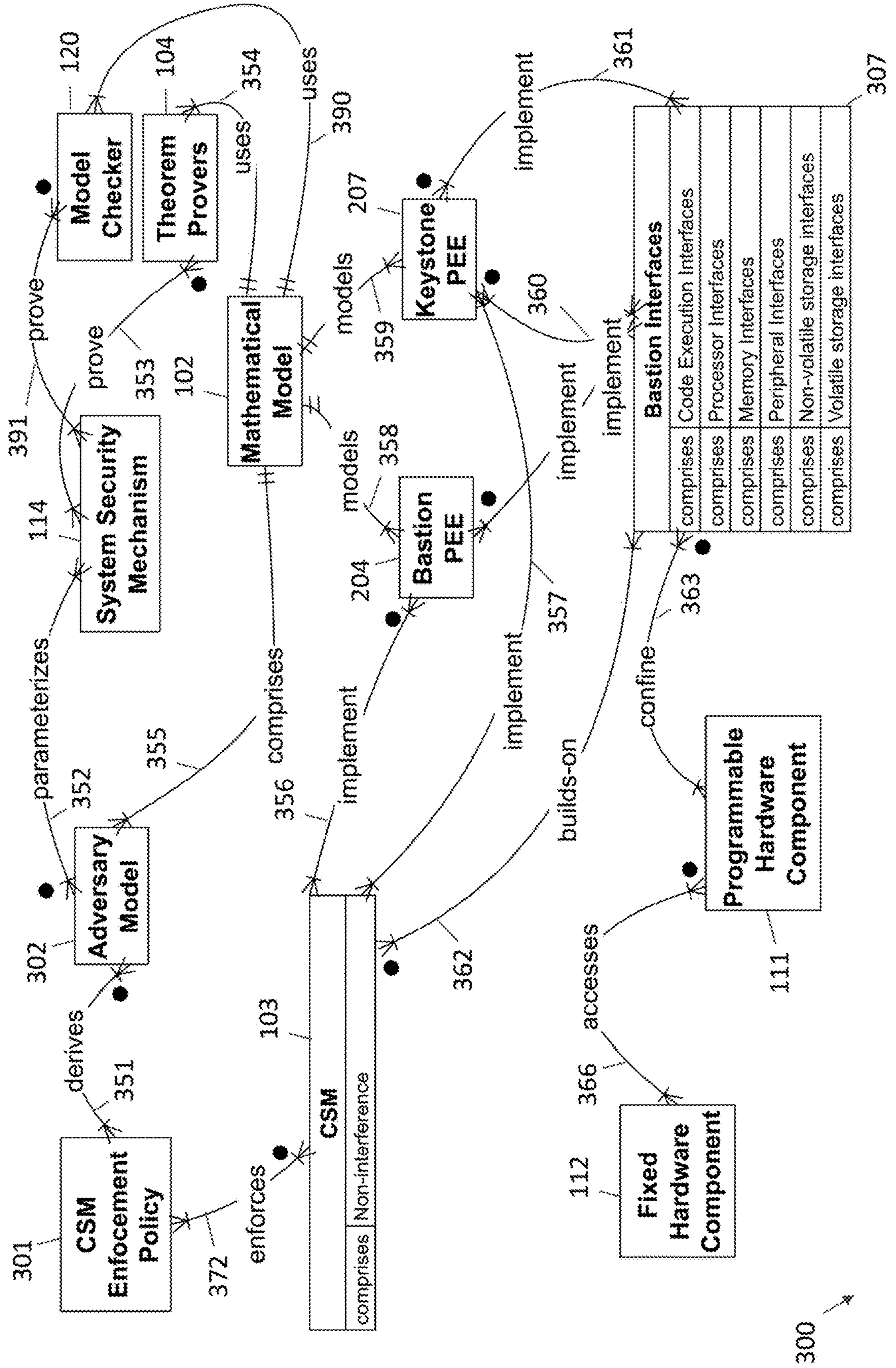
FIG. 3 shows a system 300 for mathematical model CSM Verification Mechanism according to some embodiments.

FIG. 3 shows a system 300 for Compartmentalized Security Mechanism (CSM). In system 300 a mathematical model 102 models one or more Bastion PEE 204 (see connecting line 1058) and one or more Keystone PEE 207 (see connecting line 1059). The mathematical model 102 uses one or more theorem provers 104 and one or more model checkers 120 (see connecting lines 354 and 390 respectively) to prove system security mechanism 114 (see connecting lines 353 and 391 respectively). One or more Bastion PEE 204 implement one or more bastion interfaces 307 (see connecting line 360). Similarly, one or more Keystone PEE 207 implement one or more bastion interfaces 307 (see connecting line 361). One or more Bastion PEE 204 and one or more Keystone PEE 207 implement one or more Compartmentalized Security Mechanism (CSM) 103 (see connecting lines 356 and 357 respectively). One or more CSM 103 build on one or more Bastion Interfaces 307 (see connecting line 362). One or more Bastion Interfaces 307 confine one or more Programmable Hardware Components (PHC) 111 (see connecting line 363). One or more PHC 111 accesses one or more Fixed Hardware Components (FHC) 112 (see connecting line 366).

Non-Interference CSM

The Non-interference Compartmentalized Security Mechanism (NI-CSM) ensures the absence of interference between two or more Program Execution Elements (PEEs) in a system, based on their interfaces. This mechanism guarantees that the execution of one PEE does not affect the behavior or results of another PEE, thereby maintaining the integrity and security of the system. NI-CSM enables composing a previously formally verified software component with an unverified software component or another formally verified software component. The method employs rely-guarantee mathematical reasoning and uses interface confinement in order to achieve compositionality of high-assurance formally verified software modules.

NI-CSM relies on the Trusted Path Security Mechanism (TPSM), which establishes secure communication pathways between PEEs and ensures the enforcement of permitted patterns of computer platform operations as described previously. In addition to TPSM, NI-CSM involves proving invariants on PEE functions that ensure the absence of side-effects on shared resources, including:

Shared memory: NI-CSM ensures that one PEE's access to shared memory does not affect the behavior or results of another PEE.

Programmable hardware states: NI-CSM guarantees that changes to programmable hardware states, such as registers or configuration settings, do not interfere with the execution of other PEEs.

Processor state: NI-CSM ensures that modifications to processor state, including registers, do not affect the behavior or results of other PEEs.

In some embodiments the aforementioned invariants can be specified in mathematical logic such as concurrent separation logic, hoare logic or relational logic and can be proven using theorem provers 104 and model checkers 120.

Furthermore, NI-CSM also addresses the issue of caches and side-channel elimination. In a system with multiple PEEs, caches can be a source of interference between PEEs, as changes to cache contents by one PEE can affect the execution of another PEE. To mitigate this, NI-CSM ensures that:

Cache coherence: NI-CSM maintains cache coherence across PEEs, ensuring that changes to cache contents are properly propagated and do not interfere with other PEEs.

Cache isolation: NI-CSM provides cache isolation between PEEs, preventing one PEE from accessing or modifying the cache contents of another PEE.

In some embodiments these aforementioned cache isolation and cache coherence mechanisms can be implemented as n-way set associative caches and using a combination of HWPEEs and SWPEEs.

The NI-CSM can be embodied in various configurations involving Hardware PEEs (HWPEEs) and Software PEEs (SWPEEs).

In one embodiment, NI-CSM is implemented using HWPEEs, which provide a hardware-enforced separation between PEEs. The TPSM is used to establish secure communication pathways between HWPEEs, and invariants are defined to ensure the absence of side-effects on shared memory, programmable hardware states, and processor state.

In another embodiment NI-CSM is implemented using SWPEEs, which provide a software-enforced separation between PEEs. The TPSM is used to establish secure communication pathways between SWPEEs, and invariants are defined to ensure the absence of side-effects on shared memory, programmable hardware states, and processor state.

In yet another embodiment, NI-CSM is implemented using a combination of HWPEEs and SWPEEs. The TPSM is used to establish secure communication pathways between PEEs, and invariants are defined to ensure the absence of side-effects on shared memory, programmable hardware states, and processor state.

In other embodiments, NI-CSM is implemented using Keystone PEEs (KPEEs), which provide a high level of security and trustworthiness. The TPSM is used to establish secure communication pathways between KPEEs, and invariants are defined to ensure the absence of side-effects on shared memory, programmable hardware states, and processor state.

In one embodiment NI-CSM is implemented using Bastion PEEs (BPEEs), which provide a high level of security and isolation. The TPSM is used to establish secure communication pathways between BPEEs, and invariants are defined to ensure the absence of side-effects on shared memory, programmable hardware states, and processor state.

In each of the aforementioned embodiments, NI-CSM ensures that the execution of one PEE does not interfere with the behavior or results of another PEE allowing for securely composing multiple PEEs in the computer platform each with its mathematically verified security guarantees.

PEE Lifting Mechanism

The system of the present invention further comprises a PEE Lifting Mechanism converts PEE code into an idiomatic code representation (ICR) that describes the operation of the PEE code and allows proving composition of CSM across PEEs. In one embodiment, the ICR consists of a high-level language representation of a low-level programming language.

The PEE Lifting Mechanism involves converting operational instructions of a PEE into ICR functions which are encoded as higher-level programming language functions amenable to verification (e.g., C, Java, Rust) via pseudo-statements and pseudo-calls (ICR statements).

In one embodiment, for the x86 Assembly language instruction movcr3 involving register eax there is a corresponding ICR function called ci_movl_eax_cr3. Each ICR function comprises ICR statements that are defined in a hardware model and bridges the shift between the reference higher-language semantics and the hardware instructions (e.g. access to memory and to registers). During verification, each ICR statement is replaced by the higher-level programming language source code from the hardware model. The resulting higher-level program is verified for required properties using off-the-shelf high-level program language verification tools (e.g., Frama-C for C language, KeY for Java language, coq-of-rust for Rust language)

ICR faithfully models the low-level language in a PEE and the execution trace of the new PEE with higher-level language and ICR is semantically equivalent to the original higher-level language and low-level language program.

ICR functions are verified to respect the higher-level language application binary interface (ABI), which is crucial for the soundness of verification. During compilation, all ICR statements are replaced by the corresponding operational instruction equivalent statement. ICR supports two-way nested high-level language to operational instruction calling with full device modeling. This allows using various verification techniques to prove (higher-level) properties on device states other than just memory and numeric.

The ICR hardware model formalizes the processor and modeling the memory and associated hardware conduit end-points of a given platform and processor architecture. The hardware model is crucial for verifying properties over collections of hardware state (e.g., state of processor registers and memory) and assertions that are part of the ICR function contract. The hardware model also includes an Instruction Set Architecture (ISA) model that models a set of instructions for a particular processor architecture.

One embodiment of the invention uses a modular and layered hardware model where only the required subset of the hardware is modeled and used during verification (e.g., the hardware model for a RISC-V platform with a single address space is simpler than a platform executing with hypervisor privileges). This greatly aids verification automation and facilitates validation of the hardware model against real hardware.

Further, the hardware model is preferably specified in an abstract specification language which can then be automatically synthesized down to desired target languages such as C, Java and Coq. This allows the hardware model to be more readily integrated into existing verification toolchains and methodologies that could be employed to verify a PEE written in different programming languages.

In one embodiment, the PEE Lifting Mechanism 108 consists of a ICR code generator that can generate operational instruction code of the PEE once ICR verification is complete and successful. This ensures that verified SSMs 114 are embedded in the operational instruction code of the PEEs. The ICR code generator can use a combination of static and dynamic code generation techniques in order to emit the operational instruction code. In some embodiments, the ICR code generator can use Just-in-Time code generation to generate operational instruction code.

The proposed method does not add any runtime overhead to native low-level programming language code blocks of a given PEE. We re-write the associated low-level programming language code blocks using the ICR for verification purposes and automatically re-generate the corresponding low-level language statements during compilation. This achieves optimal runtime performance.

Figure 4:
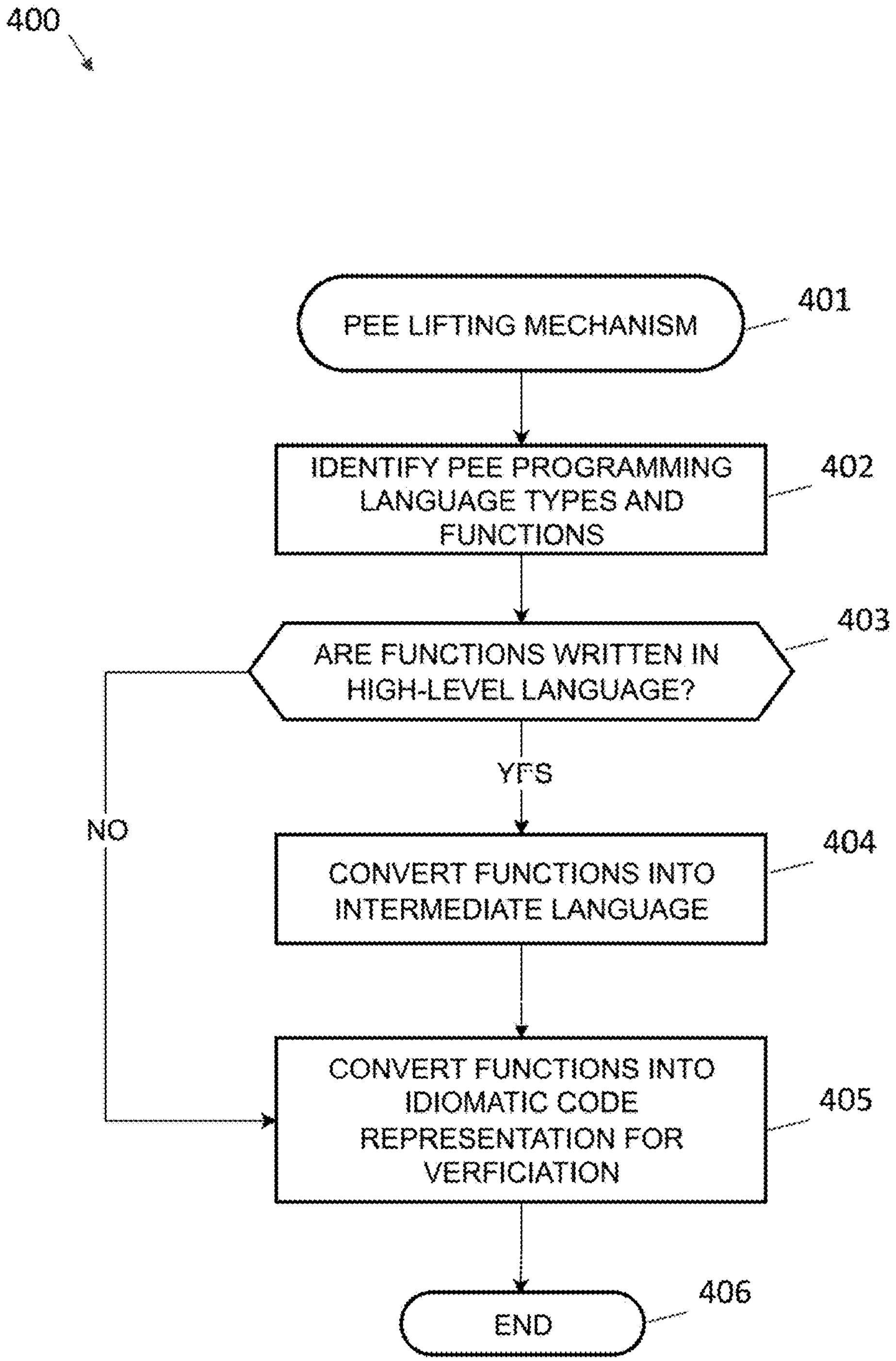
FIG. 4 shows a system 400 for conversion of PEE code into idiomatic code representation (ICR) for verification according to some embodiments.

FIG. 4 shows a system 400 for PEE Lifting Mechanism (PLM) 401 according to some embodiments. In system 400, the PLM 401 performs a series of steps and checks. As a first step, it identifies PEE programming language types and functions 402. It then performs a check to see if the PEE functions are written in high-level language 403. If the check at step 403 is a "YES", the PLM 401 converts the PEE functions into intermediate language 404, then converts the PEE functions into idiomatic code representation (ICR) for verification 405 and ends 406. If the check at step 1503 is a "NO" the PLM 401 converts PEE functions into idiomatic code representation (ICR) for verification 405 and ends 406.

In some embodiments of system 400, the step identify PEE programming language types and functions 402 consists of the following additional steps:

Module Dissection and Function Identification: The first step in identifying low-level programming language functions that a PEE depends on is to disassemble the PEE code into its constituent components, including inline low-level language code, self-contained low-level language routines, external function calls, and other dependencies. In this embodiment, this may be performed through a combination of static analysis and dynamic instrumentation techniques. In this embodiment, a modular reverse engineering mechanism is employed, where the PEE code is broken down into smaller units, such as functions, procedures, or even individual lines of code, to facilitate easier analysis and identification of dependencies.

Low-level language Code Extraction: In the aforementioned embodiment, once the PEE has been disassembled into smaller units, the next step is to extract any low-level programming language code that may be present or embedded directly within the PEE code. In this embodiment, such low-level programming language code can be used for system operations such as memory management or hardware interaction. In this embodiment, a combination of regular expressions and lexical analysis is employed to identify and extract these low-level programming language code snippets, which are then analyzed further using static analysis to determine their dependencies on external PEE functions.

Function Call Graph Construction: Further in the aforementioned embodiment, a mechanism to identify external function calls that the PEE depends on is employed where a function call graph (FCG) is constructed that represents the relationships between the PEE's functions and procedures. The FCG is built by analyzing the PEE code for function calls, including both explicit calls using function names or pointers, as well as implicit calls through indirect means such as pointer dereferences or function pointers. Once the FCG has been constructed, it is then analyzed to identify any external functions that are being called, along with their formal parameters and return values.

Low-level Programming Language Dependency Identification: Finally, within this embodiment, the low-level programming language code is extracted and the function call graph constructed, and external low-level programming language function dependencies are identified. A combination of static analysis and dynamic instrumentation techniques are used to determine which external functions are being called by the PEE's code snippets. This information is then used to construct a comprehensive list of dependencies on external low-level programming language functions, including both self-contained low-level programming language routines and external function calls, along with their formal parameters and return values.

In one embodiment of system 400, all the seL4 high-assurance kernel operating on RISC-V Architecture's Assembly language instructions (that are not formally verified) are identified and their corresponding calling interface (input/output parameters) is built with seL4 C code that is formally verified. In this embodiment, first all the seL4 RISC-V Assembly language code blocks are identified and their corresponding calling interface w.r.t the seL4 C code is built. Then an idiomatic code representation (ICR) is created for each identified Assembly language code block with input and output parameters. The ICR definition uses the RISC-V Application Binary Interface (ABI) specifications, identifying the system registers and stack locations that formal parameters and return results occupy.

In some embodiments of system 400, the step convert functions into intermediate language 404 consists of the following additional steps:

In the aforementioned embodiment, the first step is front-end analysis, where the PEE code is parsed and analyzed to identify the syntax and semantics. This is done using a parser generator tool to produce an abstract syntax tree (AST) that represents the PEE code structure. The AST serves as an intermediate representation of the PEE code, providing a platform-independent and language-agnostic way to represent the PEE's control flow. The next step involves semantic analysis, where the AST is traversed to identify the types and properties of each variable, function, and data structure. This information is used to generate type information and metadata that will be used later in the compilation process. Once the semantic analysis has completed, the AST is then transformed into an intermediate representation (IR). This involves creating a series of instruction-level nodes that correspond to the basic blocks in the program. The IR is designed to be architecture-agnostic and machine-independent, providing a common platform for further optimization and transformation. Each node in the IR corresponds to a specific instruction that can be executed on any architecture.

In the aforementioned embodiment, the IR is then further optimized using a series of passes, which apply various transformations to improve code quality and performance. These passes can include optimizations such as dead code elimination, register allocation, and loop unrolling. The goal of these passes is to create an optimal sequence of instructions that minimizes execution time and maximizes efficiency for ICR creation. After optimization has completed, the IR is then lowered into a target-specific machine language, such as x86 or RISC-V assembly code. This process involves replacing high-level operations with their corresponding low-level equivalents, taking into account the target architecture's instruction set and memory model.

In one embodiment of the present invention the ANTLR or yacc parser generator tool produces an abstract syntax tree (AST) that represents the PEE code structure during front-end analysis step. In the semantic analysis step, the LLVM compiler framework is used which uses a data structure called "metadata" (md) to represent the semantic information of the program, which includes details such as type, layout, and attributes. The LLVM compiler framework also generates the LLVM intermediate representation (IR) for the IR transformation step. The LLVM compiler framework additionally includes several passes for the IR optimization phase at various levels of optimization. The LLVM compiler framework finally generates Assembly language code for various platform architectures including RISC-V, x86 and ARM.

In some embodiments of system 400, the step convert functions into idiomatic code representation for verification 405 consists of encoding the low-level programming language function or intermediate representation statements into ICR function along with ICR statements. In this embodiment a RISC-V ISA model and the model of the computer platform is used to define the ICR statements.

FIG. 5 shows an embodiment 500 to lift operational instruction Assembly code to C language using ICR. In this embodiment, the high-level language program in the C language (main.c) at the top left 501 demonstrates ARM TrustZone secure boot, where it has full control over the processor and system resources. This program initializes both the Secure and Non-Secure environments (represented by . . . on line 3) before transferring control to untrusted applications. Before this transfer, it is crucial to set the hardware NS bit to 1, indicating the Normal World hardware state. This is accomplished using privileged processor instructions, shown as an inline assembly from lines 5 to 13. To create the ICR, the original assembly fragment encapsulated into a ICR function with ICR statements inside it (casm_set_ns1.cS at the bottom right 503). This function gets invoked (as a regular C function) at the original inline assembly location in the revised main.c 502 (line 26), and every CASM instruction mnemonic inside the ICR function calls the corresponding processor hardware model backend implementation (in C), which essentially performs the logic of the instructions. For example, at the bottom left is the hardware model 504 function that moves a 32-bit value into the hardware model register hwm_r1. The ICR function on line 32 invokes this function, setting hwm_r1-hwm_r0 to model the assembly instruction mov r1, r0. With the ICR, we can now use the C verification tool (e.g., Frama-C) and check security invariants on the source code.

The aforementioned embodiment generalizes naturally to other high-level language programs the PEEs may be written in (e.g., Java, Rust etc.)

FIG. 6 shows an embodiment 600 to lift operational instruction Assembly code to C language for a high-assurance OS kernel using ICR. In this embodiment the seL4 startup Assembly language code and the corresponding ICR function with the input and output parameter specification is shown 601. First, the RISC-V ABI for system call invocation specifies that all parameters are passed via registers. Thus, the seL4 startup ICR function has the format "casm_start (void)" where (void) signifies no direct parameters on stack. In this embodiment there are two other classes of seL4 Assembly language code blocks: Self-contained inline Assembly 602 and inline Assembly mixed with C 603. For the former, we rewrite the entire function as a ICR function while preserving the same C function declaration. For the latter, we encode a new ICR function corresponding to the inline Assembly code block with appropriate parameters and return result declarations per the inline Assembly syntax.

In this embodiment high-assurance kernel seL4's RISC-V Assembly language code block is converted into a formally verifiable ICR function via the ICR RISC-V C-language ISA model. The embodiment focuses on conversion of one function from the three classes of Assembly language code blocks as described previously (self-contained, inline and mixed). For each instruction within a given seL4 Assembly language code block, we write a RISC-V Instruction Set Architecture (ISA) C code which embodies the semantics of the corresponding RISC-V instruction. The seL4 inline Assembly language statement in 603 is converted to an invocation of "casm_csrr_sp_sscratch( )" which is a C function defined in the RISC-V C-language ISA model 604 that in turn uses specific hardware model registers (prefixed with "hwm_") to encode the semantics of the instruction. In this case it reads from the "scratch" control register and puts the return value into the "sp" register. This mechanism essentially converts a seL4 Assembly language code block into C language function invocations and definitions via our RISC-V C-language ISA model to give us a full C program that can then be formally verified for CSM invariants and functional correctness.

Mathematical Modeling and Composition

Some embodiments of the system include a mathematical model of the computer platform where the PEE interfaces are modeled and it is shown that there is composition of trusted path security mechanism (TPSM) (code safety, data safety, stack safety, heap safety, and privilege separation) and Compartmentalized Security Mechanism (CSM) when multiple PEEs are used in a system. Further, each PEE can be written in a different programming language and still achieve the composition of the aforementioned security mechanisms. In one embodiment of the system, this allows composing PEEs written in high-level languages such as Rust, Python, Java and C#which incorporate a subset of TPSM and CSM in their programming language by design along with PEEs written in low-level languages such as Verilog, C, C++ and Assembly which do not incorporate TPSM and CSM by design.

The mathematical model may be modeled with existing assume-guarantee interface confined automated modeling mechanisms as discussed in U.S. Pat. No. 12,367,328 allowing for computer assisted modeling and proving of system security mechanisms. As discussed in U.S. Pat. No. 12,367,328 the assume-guarantee interface confined modeling may employ theorem provers and/or model checkers to prove system security mechanisms. In some embodiments, proving CSM and TPSM using theorem provers and/or model checkers may generate a counter example in the event the CSM and TPSM does not hold for a given version of the mathematical model. In such cases, the counter example provides details in terms of what model specifications need changes so that the CSM and TPSM can hold. The mathematical model specification is then revised using the output of the counter example and the system security mechanisms are proven again using theorem provers and/or model checkers. This allows for an iterative mathematical model specification workflow that allows to ultimately prove that the CSM and TPSM hold in the mathematical model.

Other embodiments of the system may use "either" primitive of the temporal logic of actions (TLA+) mathematical modeling framework and the PlusCal specification language to model memory load, store and execute in a non-deterministic fashion.

The high-level mathematical model in accordance with some embodiments of a system of PEEs 113, their functions 208 and their memory state are described and syntax and semantics governing their concurrent execution on a computer platform with multiple processors are introduced.

Compartmentalization for Compositionality

The present invention re-structures a computer platform as a collection of PEEs, each with its own exclusive access to a memory region and system resources such as processor control registers. Each PEE is a compartment. In this model, the heap is compartmentalized into separate memory locations assigned to different PEEs. In a system U composed of m distinct PEEs with available memory addresses Addrs, each PEEt identified by uidi $(1 \le i \le m)$ owns an exclusive region of the source-level heap (heaps: Addrs→Val). Each region is a set of addresses defined as uidi. $M \in P(Addrs)$ with uidi $.M \cap$ uidj $.M = \emptyset$ for $i \neq j$.

A PEE has a set of public functions, and a set of internal functions not accessible from other modules. Each public function has pre- and post-conditions amounting to the security invariants: the verification ensures that if the precondition is satisfied upon calling the function, the post-condition holds upon its return. The compartments are units for verification and compilation.

Each PEE is verified for a set of system security mechanisms (SSM) 114, which are proven to imply that the security invariants can be composed and held when these PEEs execute concurrently.

A function belonging to a PEE uid respects the specifications of its post-condition and its callees' preconditions in the presence of other threads and processors if (1) the heap satisfies the precondition of the callee, whenever it makes a call and (2) upon finishing execution, the heap satisfies its specified post-condition, assuming its precondition is satisfied at the beginning and the callees satisfy their post-conditions upon return. We define respecting the boundary to mean that a function belonging to a PEE uid does not access memory out of uid's region or leak references to its memory to other PEEs.

Finally, a PEE respects the interface if all its public functions respect the interface, which is defined as both respecting the specification and the boundary. This allows the source-level security invariants can be translated to the operational instruction level via a compiler when the source code is compartmentalized.

The compiler is defined as a pair of functions, MT and CT, which transforms memories and code from the source to the target level, respectively. The function MT: Addrs ↩→ Addrt (partially) maps source-level memory addresses (Addrs) to addresses at the target level (Addrt).

Relational Separation Logic for Verifying Interface Preserving Invariants

The disclosed invention provides a method to establish the observational equivalence between two programs using relational provers in a high-level language. The method to formalize the observational equivalence between the source and target programs using a Relational Separation Logic (RSL) will now be disclosed. Using the RSL quadruple, we show that the target system of PEEs satisfies the interfacing-respecting property, given that an observationally equivalent source system does. We also prove that our approach in handling the while loops and external calls is sound in our RSL. Finally, establishment of global preservation of the security invariants verified on the source level in any concurrent execution of target and proof that any such execution is data race free is disclosed.

Relational Separation Logic

The rules of Relational Separation Logic (RSL) are introduced, which are used in the embodiment presented later. A semantic meaning of the RSL quadruple is defined against which the soundness of the logic is proved. We assume a high-level language relational prover soundly implements RSL (e.g., RPP plugin of Frama-C for the C high level language).

Syntax and semantics of IMP-Ext: We present the syntax and semantics of a small imperative programming language called IMP-Ext. The language supports lookup (x: =[e]) and mutation ([e1]:=e2) for heap locations as well as external function calls. It also includes standard constructs such as loops, conditional statements, assignments, and sequences. We assume that all programs conclude with a single return statement, which does not appear elsewhere in the program.

Expr e:=— n|e1+e2|x

Stmt c:=x:=e|x:=[e]|[e1]:=e2|[x]:=f Re| if (b) c1 else c2| while (b)doc|c1; c2|skip |return e The runtime program state is represented as a tuple ⟨ρ, σ⟩, which consists of an internal processor ρ and a memory state σ. We consider an infinitely large region F preserved for the stack frames, i.e., a freelist, from which the program can allocate its local stack locations as needed. The memory state σ is a mapping from the heap and allocated locations in the freelist to their respective values. The internal processor is defined as a tuple ρ=(c, S), consisting of a statement c and an internal state S∈{I,C,H}, with I representing a state in which the program is able to take an internal step, C representing a state in which the program calls an external function, and H representing the final halt state.

The operational semantics of the language is defined using four predicates for taking internal steps (-→), transitioning for handling external function calls (extCall, extRet), and return (halt). The predicates are defined as follows:

(1) Internal step. F⊩⟨(c, I), σ⟩ -→δ τ⟨(c', I), σ'⟩

(2) ExtCall. F⊩ extCall ((x:=f Rv; c, I))=⟨f Rv, (x=f Rv; c,C)⟩ and F⊩extCall ((x:=f Rv, I))= ⟨f Rv, (x=f Rv,C)⟩

(3) ExtRet. F⊩ extRet ((x:=f Rv; c,C), v1)=(x:=v1; c, I) and F⊩ extRet ((x:=f Rv,C), v1)= (x==v1, I)

(4) Halt. F⊩ halt ((return v, I), σ)=⟨v, (v,H)⟩

FIG. 7 shows a system 700 for Relational Separation Logic Operational Semantics according to some embodiments. In system 700, the CONS semantics 701 and VAR semantics 702 describe variable construction semantics. The ADD semantics 703 describes addition semantics. The RET-1 704 and RET-2 705 rules describe function call return semantics. The ASSIGN 706 semantics describes variable assignment semantics. LOOKUP 707 semantics describes variable memory lookup semantics. MUTATION semantics 708 describes variable mutation semantics. IF-TRUE 709, IF-FALSE 710, WHILE-T 713 and WHILE-F 714 rules describe conditional if true, if false, while true and while false semantics. SEQ-S 711 and SEQ-I 712 rule describes sequence semantics. Finally EXTCALL 715 describes external call semantics.

The internal step F⊩⟨(c, 1), σ⟩ -→δ τ⟨(c', I), σ'⟩ is defined via a local small-step operational semantics. The small-step semantics relies on a big-step semantics of the form ⟨(e, I), σ⟩ ⇓ δ ⟨(v, I), σ'⟩, which is used for executing expressions. Both small and big operational semantics collect the footprint of reads and writes of the program in δ. All internal steps are annotated with t, which we drop when clear from the context. The predicate extCall indicates that an external call has been made and the system is in a state awaiting a return. The predicate extRet transitions this waiting state into a running state, given the return value v1 from the external callee. The predicate halt is invoked when the program has halted and is ready to return to its caller. We use these predicates to define the meaning of our RSL quadruple.

The quadruples in our RSL are of the form ⊩ a, F1,F2 {Ψ1}c1~c2 {r1, r2.Ψ2}. The precondition Ψ1 is a relation between two memory states. The postcondition r1, r2.Ψ2 abbreviates the function Ars, τt.Ψ2, where r1 and r2 represent the return values of statements c1 and c2, respectively, and Ψ2 is a relation between two memory states and also the two final return values. The subscript a, F1, F2 states that the quadruple is defined with respect to a PEE uida and freelists F1 and F2, c1 only access heap locations in the exclusive memory uida.M, and c2 only access heap locations in the exclusive memory MT (uida.M). Moreover, the free variables of the pre- and post-conditions are a subset of heap locations in the exclusive memories uida.M and MT (uida.M) and the freelists F1 and F2.

FIG. 8 shows a system 800 for Relational Separation Logic (RSL) Quadruple definition according to some embodiments. The RSL Quadruple 801 states that if one of the statements, say c1, takes zero or multiple internal steps, then the other statement, say c2, can simulate it by taking zero or multiple internal steps: (i) If c1 reaches a halting state, so does c2, and (ii) if c1 reaches an external call state, so does c2. Moreover, right before the external call, the two memory states agree on the values stored in the corresponding locations of uida.M and MT (uida.M). They call the same external function with equal arguments, and assuming they receive equal return values from the external call, their continuations will be related, satisfying the original postcondition.

FIG. 9 shows a system 900 for Relational Separation Logic Rules according to some embodiments. In system 900, the RETURN rule 901 describes function call returns. The SKIP rule 902 describes a no-operation. The mutation rules (MUTATION 904, MUT-L 915 and MUT-R 916) describe variable mutation operations. The lookup rules (LOOKUP 905, LOOKUP-L 917 and LOOKUP-R 918) represent variable memory lookup rules. The SEQ rule 906 describes sequence operations. The conditional rules (WHILE 907, IF 908, IF-L 913, IF-R 914) describe conditional operations. The ExtCall rule 909, relates two external function calls. The rule requires both programs to call the same function with equal arguments, maintains a relation Ψ that implies the equivalence of states (Eqa) as the pre and post-condition, and ensures the variables in which we store the results of external calls are corresponding variables in the two programs. The SUB rule 910 defines subtraction operations. The FRAME rule 911 defines stack frame rules for function invocations. The assignment rules (ASSIGN-R 912 and ASSIGN 903) define variable assignment operations.

The aforementioned rules can be divided into synchronous rules, asynchronous rules (e.g., the Mut-L rule), and structural rules (e.g., the Frame rule). Synchronous rules relate commands of the same syntax (e.g., programs executing in lockstep), asynchronous rules can relate commands of different syntax (e.g., when one program catches up with another). Moreover, in the post-condition, it updates the contents of the latter variables on the heap with arbitrary but equal values.

Asynchronous rules for the while loops are not included, insisting that the two programs start the loops in lockstep, which is general. The disclosed invention is sound with respect to RSL Quadruple Definition 801. A static judgment ⊢a,F1,F2 {Ψ1}c1~c2 {r1, r2.Ψ2} is established by building a derivation using the aforementioned rules.

Observational Equivalence Implies Interface Preserving

A formal definition of observational equivalence as an RSL quadruple with outlines of main results and corollaries derived from is disclosed.

For each public function or ICR function of a PEE uida, we define the observational equivalence as the RSL quadruple ⊩a,F1,F2 {Eqa}gcmd~CT(gcmd){rs, rt.Eqa ∧rs=rt}, where gcmd represents the body of the public function and ICR function at the source level and CT (gcmd) is its translated version via the compiler.

Recall that rs and rt represent the return values of the source and target level program, respectively, and Eqa is the property establishing the equivalence of the corresponding memory states exclusive to uida in the source and target level. According to RSL Quadruple Definition 801, the quadruple states that assuming that the source and target start from equivalent states σs and σt up to their exclusive heap, they will return equivalent heap states σ's and σ't, and their return values are equal. Moreover, during the execution, they encounter the same trace of external calls and pass them the same external arguments.

The main result establishes the interface-preserving property by proving observational equivalence for all public functions and ICR functions within a system of PEEs.

Theorem 1. If for every PEE uida∈U, all of its public functions and ICR functions with body gcmd satisfy the RSL quadruple ⊩a, F1,F2 {Eqa}gcmd~CT(gcmd){r1, r2.Eqa ∧r1=r2}, and the source system of PEEs U respect the interface (aka respects the boundary and specifications), and the corresponding target system of PEEs Ut respects the boundary, then Ut respects the interface.

Proof. We prove the theorem using a lemma stating that if both the source and target-level PEEs satisfy respect the boundary, and the source and target level codes are observationally equivalent, and the source code satisfies respecting the specifications, then the compiled code also respects the specifications.

Assuming the soundness of the high-level language relational prover, the approach disclosed in this invention in handling the while loops and external function calls, as discussed previously, is correct and establishes the observational equivalence.

Lemma 2 shows the implementation choice for the while loops by breaking it down into different parts and proving their equivalence separately is sound.

Lemma 2 (Correctness of while implementation). For any PEE specified by uida, the source-level code cs=c1; (while (b) c2); c3 and the target-level code ct=c'1; (while (b') c'2); c'3, we have if ⊢a,F1,F2 {Eqa}c1~c'1 {_Eqa} and ⊢a, F1,F2 {Eqa}c2~c'2 {_Eqa} and ⊢a,F1, F2 {Eqa}c3~c'3 {r1, r2.Eqa∧r1=r2} and Eqa⇒b=b', then ⊢a, F1,F2 {Eqa}cs~ct {r1, r2.Eqa∧r1=r2}.

Proof. Proof is straightforward by application of Seq 906 and While 907 rules.

Lemma 3 shows the soundness of our implementation choice for external calls. Assume that the memory states right before the external call satisfy the property Ψ. Our implementation guarantees that the source and target's exclusive heap states are equivalent immediately before the call (Ψ⇒Eqa). Additionally, both calls invoke the same functions (fs=ft) with equivalent arguments (Eqa⇒Re1=Re2), and the results are written on corresponding heap locations (xt=MT(xs)). As such, all four premises of the external call rule are satisfied to establish ⊢a {Ψ} [xs]:=fs~[xt]:=ft {_Ψ' *∃x.xs ↦→x*xt↦ →x}, where Ψ=Ψ'*xs ↦→_*xt↦→_, and we can apply Lemma 3.

Lemma 3 (Correctness of external call implementation). For any PEE specified by uida, the source-level code cs=c1; [xs]:=fs Re1; c2 and the target-level code ct=c'1; [xt]:=ft Re2; c'2, we have if ⊢a,F1,F2 {Eqa}c1~c'1{_.Ψ} with Ψ=xs↦→_*xt↦→_*Ψ' and ⊢a, F1,F2 {Ψ}[xs]:=fs~[xt]:=ft {_*∃x.xs↦→x* xt↦→x} and ⊢a,F1,F2 {Ψ'*∃x.xs↦→x* xt↦→x}c2~c'2 {r1, r2.Eqa∧r1=r2}, then ⊢a,F1,F2 {Eqa}cs~ct {r1, r2. Eqa∧r1=r2}.

Proof. Proof is straightforward by application of the Seq 906 rule.

Compositional Concurrent Run of Target Level

So far, we have disclosed that the invention establishes the interface respecting property for target level PEEs. We use this result to prove global properties about the concurrent compositional execution of the target-level code.

Runtime Constructs—The runtime constructs consists of multiple processors with the following syntax.

thread pool T:=•|tid↦⟨uid, mainf, lang, F, ρ, a⟩, T single processor state k:=(cid, T)

multi processor state K:=(F;σ;k;cid)

Each processor k, is a tuple of a unique core identifier cid and a list of threads T for executing external function calls. A single thread, uniquely identified with tid, consists of: (1) the main function mainf that initializes the thread and can either be a public function or a ICR function; (2) language of the thread lang. If mainf is a ICR function then lang is ICR and otherwise it is the language of uid; (3) the freelist F allocated to the thread; (4) the current internal processor state of the thread storing key control flow state; and (5) the instance, a, that satisfied the precondition mainf when the thread was initialized. Each multi processor state K consists of a stream of freelists F, a mapping from addresses to values, a list of processors and the active (running) processor cid. The active processor cid in a multi processor state can switch non-deterministically.

Interface Specification—For each PEE uid∈dom(U) and every function f∈uid.casmfd∪uidpubAPI, an interface P(x)uid.fQ(x) is fixed and collected in the set u. P(x) and Q(x) are pre- and post-conditions of the function f, respectively. These are also referred to as uid.f.pre(x) and uid.f.post(x). These pre- and post-conditions are the behavior contracts of the interface. The memory footprint of the interface for the PEE uid is specified by uid.M.

In line with function specifications in separation logic, the precondition uid.f.pre(x) is defined to be parametric in x of type A and has a type $A \rightarrow$ Prop. A universally quantified version of it, $\forall$x:A.uid.f.pre(x), is a first-order predicate defined over a global memory state (a pair of heap and stack where the heap includes other resources, e.g., control registers). $\sigma \vDash$uid.f.pre(a) specifies that the memory a satisfies uid.f.pre(x) when x is instantiated with the instance a. Assume that the predicate is only defined over the heap owned by uid. (i.e., |uid.M). The same holds for uid.f.post (x).

Moreover, for the sake of simplicity, assume that A has a simple base type (e.g., a list of integers or a string). For example, the specifications of the public function foo owned by a PEE uid can be enforced:

foo:=11=*10 where:

uid.M=10,11;

uid.pre.foox:=10$\hookrightarrow$x; and uid.post.foo (x):=11$\hookrightarrow$x

Concurrent Operational Semantics: The concurrent multi processor semantic rules are of the form $\langle$F; $\sigma$; k;cid$\rangle \Rightarrow$(F',',k',cid'). The is inherited from the underlying local internal steps and refers to read/write footprints of the step. The label is still used to specify the type of multicore step. For instance, load stands for loading a configuration, call stands for an external call, and ret stands for return.

The execution of a PEE on a system with n distinct processors and an initial global state memory 0, starts with a configuration, C, of the form uid1.init|| . . . ||uidn.init0, where 0 assigns initial values to the heap locations. A configuration is well-defined iff for all i$\leq$n, uidi$\in$dom(U) and for all i$\neq$j$\leq$n, uidiuidj. A well-defined configuration describes a system of PEEs ready to initialize n distinct PEEs on the processors by calling their init functions.

The rule LOAD takes care of this initialization: it (1) initializes the internal processor state i, for each uidi, using the corresponding initCore function; (2) starts a new thread on each processor; (3) assigns n disjoint freelists from F to each thread; and (4) checks that 0 satisfies the precondition of each PEEs's main public function, uidi.init.pre(x), for an instance ai. instantiating x. These threads are run until they return (via one of the rules). At that point, it is necessary to ensure that the post-condition of the thread holds for the exact same instance ai. Thus, instance ai is carried in the thread to be used when checking the post-conditions.

Moreover, the load rule requires each heap compartment to be closed (i.e., closeduid.M,0)) states that any pointer stored in an address in the domain of uid.M has to point to another location in uid.M. In other words, a heap compartment cannot store a pointer to another heap compartment or a stack frame. This property implies an instance of respecting borders on the heap: a function cannot find a pointer on its memory that points to a location not accessible to it.

The LOAD rule chooses a processor identifier cid$\in$domk as the active processor. The active processor cid can be switched to any other cid'$\in$domk any time using the SWITCH rule, allowing modelling of a preemptive concurrent dynamics.

The rest of the semantic rules, except the last two handling interrupts, are defined based on the internal state of the top thread on the stack of the running core. For example, the CMD rule is fired when the top thread on the stack of the running processor wants to take a local step. The rule ensures that the multiprocessor state also steps accordingly. CMD asserts that the read/write footprint of the internal core state only touches the memory locations the thread has exclusive access to.

If the top thread on the stack of the running processor calls a public API, the rule PEE-CALL (1) identifies the callee and the arguments passed to it using the function extCall; (2) updates the comment internal processor state to wait for its callee to return; and (3) spawns a new thread on top of the processors' stack, initializes its internal processor state using the function initCore, and assigns a fresh freelist to it. It also checks that the call respects the specifications by ensuring that satisfies the pre-condition of the callee for some b.

To avoid complications of implementing locks in the semantics, they are simulated by adding an extra condition on PEE-CALL that allows initialization of a public function of uid' as a callee if uid' does not appear anywhere on the stack of any of the processors in k1 (i.e., uid'$\notin$active(k1)). If this criterion is not met. then the PEE already has the lock on a different core and thus the caller's thread needs to wait (using the WAIT rule) until the lock is released. Note that the implementation of locks may result in livelock (e.g., two PEEs may mutually wait for each other).

When the top thread on the stack of the active processor halts: If there is at least one other thread on the stack waiting for its result, the rule PEE-RET uses the function extRet to update the internal processor based on the return value v. It also ensures that the post-condition of mainf' holds for the argument a'. By construction, a' is the same argument that satisfies the precondition of mainf'. If there is no other thread waiting on the processor, the processor is terminated.

Interrupts are modelled as an interrupt handler PEE for each processor. For the processor cid, the interrupt handler PEE uidcidInt is appointed. As a PEE, uidcidInt has its own assigned memory location, which consists of the processor's interrupt description table and its interrupt flag, describing whether interrupts are allowed for the processor or not. uidcidInt has two distinct public functions: init, and setCtx. Other PEEs may call the public function setCtx to change the interrupt flag of the processor.

The function init (which takes no arguments) checks whether interrupts are available for the processor and, if so, it calls a public function of a PEE corresponding to the interrupt service routine. The preemptive model allows init to take control of the processor at any point in time, assigning the highest priority to the interrupts. As a result, the init public function needs to have an always true pre-condition to ensure that it can always be initialized: uidcidInt.init.pre=true.

The INTERRUPT rule models the preemptive semantics. To enforce the locks of PEEs, the extra premise uid'$\notin$activek1 is required. Thus, in this model, an interrupt cannot get interrupted. When the interrupt handler terminates, INTERRUPT-RET hands back the processor to the original interrupted thread asserting the post-condition of the interrupt handler's init public function. This rule is similar to other return rules, except that the internal state of the interrupted thread is not updated after the return. As a result, this specific return must be distinguished from others (e.g., PEE-RET) A subscript, int, is assigned to the core cid, (i.e., cidInt) when the interrupt handler of the processor initializes (INTERRUPT), and it is removed it after it returns (INTERRUPT-RET).

Concurrent composition: Properties verified of each PEEt in isolation hold on concurrent executions of the whole system. To support this, the PEE must have the property of respecting the interface (i.e., respecting memory footprint boundaries and specified pre- and post-conditions). A PEE respects the interface iff all of its public functions respect the interface. A set of PEEs U respects the interface, if all uid∈U respect the interface.

A guarantee condition of a thread when it evaluates its own code can be defined. The guarantee condition Gδ, σ, F, M holds iff M is closed with respect to and the footprint only touches the memory regions in F and M (i.e., closed M,σ∧dom(σ)⊆FUM).

Any step the thread takes asserts the guarantee condition: it does not leak any references and only changes its own heap and stack. Moreover, the step results in a new configuration that has the same property. Further, if the thread halts, its return value is not a pointer. In the case of an external call, the thread does not leak any pointers to the callee. Moreover, the caller can assume that its callee only extends the global memory according to the agreed-upon boundaries. The state after the return continues to have the same property.

If each PEE respects the interface in isolation, any concurrent run of the whole system respects the interface. In particular, in any concurrent run, when a public function returns, the global memory state satisfies the function's post-condition.

When all functions respect the interface, the invariants are preserved in any concurrent execution. This result shows that under the conditions ensuring that a configuration initializes successfully, the core can always progress by taking a step other than SWITCH.

Theorem 1 (Preservation of the Invariant): If a system of PEEs U respects the interface, then every step of the abstract semantics preserves the processor invariant.

Theorem 2 (Progress). If a system of PEEs U respects the interface and is valid with respect to a global memory state, then the well-defined configuration uid1.init|| . . . ||uidn.init0, can be successfully initialized and every processor in the compositional concurrent run of the configuration enjoys progress, i.e. every processor can either take a step other than SWITCH or it terminates (with TERM, DONE, or ABORT).

Corollary 3 (Preservation of the Specs Globally). Consider a system of PEEs U that respects the interface and is valid with respect to a global memory state. In any concurrent execution of a well-defined configuration uid1.init|| . . . ||uidn.init0, if a thread on a processor is ready to halt, then the post condition of the main function running on the thread can be established.

Theorem 4 (Data Race Freedom): Every well-defined configuration is data race free. The above result allows us to prove the following corollary.

Corollary 4 (Global preservation of the specs and data-race freedom). The target-level system of PEEs built using the system of the present invention respects the interface, and thus, in any concurrent execution, if a thread on a core is ready to halt, then the global memory satisfies the post-condition of the main function running on that thread. Moreover, any multi processor execution of the system is data race free.

PEE Verification Mechanism

Figure 10:
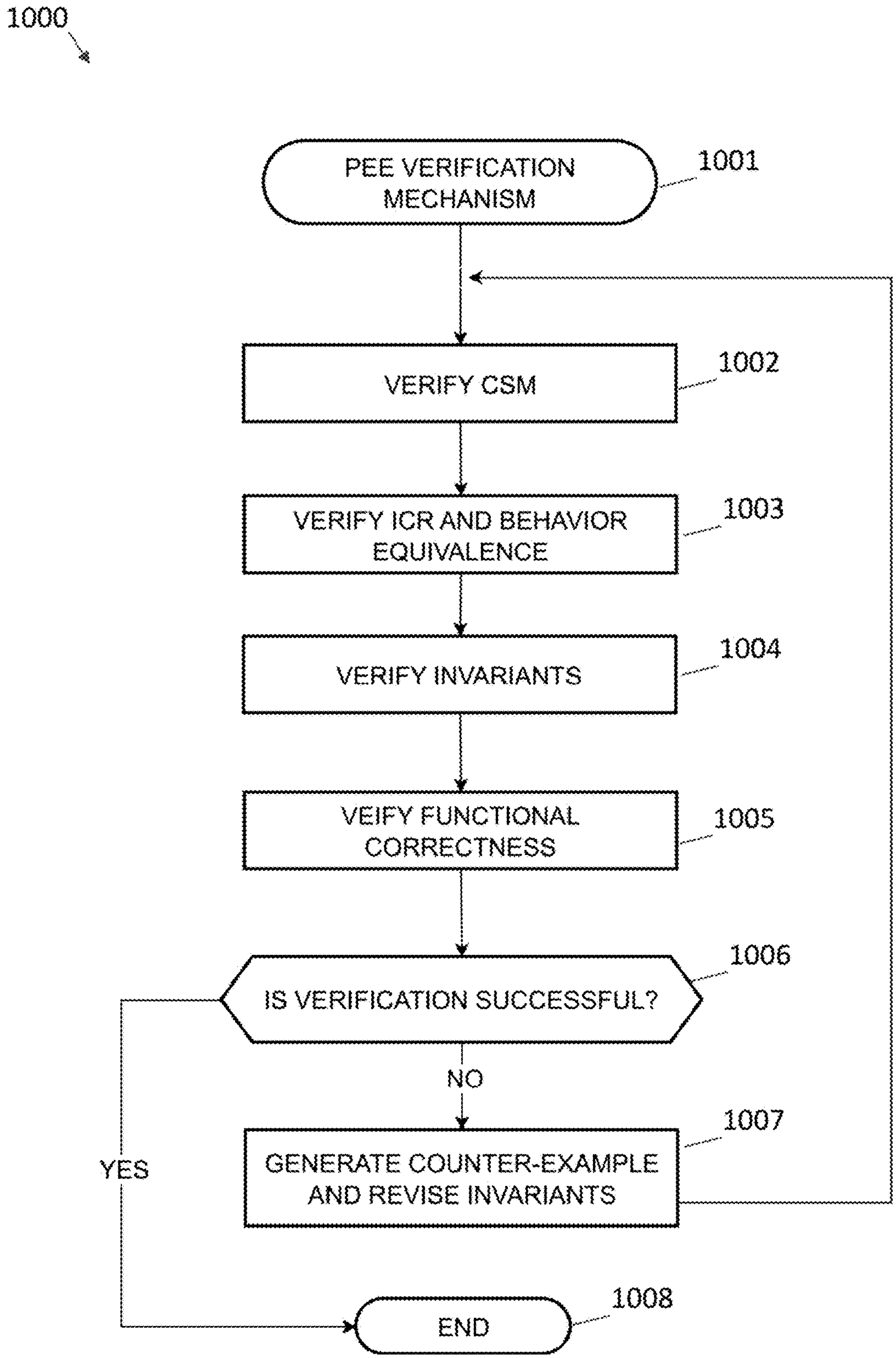
FIG. 10 shows a system 1000 for PEE Verification Mechanism according to some embodiments.

FIG. 10 shows a system 1000 for PEE Verification Mechanism (PVM) according to some embodiments. In system 1000, the PVM 1001 performs a series of steps and checks. As a first step, the PVM 1001 verifies the CSM 1002. It then proceeds to verify ICR and behavior equivalence if any 1003. It then proceeds to verify invariants 1004 and then verifies functional correctness if any 1005. It then performs a check to see if the verification is successful 1006. If the check at step 1006 is a "YES" then the PVM ends 1008. If the check at step 1006 is a "NO" the PVM 1001 generates counter-examples and revises invariants 1007 and proceeds back to step 1002.

In one embodiment of system 1000, the verification is performed using one or more verification tools choosing from the group of: theorem prover, SAT solver, SMT solver and model checker. In this embodiment, the Coq theorem prover is used for interactive verification. The Z3 SMT solver is used for verifying bit-level operations. The CVC4 SAT solver is used for verifying conditional and behavior specifications and the CBMC model checker is used to verify stack frame invariants for frame isolation.

Various embodiments of the steps verify CSM 1002, verify ICR and behavior equivalence 1003, verify invariants 1004 and verify functional correctness 1005 is disclosed herein.

Verifying Idiomatic Code Representation (ICR)

We disclose below PEE ICR verification mechanism. This method allows us to verify the stack isolation invariant and other invariants directly on PEE operational instructions. Then, we disclose how to verify the stack frame isolation invariant, which requires each function to operate within its own prescribed stack frame and not overwrite the return address or the stack frame of other functions. This invariant is necessary for proving that the compiled code is interface-preserving. The relational reasoning described previously does not reason about the stack and instead assumes the stack frame isolation invariant to hold.

One embodiment of the present invention incorporates ICR with PEE source compartmentalization to enable end-to-end compositional verification. In this embodiment, components in the verification of assembly operational instructions are disclosed. The ICR is lifted from the compiled code via the PEE Lifting mechanism as described previously. The resulting high-level language program is then inserted with annotations to check various invariants including stack frame isolation and boundary respecting invariants In another embodiment of the present invention, additional invariants can be inserted for additional checks for application specific properties. In this embodiment, the ICR function casm_set_ns1( ) 501 sets the TrustZone NS bit to 1 before transferring control to untrusted applications, thereby enabling hardware-based resource separation. An assertion (//@assert hwm_c1 & 0x1==0x1;) after the function call to verify that the ICR function is correctly implemented—that is, the hardware model register bit is indeed set to 1.

In other embodiments of the present invention, ICR functions for inline Assembly instructions are directly written and annotated with invariants. In this embodiment the ICR functions are verified by a high-level language (e.g., C) verification tool.

Stack Frame Isolation for ICR Functions

FIG. 11 shows an embodiment 1100 to verify stack frame isolation for ICR functions. In this embodiment, a high-level C language function (add.c) 1101 is shown, together with its operational instruction level Assembly in 32-bit X86 (add.s) 1102, and the ICR function (casmr_func_add.cS) 1103. The text with a prefix of "//" in casmr_func_add.cS 1103 represents verification annotations that enforces the stack frame isolation invariant.

In this embodiment, the source-level Abstract Syntax Tree (AST) is parsed to obtain the number of arguments for each C function. This allows computation of the base of the current stack frame upon function entry (line 191, FIG. 11), following the ABI of the target architecture (e.g., in 32-bit x86, all function arguments are pushed onto the stack).

During verification, each ICR statement within the ICR function that reads from or writes to the stack/memory triggers a corresponding ICR hardware model callback function (casm_rw_check 1104). This callback includes assertions (line 187, FIG. 11) to ensure that any address accessed is within the stack range or corresponds to global variables. Additionally, the return address on the stack is saved (line 193, FIG. 11). Before the function returns, the stack pointer is checked to see if it has been restored (line 204, FIG. 11) and that the return address remains unchanged (line 206, FIG. 11).

In other embodiments, the steps presented in the previous embodiment may be applied to other high-level languages (Rust, Java etc.).

In one embodiment of the present invention, the ICR functions may have other checks in addition to the standard stack frame isolation check described above. ICR functions may require additional enforcement of the stack frame isolation invariant that disallows any control flow instructions within ICR functions. This is achieved by limiting the set of exposed ICR statements, i.e., instructions such as jmp or goto are excluded from the ICR statement set. Second, any call to a PEE function inside an ICR function must use the corresponding ICR statements to arrange the arguments correctly in the registers or on the stack, following the ABI specifications. Lastly, the last instruction of an ICR function is checked to always be the return instruction.

Verifying CSM and Invariants

Figure 12:
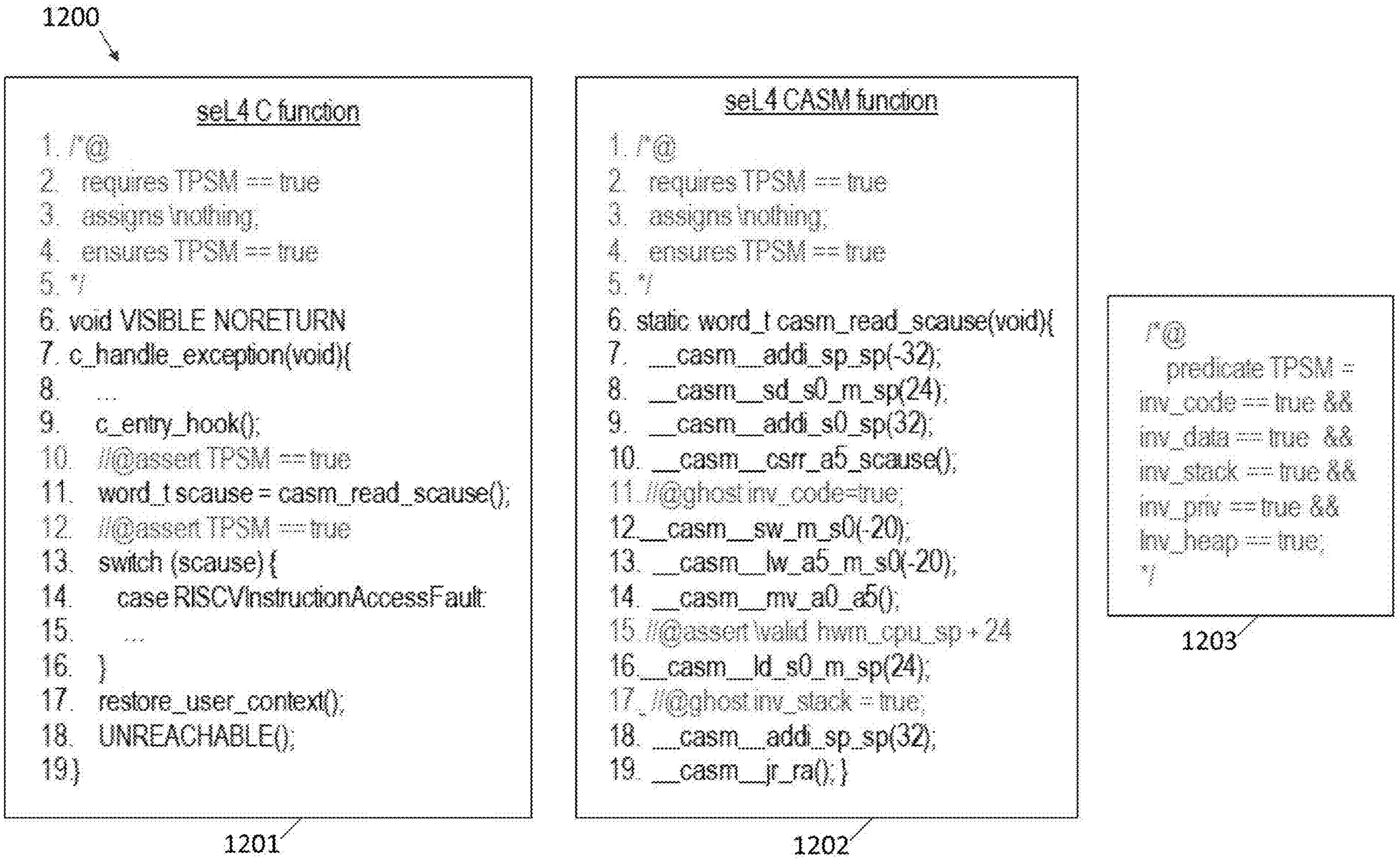
FIG. 12 shows an embodiment 1200 for verifying CSM on PEE code using idiomatic representation.

FIG. 12 illustrates an embodiment of system 1000, including example code listings 1201, 1202, and 1203 for implementing the system 1000 described herein. In this embodiment the step verify CSM 1002 comprises verifying CSM for Assembly language functions encoded in the ICR 1202. In this embodiment mathematical hoare logic and hoare-triples are employed in order to ensure: (a) heap safety; (b) stack safety; (c) data safety; (d) code safety; and (e) privilege separation. In addition, there are invariants for: (i) processor control state manipulated by processor control instructions; and (ii) caller application binary interface (ABI) safety verification from a higher-level language function that invokes the assembly language function. Together the aforementioned invariants specify TPSM and a non-interference CSM. In this embodiment, hoare logic (a formal system for reasoning about programs) is used to specify and verify the correctness of the seL4 kernel code by stating preconditions and postconditions, which are assertions about the state of the program before and after execution. Each individual ICR function (that comprises the ICR function corresponding to the Assembly language code) has corresponding hoare-triple assertions expressed which involves specifying a set of pre-conditions and post-conditions. The resulting annotated program is then passed into a verification tool for a given high-level language that the ICR statements and hardware model is specified in and in turn the verification tool can use a set of techniques ranging from abstract domain interpretation to deductive program verification to prove the hoare-triple assertions 1201, 1202 and 1203.

In one embodiment of the present invention, heap safety is ensured by maintaining a predicate (Boolean variable) called inv_heap which is initially set to true upon the ICR function entry. For every ICR statement invocation a pre-condition is then added to check if the memory and registers involved in the ICR statement point anywhere outside of the allowed global memory regions for the specific ICR function. If so, inv_heap is set to false and the verification is aborted.

In another embodiment of the present invention, stack safety is ensured by maintaining a predicate (Boolean variable) called inv_stack which is initially set to true upon ICR function entry. Further, a function stack is modeled via a bounded global stack variable which is populated with: return address, function parameters and local variables as defined by the ICR function. The stack pointer processor hardware model register is then set to point to the top of this global stack upon ICR function entry. For every ICR statement invocation a pre-condition is then added to check if the stack pointer is pointing to a location within the bounded global stack and that the memory and registers involved in the instruction if using the stack pointer register points to a valid location within the global stack. If not, inv_stack is set to false and the verification is aborted.

In yet another embodiment of the present invention, processor control state safety is ensured by maintaining a predicate (Boolean variable) called inv_processorctrl which is initially set to true upon ICR function entry. For every ICR statement invocation that involves a processor control register access, a pre-condition is added to check if the processor control register is in the correct state and a post-condition is added to check if the processor control register state is maintained after the instruction.

In some embodiments of the present invention, caller ABI safety is ensured by maintaining a predicate (Boolean variable) called inv_cabi which is initially set to true upon ICR function entry. At the entry of the ICR function all the processor registers that are part of the caller ABI for the high-level language function that invokes the ICR function are saved into temporary variables or given unique values. Then at the end of the ICR function the same set of processor registers are then checked for the values they held on ICR function entry. If any of the processor registers that are part of the caller ABI have changed values then inv_cabi is set to false and the verification is aborted.

In one embodiment of the system 1000, the "is verification successful" step 1006 is true if inv_heap, inv_stack, inv_processorctrl and inv_cabi are all true at the exit of the ICR function. In this embodiment, TPSM and non-interference CSM holds for the ICR function and it can be safely composed with the higher-level language caller functions for any properties that have been already verified on the higher-level language caller functions. If any one of them is false, then TPSM and non-interference CSM does not hold. In this embodiment, the pre and post conditions for the aforementioned invariants are encoded using the ICR hardware model registers, program global variables as well as the bounded global stack.

In another embodiment of system 1000, the step to generate counter-example and revise invariants 1007 is performed using a mathematical theorem prover 104 or mathematical model checker 120. In this embodiment the CSM invariants are revised in the mathematical specification language using temporal logic of actions. In other embodiments the CSM invariants are revised using hoare-logic and ACSL specifications on the PEE code.

In the embodiment of system 1000 described in FIG. 12, non-interference CSM invariant is proven on all the seL4 high-assurance low-level Assembly language blocks 1202 and sel4 high-level C language functions 1201. In this embodiment the non-interference CSM is proven on all the seL4 PEE code and RISC-V firmware PEE code Assembly Language code blocks expressed as ICR functions. In the embodiment, the sel4 C function "c_handle_exception" invokes the seL4 ICR function "casm_read_scause". The embodiment employs the ACSL specification language to define the hoare-triple invariants which can then be discharged via the Frama-C code-level verification tool-chain. The ACSL predicate specification is used to define TPSM as a conjunct of inv_code, inv_data, inv_stackm inv_ps and inv_heap. The predicate function is then used within the requires and ensures ACSL clause for each function definition which establishes the hoare-triple and rely-guarantee reasoning between the caller function and the callee function. Finally, the ACSL assert and ghost clauses are employed to define specific validity checks for each of the invariants in conjunction with the ICR RISC-V C-language ISA hardware model. In this embodiment, inv_stack is defined using the \valid ACSL specification, which ensures that stack frame memory location is valid for every access to the stack pointer register. Similarly, ACSL ghost clauses are used to set inv_code values after every memory access function that could potentially manipulate memory related to code. In this embodiment, the use of ACSL as the specification language allows use of automated C verifiers such as Frama-C to discharge the invariants via back-end theorem provers and SAT solvers. The RISC-V C-language ISA hardware model is passed along with the ICR function as one single C program to Frama-C. This allows capturing seL4 and RISC-V firmware Assembly language semantics during the verification process. The abstract interpretation (program overapproximation) technique of Frama-C is employed which allows us to assert on specific values of registers/memory and prove a sound overapproximation of memory/register accesses done by the C and Assembly Language code of seL4 and the RISC-V firmware. In this embodiment, the proof of TPSM and non-interference CSM ensures that the existing high-level language proofs of seL4 kernel remain unaffected in the presence of other PEEs.

Verifying Observational Equivalence

In one embodiment of the present invention, we define an observational equivalence between two programs and explain how the system and methods in the disclosed invention uses a high-level language relational property prover (e.g., Frama-C Relation Property Prover (RPP)) to establish this property.

In this embodiment we define our observational equivalence as a relational property between what we call a source and a target program (PEE), asserting the following. First, if the source and target programs start from equivalent heap states, they will halt with equivalent heap states. Second, if the source (resp. target) program encounters an external call (to one of its own ICR functions or another PEEs public function) at any point in its execution, the target (resp. source) must also make an external call to the same function. Further, the programs will pass equal arguments to this external function, and their heap states will be equivalent right before the external call.

Further in this embodiment, the equivalence of heap states here, only needs to consider the heap locations accessible by the source and target programs; other heap locations are neither read nor modified by the two programs. We assume that the source and target programs only access the memory exclusively owned by a source- and target-level PEE uida, respectively. We define the equivalence of heap up to the memory locations owned by uida as the relation Eqa. This relation states that the compiler maps each location in the heap owned by the source-level PEE ($x \in uida.M$) to a corresponding location ($y=MT(x)$) with an equivalent value ($\sigma s, \sigma t \vdash x \equiv y$) in the target-level PEE.

Formally, we write $Eqa=\{(\sigma s, \sigma t) | \forall x. (x \in uida.M \supset \exists y. (y=MT(x) \wedge \sigma s, \sigma t \vdash x \equiv y))\}$, where σs and σt are memory states of the source and target, respectively, mapping locations to values. The definition of two locations having equivalent values ($\sigma s, \sigma t \vdash x \equiv y$) is based on the type of those values. We require that both values have the same type (type ($\sigma s$ (x))=type ($\sigma s$ (y))). Moreover, for values of a basic type, e.g., integer, we require the values to be exactly the same ($\sigma s (x)=\sigma t (y)$). For values of an address type, we require that the addresses point to equivalent locations ($\sigma s, \sigma t \vdash \sigma t (y) \equiv MT (\sigma s (x))$).

In one embodiment of the present invention, the RPP plug-in of Frama-C is designed to verify relational properties between two C programs. Here, we show how we establish the observational equivalence property for two arbitrary C programs using the RPP plug-in. The technique can be generalized for other higher-level language programs (e.g., Java, Rust) FIG. 13 shows an embodiment 1300 for Observational equivalence for two simple functions in the C high-level programming language. In this embodiment, programs P1 1301 and P2 1302 are accessing global variables y1,z1 and y2,z2, respectively. We assume that y1,z1 are heap locations in a source PEE uida and y2,z2 are heap locations in the corresponding target PEE, with a mapping that corresponds y1 to y2 and z1 to z2. The RPP plug-in enables us to establish that the two programs are observationally equivalent via the relational property 1303 depicted on the right side of the figure. The relational property in line 53 assigns identifiers id1 and id2 to programs P1 1301 and P2 1302, respectively. Labels Pre_id1 and Pre_id2 refer to the states before executing programs P1 and P2, respectively, while Post_id1 and Post_id2 refer to the states after executing these programs. Lines 54 and 55 assume Eqa before executing the programs, and lines 56 and 57 establish Eqa afterward. It is straightforward to observe that the relational property holds and captures observational equivalence, i.e., if the values of corresponding heap locations are equivalent before running P1 and P2, then they will remain equivalent after execution.

Next, we explain how we handle loops more effectively and verify the observational equivalence regarding the external calls.

Relating while Loops

To prove a property, including a relational one, of programs that include a while loop, it is typically necessary to establish a loop invariant. The present invention provides a solution by leveraging the fact that compilers (w/o optimization) typically maintain the structure of the source program in the target program. As such, each while loop in the source code has a corresponding while loop in the target code, which can be identified automatically or extracted manually from the compiler's output. With this correspondence established, we can show the equivalence of two programs by dividing the code into four parts for each while loop: (i) the code that appears before the while loop, (ii) the code within the body of the loop, (iii) the code for the condition of the loop, and (iv) the code that appears after the loop. We establish the equivalence of each part for source and target code separately and then argue that this implies the equivalence of the two programs as a whole.

FIG. 14 shows an embodiment 1400 for Observational equivalence for two programs with while loops. In this embodiment programs P3 1401 and P4 1402 are written in the C high-level language. To establish their equivalence, we break down the code for each of P3 and P4 into (i) the red part (lines 63-66 and 77, resp.), (ii) the blue part (lines 67 and 78, resp.), (iii) the orange part (lines 68 and 79, resp.), and (iv) the brown part (lines 70-71 and 81-82, resp.). We establish the mutual equivalence of the corresponding parts using four relational properties. The relational properties for parts (i), (ii), and (iv) are similar to the previous example: they assume that the values of corresponding variables are equivalent before each part and establish that their values remain equivalent after executing that part. The relational property for part (iii) establishes the equivalence of the loop conditions, assuming that the corresponding heap locations are equivalent.

The method of the present invention declares a fresh flag variable for each loop and assigns true to the flag if the value of the condition holds and false otherwise. The relational property, then, ensures that the flags have equal values in both programs, assuming that the values of the corresponding flags and heap locations are equivalent before executing the condition. Weshow the two programs built for the loop conditions Condition P3 1403 and Condition P4 1404 and their relational property on the bottom left, Relational Property-Cond 1405.

Relating External Calls

We need to establish extra conditions to support external calls to the public functions of other PEEs or ICR functions of the same PEE. In particular, we need to show that executing source and target programs generate the same trace of external function calls, the same arguments are passed to the corresponding external functions, and both programs meet the precondition of the callee. To establish the latter two conditions, we also enforce that the values stored in the exclusive heap of source and target programs are equivalent right before each external call.

For relational provers which do not allow us to establish a relational property between variables at locations other than at the beginning and end of the program (the pre- and post-labels), we declare two lists of ghost variables for the source and target programs. Right before each external call, we extend these lists to store the identifier of the callee, the identifier of the heap location where the result will be stored, the arguments, and the state of the exclusive heap prior to the call. Finally, we introduce an extra relational property that states that the collected trace is equivalent in both programs, assuming they start from equivalent heap states. We assume that the arguments of the call can only refer to heap locations.

FIG. 15 shows an embodiment 1500 for Observational equivalence for two programs with external function calls. The embodiment shows two programs written in the high-level C language with an external call. The lists ghost_trace_5 and ghost_trace_6 collect a trace of the ghost variables corresponding to the external calls in P5 1501 and P6 1502 respectively. To extend the trace with new ghost variables, we use the functions ghost_track_5 and ghost_track_6. In lines 126-131 and 134-140 of P5 and lines 158-163 of P6, we use these functions to add (i) the identifier of the callee (1 for H1 and 2 for H1), (ii) the identifier of the heap location to which we assign the return value (1 for y5 and y6 and 2 for z5 and z6) (iii) the states of the heap (the values stored in y5, z5 and y6, z6) and (iv) the arguments of the callee (y5 and y6). The relational property 1503 states that the ghost traces built by the two programs are equivalent if they start with equivalent heap states. The example programs we have shown so far do not return values; if they do, we also assert that the return values of the two programs are also equal.

Verifying Functional Correctness

The system of the present invention provides a mechanism to verify required functional correctness of PEE code. In one embodiment of the present invention, the functional correctness of the KPEE is verified to ensure correct initial setup of privileged modes, IOMMU and interrupt controller configuration as well as data and instruction caches.

Figure 16:
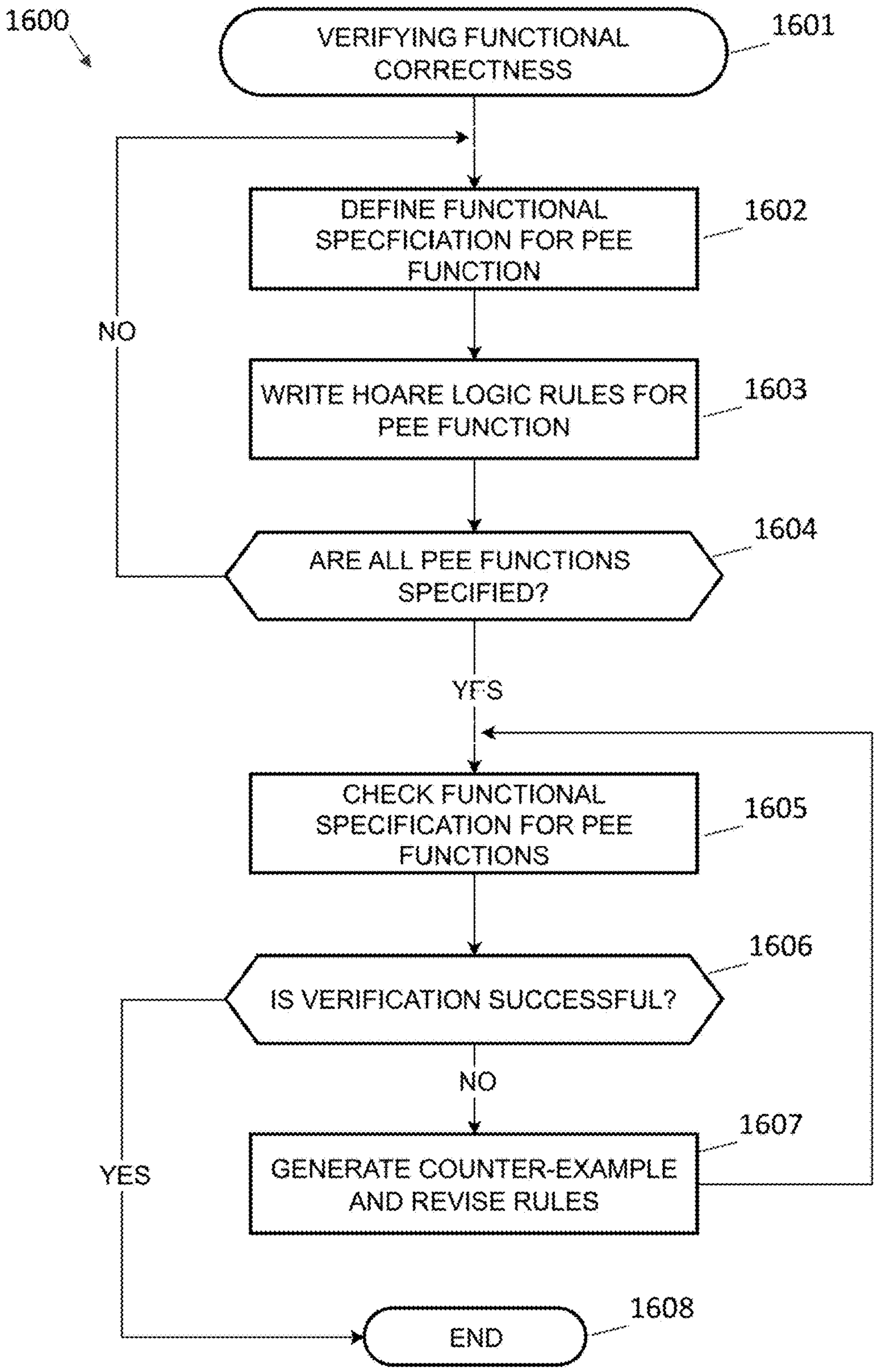
FIG. 16 shows a system 1600 for verifying PEE functional correctness according to some embodiments.

FIG. 16 shows a system 1600 for verifying PEE functional correctness according to some embodiments. In system 1600, the PEE functional correctness (PEEFC) verification mechanism 1801 performs a series of steps and checks. As a first step, it defines functional specification for PEE function 1602. The PEEFC verification mechanism then writes hoare logic rules for the PEE function 1603. It then performs a check to see if all PEE functions have been specified 1604. If the check at step 1604 is a "NO" the PEEFC verification mechanism goes back to step 1602. If the check at step 1604 is a "YES" the PEEFC verification mechanism checks functional specification for PEE functions 1805. It then performs a check to see if verification is successful 1606. If the check at step 1606 is a "YES" the PEEFC verification mechanism ends 1608. If the check at step 1606 is a "NO" the PEEFC verification mechanism generates counter examples and revises rules 1607 and repeats again from step 1605.

In one embodiment of system 1600, the step define functional specification for PEE function 1602 involves: (a) identifying the input parameters and output values of the function; (b) specify the preconditions that must be satisfied before the function is called; and (c) specify the post conditions that should hold true after the function has completed execution.

In another embodiment of system 1600, the step write hoare logic rules for PEE function 1603 involves writing rules that govern how the PEE state changes during execution. The following rules are written: (a) initial state rule which specify the initial values of the variables and unknown results; (b) one or more statement rules; and (c) Post condition rule that specifies the values of the results.

In some embodiments of system 1600, statement rules are further composed of basic rules, conditional rules, loop-conditional rules, array rules and functional rules. In this embodiment basic rules are further composed of assign rules (If x=E, then: x'=E), sequence rules (If {P} C {Q}, and {R} D {S}, then: {P∧R} C; D {Q∧S}), choice rules (If {P} C {Q}, then: {P} if B then C else D fi {Q}) and loop rules (If {P} while B do C od {Q}, then: {P∧¬B} C {Q}). Further, in this embodiment, conditional rules are composed of if-then rules (If {P} if B then C {R}, then: P∧B} C {R}) and if-else rules (If {P} if B then C else D fi {R}, then: {P} if ¬B then D {R}).

In another embodiment of system 1600, the loop-conditional rules are further composed of while-if rules (If {P} while B do if C then D fi od {Q}, then: {P∧B∧C} D {Q}) and while-cond rules (If {P} while (B and C) do D od {Q}, then: {P∧¬(C)} D {Q}). In this embodiment, the array rules are further composed of array assign rules (If x[i]=E, then: x'[i]=E) and array access rules (If E=x[i], then: E'=x'[i]).

In yet another embodiment of system 1600, the functional rules are further composed of function-call rules (If {P} f(x) {R}, then: {P} call f(x) {R}) and function-return rules (If {P} return E {R}, then: {P} return E {R}).

In other embodiments of system 1600, statement rules can comprise other Hoare Logic rules depending on the specific requirements of the programming language used to implement the PEE.

In one embodiment of system 1600, the step write hoare logic rules for PEE function 1803 is accomplished by analyzing each function and each statement within a given function of the PEE and applying the appropriate rule depending on the function statement encountered. This involves breaking down the statements into different categories, such as loops, conditionals, function calls, and assignments, and applying the relevant rules to each one.

In another embodiment of system 1600 the step check functional specification for PEE functions 1605 involves checking pre-conditions, post-conditions and specifications. This also involves verifying that the final state of the PEE function execution matches what's stated in the post-condition and is accomplished by using a collection of theorem provers that prove specific verification obligations related to the specifications and post-conditions.

In another embodiment of system 1600, the step to generate counter-example and revise rules 1607 is performed using a mathematical theorem prover 104 or mathematical model checker 120. In this embodiment the hoare rules are revised in the mathematical specification language using ACSL.

FIG. 17 illustrates an embodiment of system 1600, including example code listings 1701, 1702 and 1703 for implementing the system 1600 described herein. In this embodiment functional correctness on a RISC-V firmware 1701 and seL4 high-assurance kernel Assembly Language code block 1702 is realized. In this embodiment the 'firmware_init' function within the RISC-V firmware PEE is responsible for setting up the initial state of the RISC-V Physical Memory Protections (PMP) registers, IOMMU and cache subsystems and transferring control to the seL4 high-assurance kernel running as another PEE in supervisor mode (S-mode).

In the aforementioned embodiment, the firmware_init function is used to set up the PMPs to be disjoint for the firmware and the seL4 PEE functions, so that seL4 PEE cannot read/write to firmware memory regions and can only execute firmware code via a predefined hardware instruction. The PMPs are set up such that the firmware cannot directly execute the seL4 PEE functions but only via a predefined hardware instruction. This is done through the pmp_initialize function, which in turn uses the pmp_set functions to set the RISC-V PMP registers to appropriate base address, size and protection values. The firmware init function from the RISC-V firmware PEE transfers control to the seL4 PEE function initially with the operating mode set to S-mode, using a special function called xfer_to_seL4_cuobj for this purpose. Further in this embodiment, the functional correctness specifications as well as TPSM invariant specifications are written using the ACSL specification language 1703.

In the aforementioned embodiment, a global predicate called disjoint_sbi_seL4 is defined which ensures that the RISC-V PMP registers with index 0 and 1 are set up with the disjoint RISC-V firmware PEE and seL4 PEE memory regions respectively. The predicate also ensures that the corresponding PMP protection registers have the appropriate protection flags which ensures that seL4 functions cannot directly access RISC-V firmware PEE regions. The predicate uses the RISC-V ISA C hardware model register variables for this purpose. The ACSL requires and ensures clauses are then used to prove that once the firmware_init function is done executing the processor mode is set to S_MODE executing the seL4 PEE function beginning at address ENTRYPOINT_SEL4_C_UOBJ while still ensuring that the disjoint_sbi_seL4 predicate is true.

In the aforementioned embodiment, the pmp_initialize function is verified to ensure that the disjoint_sbi_seL4 predicate is true once it finishes execution. The two functions, pmp_set and xfer_to_seL4_uobj, are invoked from within the pmp_initialize and firmware_init functions of the firmware implementation. xfer_to_seL4_uobj function and its TPSM invariant is first verified as described previously. The ACSL requires and ensures clauses are then used to verify that the processor mode before execution of xfer_to_seL4_uobj is M_MODE (monitor) and after execution is S_MODE (supervisor). The ensures clause is used to prove that the mepc is set to the address provided to xfer_to_seL4_uobj. The requires and ensures clauses establish functional correctness of xfer_to_seL4_uobj, showing that it transfers control to the specified address in S_MODE. The final function verified in this embodiment is pmp_set, which is invoked to set a corresponding RISC-V PMP address and protection configuration register. The ACSL requires and ensures clauses specify that the PMP address (hwm_processor_pmpaddr[ ]) and configuration registers (hwm_processor_pmpcfg[ ]) with the appropriate index (0 through PMP_COUNT−1) are set to the address and prot parameters respectively.

In other embodiments of system 1600, similar techniques are employed towards RISC-V firmware PEE functions which initialize the instruction and data caches as well as the IOMMU via RISC-V CSR register programming (similar to mstatus and mepc registers used within xfer_to_seL4_uobj function).

EMBODIMENTS

A plurality of embodiments of the present invention is disclosed herein.

Evaluating Mathematical Model

One embodiment of the system of the present invention comprises a method for analyzing the mathematical invariants to determine whether a SSM 114 is satisfied. This analysis may be performed using automated and interactive theorem provers that translate predicates into proof obligations. In some cases, the analysis may also be performed via mathematical model checkers.

In this embodiment, a mechanism is provided for generating a counterexample upon determining that the SSM 114 is not satisfied. This counterexample shows that the SSM 114 does not hold for the computer platform 105 operation and provides insight into why this may be the case. This information is used to then revise the mathematical model to fix logic corresponding to the counter-example and model variables. Finally, if there still remains unsatisfied proof-obligations, the SSM 114 is rewritten based on the unsatisfied proof-obligations and the aforementioned steps are repeated until the SSM 114 is satisfied.

In this embodiment, SSM may be defined using the temporal logic of actions mathematical logic. The provided SSM invariants handle memory-safety, control-flow integrity, privilege separation, TPSM, CSM and non-interference invariants all specified using PEEs and their operations.

In other embodiments of the system of the present invention, analyzing the SSMs comprises a computer-assisted theorem proving system, such as Z3, CVC4, or Alt-ergo, to analyze the mathematical invariants and determine if the SSM is satisfied. Alternatively, an interactive theorem prover like Coq may be used for SSM verification. In some cases, analyzing the SSMs involves using an explicit state model checker for temporal logic (TLC) to provide the invariants. The use of a computer-assisted theorem proving system and model checking provides several key benefits. Firstly, it allows for the automated analysis of complex mathematical expressions and the identification of potential security vulnerabilities. This can be particularly valuable in large-scale systems where manual analysis may be impractical or unreliable. Secondly, the theorem proving and model checking system can help to establish a formal proof that the SSM is satisfied, providing a high degree of confidence in the system's security properties. This can be essential for applications where the consequences of a security failure are severe, such as in financial trading systems or critical infrastructure control systems.

Trusted Execution Environment

Another embodiment of the present invention involves a microhypervisor Trusted Execution Environment (TEE) and demonstrates that source-level properties are preserved in the compiled code using the system of the present invention. Specifically, this embodiment utilizes a 32-bit x86 hardware virtualized platform. The microhypervisor TEE is constructed using Program Execution Elements (PEEs) and leverages hardware virtualization to execute a Linux multiprocessor guest OS, with the microhypervisor operating at the highest privilege level. The microhypervisor TEE is verified at the source level for the security property of guest memory separation, ensuring that hypervisor and guest OS memory regions are disjoint and the guest OS cannot directly access the hypervisor memory region.

In this embodiment, the present invention verifies the Assembly language of the guest OS page-table setup function. To validate the compiled code, the PEEs that manipulate the global heap state are first identified. The Microhypervisor TEE includes PEEs that initialize and configure the page tables for the hypervisor and guest OS memory regions. FIG. 18 illustrates an embodiment 1800 for verifying the guest memory initialization function within a trusted execution environment. In this embodiment, the C function source code for guest memory setup 1801 is provided. The behavior specification of this function, written in ANSI C specification language (ACSL), is defined on lines 209 to 224 and guarantees that the memory region of the guest OS is configured in user mode with read-write permissions. The main body of the function consists of five for loops that populate the global page table data structures (e.g., _slabmempgtbl_lvl4t) with the correct permission bits.

In this embodiment, the for loops are converted into equivalent while loops 1802 and 1803. The transformation of the first for loop into a while loop is shown at the bottom of FIG. 18. The transformed functions are then verified at the source level to check if the original property still holds. Once the source-level verification passes, the C portion of the source code is compiled into Assembly, and then translated into ICR functions using the PEE Lifting Mechanism 108. Finally, the resulting ICR functions are analyzed together for the stack isolation property.

The interface-preserving invariants on the compiled code are verified to establish the source-level property on the assembly. Helper scripts are provided to generate relational property annotations. The pre-loop, loop condition, loop body, and post-loop portions in the ICR functions are identified and verified separately. Assigns annotations are manually inserted into the code, as required by the Frama-C RPP plugin.

Pre-loop: The pre-loop portion corresponds to line 239 in code-block 1803. FIG. 19 illustrates an embodiment 1900 for verifying pre-loop observational equivalence using a relational property verification tool. In this embodiment, the input file to the RPP plugin is shown, where pre_source 1901 represents the source C function and pre_target 1902 represents the target ICR function. The actual C ICR hardware model implementation of assembly instructions is inlined via a script to reduce annotation requirements. For example, instead of calling the ICR statement casm_xorl_edx_edx( ) the hardware model implementation is inlined as hwm_cpu_gprs_edx=0 (shown in line 273). This minimizes annotations, as otherwise, each ICR statement would require individual annotation.

In the target function, lines 273 and 274 handle actual assignments to the global variable t_i, while lines 267 to 272 contain the function prologue (i.e., setting up the stack frame). The verification checks for observational equivalence of the global heap states between the source C function and the compiled assembly. Annotations on lines 248-250 and 255-265 are generated manually, whereas relational property annotations are generated automatically using a helper script. The manual annotations include assignments to global variables; in the pre_target function, these also include assignments to global hardware model registers. The requires annotation on line 256 assumes that the function stack and global variable t_i have disjoint locations—this assumption is satisfied by verifying the stack isolation invariant.

Loop condition: FIG. 20 illustrates an embodiment 2000 for verifying loop condition observational equivalence using a relational property verification tool. In this embodiment, the RPP input for verifying the observational equivalence of the loop condition is shown. cond_source 2001 represents the source C function, and cond_target 2002 represents the target ICR function. Lines 298 to 308 represent the assembly instructions movl i, % eax and cmpl $512, % eax, which load the global variable i from the data section into register eax and then compare eax with 512 (the value of PAE_MAXPTRS_PER_PML4T). The verification confirms that both the source and target enter the loop when i<PAE_MAXPTRS_PER_PML4T, thus establishing their observational equivalence.

Loop body: Verifying the loop body follows a similar approach to the pre-loop verification. Post-loop: The post-loop of the first loop is the remaining part of the function, which includes additional loops that populate the page table. The embodiment then proceeds to verify the observational equivalence for each loop individually, establishing the post-loop observational equivalence for the first loop.

Figure 21:
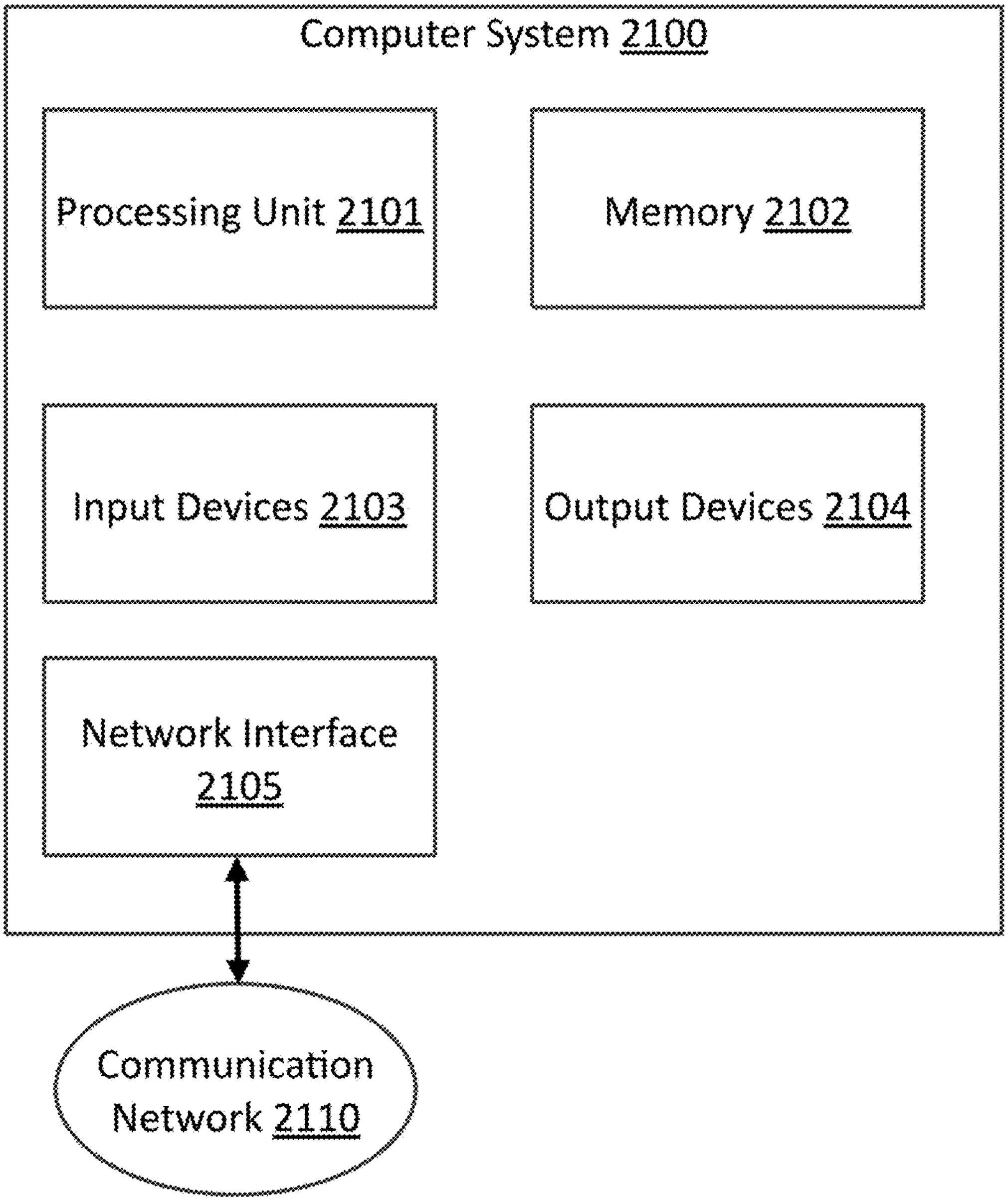
FIG. 21 shows, schematically, an illustrative computer system 2100 on which aspects of the present disclosure may be implemented.

FIG. 21 shows, schematically, an illustrative computer system 2100 on which aspects of the present disclosure may be implemented. For example, computer system 2100 may be used to implement system 100 and/or the subsystems discussed herein. In the example of FIG. 21, the computer system 2100 includes a processing unit 2101 having one or more computer hardware processors and one or more articles of manufacture that comprise at least one non-transitory computer-readable storage medium (e.g., a memory 2102) that may include, for example, volatile and/or non-volatile memory. Memory 2102 may store one or more instructions to program the processing unit 2101 to perform any of the functions described herein. Memory 2102 may also store one or more application programs and/or resources used by application programs (e.g., software libraries). Different portions of memory 2102 may be used for different storage purposes. For example, a non-volatile portion of memory 2102 may be used for long term storage, while volatile memory may be used to facilitate fast access for processing unit 2102. Though, memory 2102 may include any suitable type or combination of types of computer storage media that are able to store data. To perform any of the illustrative functionalities described herein, processing unit 2101 may execute one or more processor-executable instructions stored in memory 2102, which may serve as non-transitory computer-readable media storing processor-executable instructions for execution by the processing unit 2101.

The computer system 2100 may have one or more input devices and/or output devices, such as devices 2103 and 2104 illustrated in FIG. 21. These devices may be used, for instance, to present a user interface. Examples of output devices that may be used to provide a user interface include printers, display screens, and other devices for visual output, speakers and other devices for audible output, braille displays and other devices for haptic output, etc. Examples of input devices that may be used for a user interface include keyboards, pointing devices (e.g., mice, touch pads, and digitizing tablets), microphones, etc. For instance, the input devices 2103 may include a microphone for capturing audio signals, and the output devices 2104 may include a display screen for visually rendering, and/or a speaker for audibly rendering, recognized text.

In the example of FIG. 21, computer system 2100 also includes one or more network interfaces (e.g., a network interface 2105) to enable communication via various networks (e.g., a network 2110). Computer networks include, for example and not limitation, local area networks (e.g., an enterprise network) and wide area networks (e.g., the Internet). Such networks may be based on any suitable technology operating according to any suitable protocol, and may include wireless networks and/or wired networks (e.g., fiber optic networks). It should be appreciated that components of computer system 2100 may be distributed across a computer network; this may be done, for example, to facilitate distributed processing, to achieve connectivity with (e.g., remote) input devices and/or output devices, or for any other suitable reason.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

In this respect, it should be appreciated that one implementation of the above-described embodiments comprises at least one computer-readable medium encoded with a computer program (e.g., a plurality of instructions), which, when executed on a processor, performs some or all of the above-discussed functions of these embodiments. As used herein, the term "computer-readable medium" encompasses only a computer-readable medium that can be considered to be a machine or a manufacture (i.e., article of manufacture). A computer-readable medium may be, for example, a tangible medium on which computer-readable information may be encoded or stored, a storage medium on which computer-readable information may be encoded or stored, and/or a non-transitory medium on which computer-readable information may be encoded or stored. Other non-exhaustive examples of computer-readable media include a computer memory (e.g., a ROM, a RAM, a flash memory, or other type of computer memory), a magnetic disc or tape, an optical disc, and/or other types of computer-readable media that can be considered to be a machine or a manufacture.

As used herein, a "set" may have one or more members. For example, "a set of programs" could have a single program or multiple programs. As used herein "subset" of a set may have the same number of members as the set or fewer members than the set but at least one member of the set. For example, a set of programs consisting of programs A, B, and C could be divided into the following seven subsets A; B; C; A, B; A, C; B, C; and A, B, C. A set may also be formed from other sets. For example, set X may be made up of set Y and set Z; that is set Y and set Z are each a subset of set X.

As used herein, two subsets of a set are "independent" subsets if each subset may include any one or more members of the set without restriction based on the membership of the other subset. Thus, independent subsets may be identical, partially overlapping, or mutually exclusive, however, independent subsets does not require that the subsets be capable of differing in a given implementation.

When recited in the claims that two or more subsets "may overlap," or "may overlap in whole or in part," such language indicates that the subsets are not required to be mutually exclusive or distinct. The phrase does not require that overlap occur, nor does it require that the subsets be capable of differing or overlapping in a given implementation. Rather, the phrase is intended to clarify that the claim scope includes implementations in which the subsets are identical, partially overlapping, or mutually exclusive.

As used herein, the term "or" is intended to mean an inclusive "or," and is used interchangeably with "and/or," unless the context clearly dictates otherwise. Thus, "A or B" encompasses "A alone," "B alone," and "both A and B together." Only where the specification explicitly describes alternatives as being mutually exclusive, or where such exclusivity is otherwise clearly required by the context, should "or" be construed as an exclusive "or."

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical values appeared in this specification are deemed modified by a term of degree thereby reflecting their intrinsic uncertainty.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A system for verifying a computer platform via verification of a set of program execution elements (PEEs), the computer platform comprising the set of PEEs, the system comprising:
- at least one processor; and
- a non-transitory computer-readable storage medium having stored thereon code executable by the at least one processor, the code comprising
  - a set of compilers for compiling the set of PEEs into operational instructions that accomplish operational semantics of each PEE;
  - a PEE lifting mechanism to lift the operational instructions into an idiomatic code representation (ICR); and
  - a PEE verification mechanism that enforces a compartmentalization security mechanism (CSM) that preserves properties verified at a respective source level of each respective PEE in the set of PEEs down to the operational instructions of the respective PEE generated by the set of compilers,
- wherein
  - a first PEE in the set of PEEs comprise one or more PEE functions as units of execution, and
  - the PEE verification mechanism further checks properties of the one or more PEE functions and corresponding ICR that guarantee one or more of the group consisting of a behavior property, a security property and timing property.

2. The system of claim 1, wherein, for each PEE, the respective source level is selected from the group consisting of (i) source at level of high-level programming language, (ii) source at level of intermediate programming language, and (iii) source at level of low-level programming language.

3. The system of claim 1, wherein the CSM is enforced on the ICR of the set of PEEs.

4. The system of claim 1, wherein the properties verified at the respective source level of the first PEE applies to verifying properties of individual PEE functions for a set of specifications.

5. The system of claim 1, further comprising an ICR code generator that generates verified operational instructions of a second PEE in the set of PEEs from the corresponding ICR, wherein the second PEE is the first PEE or a different PEE in the set of PEEs.

6. The system of claim 1, wherein the operational instructions are selected from the group consisting of (i) intermediate representation instruction, (ii) Assembly language instruction, (iii) machine code instruction, (iv) byte-code instruction, and (v) digital circuit state-machine instruction.

7. The system of claim 1, wherein the ICR provides pseudo-functions ("ICR functions") corresponding to the operational instructions of a second PEE in the set of PEEs, wherein the second PEE is the first PEE or a different PEE in the set of PEEs.

8. The system of claim 7, wherein the PEE lifting mechanism replaces the operational instructions of the second PEE with corresponding ICR functions.

9. The system of claim 7, wherein the PEE verification mechanism replaces the ICR functions with corresponding code from an ICR hardware model and performs verification of specification.

10. The system of claim 1, wherein each PEE in the set of PEEs comprises one or more PEE components selected from the group consisting of (i) an identifier, (ii) an indication of the language in which the PEE is implemented, (iii) an exclusive set of computer platform resources including an exclusive memory address space where PEE code, data, stack, heap and memory regions are stored, (iv) a set of initialization functions that initializes the respective PEE, (v) a set of public functions that expose a PEE API, (vi) a set of ICR functions, and (vii) a set of internal function declarations.

11. The system of claim 10, wherein a second PEE in the set of PEEs guarantees that, for any public function in the set of public functions, when a pre-condition is met upon invoking said public function, a post-condition shall hold upon return from said public function, wherein the second PEE is the first PEE or a different PEE in the set of PEEs.

12. The system of claim 10, wherein a set of public functions of concurrent PEEs is invoked in parallel.

13. The system of claim 10, wherein a second PEE in the set of PEEs has an exclusive set of computer platform resources and the set of computer platform resources is protected from direct access by other PEEs in the set of PEEs, wherein the second PEE is the first PEE or a different PEE in the set of PEEs.

14. The system of claim 13, wherein the protection of the set of computer platform resources is achieved via capabilities provided by the other PEEs, verification of the other PEEs for resource separation, or a combination of both.

15. The system of claim 1, wherein the code further comprises a mathematical model, the mathematical model implementing a method based on relational separation logic that allows for reasoning about PEEs at an ICR level with support for concurrent execution and external calls.

16. The system of claim 15, wherein the mathematical model further comprises operational semantics for an imperative language that comprises of one or more of the group consisting of (a) an internal step to execute instructions within an abstract PEE, (b) an external call to handle any external call from an abstract PEE, (c) external return to return from external call, and (d) halt.

17. The system of claim 1, wherein the PEE verification mechanism uses, as a verification tool, at least one of the group consisting of a theorem prover, a SAT solver, an SMT solver, and a model checker.

18. A non-transitory computer-readable medium comprising:

executable instructions stored thereon and comprising a set of program execution elements (PEEs), the set of PEEs including a subset of SSM PEEs for enforcing system security mechanisms (SSMs), wherein the SSM PEEs, when analyzed, exhibit end-to-end provable guarantees, and a compartmentalization security mechanism (CSM), a first PEE in the set of PEEs comprise one or more PEE functions as units of execution, and a PEE verification mechanism checks properties of the one or more PEE functions and corresponding idiomatic code representation (ICR) that guarantee one or more of the group consisting of a behavior property, a security property and timing property.

19. The non-transitory computer-readable medium of claim 18, wherein the SSM PEEs, when analyzed, exhibit equivalence at syntactic and semantic levels when comparing idiomatic code representation (ICR) structural elements of an ICR corresponding to the SSM PEEs.

20. The non-transitory computer-readable medium of claim 18, wherein the CSM comprises a noninterference mechanism.

21. The non-transitory computer-readable medium of claim 18, wherein the SSM PEEs, when analyzed, exhibit bastion interfaces.

22. The non-transitory computer-readable medium of claim 18, wherein the SSM PEEs, when analyzed, exhibit relational separation logic.

23. The non-transitory computer-readable medium of claim 18, wherein the SSM PEEs, when analyzed, exhibit relational properties showing that (i) PEE source and (ii) an idiomatic code representation (ICR) corresponding to disassembled binary code of the SSM PEEs access computer platform resources in the same way.

24. The non-transitory computer-readable medium of claim 23, wherein the SSM PEEs, when analyzed, exhibit a source level proven to hold at an ICR level via the relational properties.

25. The non-transitory computer-readable medium of claim 18, wherein the SSM PEEs, when analyzed, exhibit one or more structural properties indicative of the end-to-end provable guarantees and the compartmentalization security mechanism.

26. The non-transitory computer-readable medium of claim 18, wherein the SSM PEEs, when analyzed using static program analysis, exhibit the end-to-end provable guarantees and the compartmentalization security mechanism.

27. The non-transitory computer-readable medium of claim 18, wherein the SSM PEEs further comprise cryptographic verification data embedded therein, the cryptographic verification data indicative of the end-to-end provable guarantees and the compartmentalization security mechanism.

28. A non-transitory computer-readable storage medium having stored thereon code executable by at least one processor for verifying a computer platform via verification of a set of program execution elements (PEEs), the code comprising:

a set of compilers for compiling the set of PEEs into operational instructions that accomplish operational semantics of each PEE;

a PEE lifting mechanism to lift the operational instructions into an idiomatic code representation (ICR); and a PEE verification mechanism that enforces a compartmentalization security mechanism (CSM) that preserves properties verified at a respective source level of each respective PEE in the set of PEEs down to the operational instructions of the respective PEE generated by the set of compilers, wherein a first PEE in the set of PEEs comprise one or more PEE functions as units of execution, and the PEE verification mechanism further checks properties of the one or more PEE functions and corresponding ICR that guarantee one or more of the group consisting of a behavior property, a security property and timing property.

* * * * *